(12) United States Patent
Das et al.

(10) Patent No.: US 12,149,373 B2
(45) Date of Patent: *Nov. 19, 2024

(54) PREMISES APPARATUS AND METHODS FOR AGGREGATED HIGH-CAPACITY DATA SERVICES

(71) Applicant: CHARTER COMMUNICATIONS OPERATING, LLC, St. Louis, MO (US)

(72) Inventors: Pratik Das, Escondido, CA (US); Diwelawatte Jayawardene, Centennial, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/102,878

(22) Filed: Jan. 30, 2023

(65) Prior Publication Data

US 2023/0198792 A1     Jun. 22, 2023

Related U.S. Application Data

(62) Division of application No. 16/855,913, filed on Apr. 22, 2020, now Pat. No. 11,570,015.

(51) Int. Cl.
*H04B 10/2575* (2013.01)
*H04L 12/28* (2006.01)
(Continued)

(52) U.S. Cl.
CPC ... *H04L 12/2801* (2013.01); *H04B 10/25751* (2013.01); *H04N 7/17309* (2013.01);
(Continued)

(58) Field of Classification Search
CPC .......... H04L 12/2801; H04B 10/25751; H04B 10/2575; H04N 7/17309; H04N 21/6118; H04N 21/6168
(Continued)

(56) References Cited

U.S. PATENT DOCUMENTS 5,742,583 A    4/1998  Scott
6,542,739 B1   4/2003  Garner
(Continued)

FOREIGN PATENT DOCUMENTS

CA    2643806 C     6/2013
CA    3097121 A1   10/2019
(Continued)

OTHER PUBLICATIONS

Deering, S., et al., "Internet Protocol, Version 6 (IPv6) Specification," Internet Engineering Task Force (IETF) RFC 2460, Dec. 1998, 39 pages.
(Continued)

*Primary Examiner* — Dibson J Sanchez
(74) *Attorney, Agent, or Firm* — Patent Beach PC

(57) ABSTRACT

Premises apparatus and methods for providing aggregated high-bandwidth, low-latency, data service over a content delivery network including existing wireline infrastructure. In one embodiment, a network architecture having service delivery over at least portions of extant hybrid fiber coax (HFC) infrastructure is disclosed, which includes standards-compliant ultra-low latency and high data rate services (e.g., 3GPP and IEEE Std. 802.11 services) via a common service provider. In one variant, an expanded frequency band (e.g., 1.6 GHz in total bandwidth) is used over the coaxial portions of the HFC infrastructure, which is allocated to two or more sub-bands. Premises apparatus are used to support multi-service integration (e.g., aggregation of mobile wireless,
(Continued)

premises, and other services), as well as incipient IoT applications and technologies.

20 Claims, 30 Drawing Sheets

(51) Int. Cl.
  *H04N 7/173* (2011.01)
  *H04N 21/61* (2011.01)
(52) U.S. Cl.
  CPC ..... *H04N 21/6118* (2013.01); *H04N 21/6168* (2013.01); *H04B 10/2575* (2013.01)
(58) Field of Classification Search
  USPC .................................. 398/43–103, 115–117
  See application file for complete search history.

(56) References Cited

U.S. PATENT DOCUMENTS

| | | |
|---|---|---|
| 7,266,726 B1 | 9/2007 | Ladd et al. |
| 7,366,286 B1 | 4/2008 | Shenoi |
| 7,581,012 B2 | 8/2009 | Shiouchi et al. |
| 7,592,912 B2 | 9/2009 | Hasek et al. |
| 7,602,820 B2 | 10/2009 | Helms et al. |
| 7,606,529 B1 | 10/2009 | Swan et al. |
| 7,698,606 B2 | 4/2010 | Ladd et al. |
| 8,024,607 B2 | 9/2011 | Ladd et al. |
| 8,046,636 B2 | 10/2011 | Ladd et al. |
| 8,095,610 B2 | 1/2012 | Gould et al. |
| 8,170,065 B2 | 5/2012 | Hasek et al. |
| 8,302,111 B2 | 10/2012 | Ladd et al. |
| 8,321,723 B2 | 11/2012 | Ladd et al. |
| 8,750,710 B1 | 6/2014 | Hirt et al. |
| 8,799,723 B2 | 8/2014 | Ladd et al. |
| 8,880,071 B2 | 11/2014 | Taaghol et al. |
| 8,997,136 B2 | 3/2015 | Brooks et al. |
| 9,185,341 B2 | 11/2015 | Hardin |
| 9,213,538 B1 | 12/2015 | Ladd et al. |
| 9,300,445 B2 | 3/2016 | Hardin |
| 9,414,111 B2 | 8/2016 | Hasek et al. |
| 9,472,091 B2 | 10/2016 | Stern et al. |
| 10,164,858 B2 | 12/2018 | Gunasekara et al. |
| 10,340,976 B2 | 7/2019 | Kakinada et al. |
| 10,405,192 B2 | 9/2019 | Kakinada et al. |
| 10,492,204 B2 | 11/2019 | Kakinada et al. |
| 10,536,859 B2 | 1/2020 | Gunasekara et al. |
| 10,693,687 B1 | 6/2020 | Kushnir |
| 10,742,270 B1 | 8/2020 | Kim |
| 10,924,825 B2 | 2/2021 | Das et al. |
| 11,190,861 B2 | 11/2021 | Bali |
| 11,432,284 B2 | 8/2022 | Hmimy et al. |
| 2004/0158649 A1 | 8/2004 | Ophir et al. |
| 2004/0187156 A1 | 9/2004 | Palm et al. |
| 2005/0034159 A1 | 2/2005 | Ophir et al. |
| 2005/0063317 A1 | 3/2005 | Risberg et al. |
| 2007/0022459 A1 | 1/2007 | Gaebel et al. |
| 2007/0094691 A1 | 4/2007 | Gazdzinski |
| 2008/0101291 A1 | 5/2008 | Jiang et al. |
| 2008/0235746 A1 | 9/2008 | Peters et al. |
| 2008/0279287 A1 | 11/2008 | Asahina |
| 2009/0110088 A1 | 4/2009 | Di Giandomenico et al. |
| 2009/0119735 A1 | 5/2009 | Dounaevski et al. |
| 2009/0217326 A1 | 8/2009 | Hasek |
| 2009/0253387 A1* | 10/2009 | Van Rensburg ......... H04B 7/10 455/90.2 |
| 2010/0064330 A1 | 3/2010 | Yu et al. |
| 2012/0076009 A1 | 3/2012 | Pasko |
| 2012/0083207 A1 | 4/2012 | Rofougaran et al. |
| 2012/0083225 A1* | 4/2012 | Rofougaran ........... H04B 7/024 455/88 |
| 2012/0195184 A1 | 8/2012 | Dapper et al. |
| 2013/0010686 A1 | 1/2013 | Shatzkamer et al. |
| 2013/0077554 A1 | 3/2013 | Gauvreau et al. |
| 2013/0156115 A1 | 6/2013 | Petrovic |
| 2013/0279914 A1 | 10/2013 | Brooks |
| 2013/0322504 A1 | 12/2013 | Asati et al. |
| 2014/0148107 A1 | 5/2014 | Maltsev et al. |
| 2014/0177610 A1* | 6/2014 | Kwentus ............... H04L 69/323 370/338 |
| 2014/0241239 A1* | 8/2014 | Chang .................... H04W 4/90 370/316 |
| 2015/0156777 A1 | 6/2015 | Negus et al. |
| 2015/0181363 A1 | 6/2015 | Khorami |
| 2015/0229584 A1 | 8/2015 | Okamoto et al. |
| 2016/0013855 A1 | 1/2016 | Campos et al. |
| 2016/0020835 A1 | 1/2016 | Stadelmeier et al. |
| 2016/0021595 A1 | 1/2016 | Czaja et al. |
| 2016/0073344 A1 | 3/2016 | Vutukuri et al. |
| 2016/0094421 A1 | 3/2016 | Bali et al. |
| 2016/0127434 A1 | 5/2016 | Yoon et al. |
| 2016/0128072 A1 | 5/2016 | Rajagopal et al. |
| 2016/0205679 A1 | 7/2016 | Yoo et al. |
| 2016/0259923 A1 | 9/2016 | Papa et al. |
| 2017/0093555 A1 | 3/2017 | Hamzeh et al. |
| 2017/0118527 A1 | 4/2017 | Wachob et al. |
| 2017/0164068 A1 | 6/2017 | Wachob et al. |
| 2017/0245281 A1 | 8/2017 | Zuckerman et al. |
| 2017/0257750 A1 | 9/2017 | Gunasekara et al. |
| 2018/0102828 A1* | 4/2018 | Ashworth .......... H04B 7/15535 |
| 2018/0115905 A1* | 4/2018 | Sirotkin ............... H04W 64/00 |
| 2018/0123749 A1* | 5/2018 | Azizi .................... H04L 5/0044 |
| 2018/0146408 A1 | 5/2018 | Meylan et al. |
| 2018/0167128 A1 | 6/2018 | Kinamon et al. |
| 2018/0184337 A1 | 6/2018 | Jin et al. |
| 2018/0213452 A1 | 7/2018 | Kim et al. |
| 2018/0242327 A1 | 8/2018 | Frenne et al. |
| 2018/0269974 A1 | 9/2018 | Luciano |
| 2018/0331935 A1 | 11/2018 | Ross et al. |
| 2018/0343685 A1 | 11/2018 | Hart et al. |
| 2018/0351809 A1 | 12/2018 | Meredith et al. |
| 2018/0352386 A1 | 12/2018 | Gunasekara et al. |
| 2019/0028141 A1 | 1/2019 | Padden et al. |
| 2019/0037630 A1 | 1/2019 | Zhang et al. |
| 2019/0109643 A1 | 4/2019 | Campos et al. |
| 2019/0124572 A1 | 4/2019 | Park et al. |
| 2019/0124696 A1 | 4/2019 | Islam et al. |
| 2019/0174359 A1* | 6/2019 | Hannan ................. H04W 72/53 |
| 2019/0229974 A1 | 7/2019 | Campos et al. |
| 2019/0289470 A1 | 9/2019 | Vaidya et al. |
| 2019/0319814 A1 | 10/2019 | Das |
| 2019/0319858 A1 | 10/2019 | Das et al. |
| 2019/0320250 A1 | 10/2019 | Hoole et al. |
| 2019/0320322 A1 | 10/2019 | Jayawardene et al. |
| 2019/0320494 A1 | 10/2019 | Jayawardene et al. |
| 2019/0334599 A1 | 10/2019 | Davydov |
| 2019/0379455 A1 | 12/2019 | Wang et al. |
| 2020/0029245 A1* | 1/2020 | Khoryaev ............. H04W 36/22 |
| 2020/0053545 A1 | 2/2020 | Wong et al. |
| 2020/0091608 A1 | 3/2020 | Alpman et al. |
| 2020/0112888 A1 | 4/2020 | Glennon et al. |
| 2020/0119877 A1 | 4/2020 | Wang et al. |
| 2020/0169049 A1* | 5/2020 | Chiu .................... H01R 24/76 |
| 2020/0214065 A1 | 7/2020 | Tomala et al. |
| 2021/0026711 A1 | 1/2021 | Ovadia et al. |
| 2021/0028915 A1 | 1/2021 | Jia et al. |
| 2021/0037447 A1* | 2/2021 | Tarighat Mehrabani ............... H04W 40/248 |
| 2021/0058796 A1* | 2/2021 | Gandhi ................. H04W 28/16 |
| 2021/0112551 A1 | 4/2021 | Anderson et al. |
| 2021/0120315 A1 | 4/2021 | Makinen et al. |
| 2021/0143893 A1* | 5/2021 | Taneja .................. H04W 28/26 |
| 2021/0168476 A1 | 6/2021 | Das et al. |
| 2021/0175925 A1 | 6/2021 | Tarighat Mehrabani |
| 2021/0176665 A1 | 6/2021 | Lan et al. |
| 2021/0226329 A1* | 7/2021 | Krishnamachari ...... H01Q 1/38 |
| 2021/0250196 A1 | 8/2021 | Das et al. |
| 2021/0289275 A1 | 9/2021 | Das |
| 2021/0337543 A1 | 10/2021 | Das et al. |
| 2021/0378039 A1 | 12/2021 | Cherian et al. |
| 2021/0409979 A1 | 12/2021 | Wang et al. |
| 2022/0039180 A1 | 2/2022 | Mukherjee et al. |

(56) References Cited

U.S. PATENT DOCUMENTS

| | | | |
|---|---|---|---|
| 2022/0078624 A1 | 3/2022 | Hong | |
| 2022/0132524 A1 | 4/2022 | Mueck et al. | |
| 2022/0240304 A1* | 7/2022 | Wang | H04W 28/16 |

FOREIGN PATENT DOCUMENTS

| | | |
|---|---|---|
| EP | 3782305 A1 | 2/2021 |
| EP | 3782435 A1 | 2/2021 |
| JP | 2006325206 A | 11/2006 |
| JP | 2016511998 A | 4/2016 |
| JP | 2018510589 A | 4/2018 |
| KR | 20160097917 A | 8/2016 |
| WO | WO-2004045125 A2 | 5/2004 |
| WO | WO-2015111767 A1 | 7/2015 |
| WO | WO-2015147707 A1 | 10/2015 |
| WO | WO-2019204166 A1 | 10/2019 |
| WO | WO-2019204336 A1 | 10/2019 |
| WO | WO-2020197452 A1 | 10/2020 |
| WO | WO-2020232461 A2 | 11/2020 |
| WO | WO-2021220624 A1 | 11/2021 |

OTHER PUBLICATIONS

FCC Consumer Guideline regarding signal leakage, printed Jan. 29, 2021 from https://www.fcc.gov/consumers/guides/cable-signal-leakage, 2 pages.

IEEE Std. 802.11 (1997), or related standards including 802.11 a/b/g/n/s/v/ac/ad/ax/ay/ba or 802.11-2012/2013, 802.11-2016, 459 pages.

"Internet Protocol, DARPA Internet Program, Protocol Specification", IETF RCF 791, Sep. 1981, 50 pages.

Signaling Protocols and Procedures for Citizens Broadband Radio Service (CBRS): Spectrum Access System, (SAS)—Citizens Broadband Radio Service Device (CBSD) Interface Technical Specification—Document WINNF-TS-0016, Version V1.2.1.3, Jan. 3, 2018, 60 pages.

Wi-Fi Direct, "Wi-Fi Peer-to-Peer (P2P) Specification," Wi-Fi Alliance, Version 1.5, 2014, 183 pages.

* cited by examiner

PREMISES APPARATUS AND METHODS FOR AGGREGATED HIGH-CAPACITY DATA SERVICES

PRIORITY AND RELATED APPLICATIONS

This application is a divisional of, and claims priority to, co-owned U.S. patent application Ser. No. 16/855,913 of the same title filed on Apr. 22, 2020, and issuing as U.S. Pat. No. 11,570,015 on Jan. 31, 2023, which is incorporated herein by reference in its entirety.

Additionally, this application is generally related to the subject matter of co-owned U.S. Provisional Patent Application Ser. No. 62/658,465 filed Apr. 16, 2018 and entitled "APPARATUS AND METHODS FOR INTEGRATED HIGH-CAPACITY DATA AND WIRELESS NETWORK SERVICES", which is now published as U.S. Patent Application Publication No. 2019/0320322 of the same title filed Dec. 11, 2018, each of which is incorporated herein by reference in its entirety.

This application is also generally related to the subject matter of co-owned and co-pending U.S. patent application Ser. No. 16/261,234 filed Jan. 29, 2019 and entitled "APPARATUS AND METHODS FOR ENABLING MOBILITY OF A USER DEVICE IN AN ENHANCED WIRELESS NETWORK," Ser. No. 16/384,706 filed Apr. 15, 2019 entitled "APPARATUS AND METHODS FOR COORDINATED DELIVERY OF MULTIPLE DATA CHANNELS OVER PHYSICAL MEDIUM," and issued as U.S. Pat. No. 11,026,004 on Jun. 1, 2021, Ser. No. 16/384,561 filed Apr. 15, 2019 entitled "APPARATUS AND METHODS FOR INTEGRATED HIGH-CAPACITY DATA AND WIRELESS IOT (INTERNET OF THINGS) SERVICES," and issued as U.S. Pat. No. 11,102,560 on Aug. 24, 2021, Ser. No. 16/384,805 filed Apr. 15, 2019 entitled "GATEWAY APPARATUS AND METHODS FOR WIRELESS IOT (INTERNET OF THINGS) SERVICES," and issued as U.S. Pat. No. 11,190,861 on Nov. 30, 2021, Ser. No. 16/384,701 filed Apr. 15, 2019 entitled "APPARATUS AND METHODS FOR ENHANCING QUALITY OF EXPERIENCE FOR OVER-THE-TOP DATA SERVICES OVER HIGH-CAPACITY WIRELESS NETWORKS," and issued as U.S. Pat. No. 10,924,825 on Feb. 16, 2021, Ser. No. 16/788,138 filed Feb. 11, 2020 and entitled "APPARATUS AND METHODS FOR PROVIDING HIGH-CAPACITY DATA SERVICES OVER A CONTENT DELIVERY NETWORK," and Ser. No. 16/855,747 filed on Apr. 22, 2020 and entitled "NODE APPARATUS AND METHODS FOR PROVIDING HIGH-CAPACITY DATA SERVICES VIA A CONTENT DELIVERY NETWORK ARCHITECTURE," each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of data networks and wireless devices, and specifically in one exemplary aspect to an architecture which provides aggregated and flexible high-speed data service in a content delivery network using, inter alia, wireless technology.

2. Description of Related Technology

Data communication services are now ubiquitous throughout user premises (e.g., home, office, and even vehicles). Such data communication services may be provided via a managed or unmanaged network. For instance, a typical home has services provided by one or more network service providers via a managed network such as a cable or satellite network. These services may include content delivery (e.g., linear television, on-demand content, personal or cloud DVR, "start over", etc.), as well as so-called "over the top" delivery of third-party content. Similarly, Internet and telephony access is also typically provided, and may be bundled with the aforementioned content delivery functions into subscription packages, which are increasingly becoming more user- or premises-specific in their construction and content. Such services are also increasingly attempting to adopt the paradigm of "anywhere, anytime", so that users (subscribers) can access the desired services (e.g., watching a movie) via a number of different receiving and rendering platforms, such as in different rooms of their houses, on their mobile devices while traveling, etc.

Additionally, so-called "OTT" or over-the-top services such as Amazon or Netflix subscriptions are utilized by many individuals, as are cellular wireless voice and data services (e.g., those provided by mobile network operators or MNOs).

Most users also maintain wireless access points (e.g., IEEE Std. 802.11 compliant) within their premises to enable a variety of functions including use of mobile devices to watch content or access the Internet, view premises security system data or video, and control household automation functions (e.g., via IoT technology).

Issues with Existing Architecture and Services

As user appetite for enhanced data rates, mobility and diversity of services has increased over time, service providers have sought new technologies and paradigms for service delivery to compensate. In the case of cable networks, only so much expansion or enhancement is possible under traditional technology models (e.g., use of 800 MHz of spectral bandwidth with limited upstream bandwidth, modulation schemes, DOCSIS protocols, etc.), and even where such enhancement is possible, significant capital and R&D (research and development) expenditures are required to upgrade or adapt these existing technologies and infrastructure to the new required levels of performance.

As a simple example of the foregoing, consider a multi-dwelling unit (MDU) served by an existing hybrid fiber coax (HFC) network topology (see discussion of FIGS. 1 and 2 below). The network will typically utilize optical fiber to deliver data to a network node, which then converts the optical domain data to RF (radio frequency) signals for transmission over the existing coaxial cable distribution network and to the served customers at the edge of the network (including the aforementioned MDU, which as most legacy structures, is internally wired with coaxial cable serving each individual dwelling unit therein, with the owner of the MDU retaining ownership of the cable installed by the multiple systems operator (MSO) and hence representing a "sunk cost" investment to the MSO). As customers demand increased levels of service (high data rates, more features, etc.) in order to maintain their loyalty/subscription in the face of competing services such as cellular data, fiber, satellite, etc., the cable MSO is often faced with the daunting prospect of upgrading the infrastructure serving such MDUs, which may include addition of fixed wireless access (FWA) infrastructure, replacing of miles of coaxial cable with optical fiber, and similar.

For instance, to achieve certain capacity targets (e.g., 10 Gbps) over such infrastructure, increased use of optical fiber is needed in certain parts of the infrastructure. Under current HFC network design, services are provided to users via a coaxial cable "drop" to their premises, and groups of such premises are served by common tap-off points or nodes within the larger architecture (see discussion of cable systems supra). Individual premises "tap off" the cabling or other infrastructure from each node and, depending on their geographic placement and other considerations, may require utilization of a number of different amplification units in order to maintain sufficient signal strength out to the most distant (topology-wise) premises in the system. For instance, a common description of how many amplifier stages are used between a source node and premises is "N+i", where i=the number of amplifier stages between the source node and the premises. For instance, N=0 refers to the situation where no amplifiers are used, and N+3 refers to use of three (3) amplifiers. In some extant cable/HFC systems in operation, values of i may be as high as seven (7); i.e., N+7, such as for service to rural areas.

As can be expected, use of such amplifier stages introduces some limitations on the data rates or bandwidth (both downstream—i.e., toward the client premises; and upstream—i.e., from the client premises) achievable by such systems. In effect, such systems are limited in maximum bandwidth/data rate, due in part to the design of the amplifiers; for example, they are typically designed to provide services primarily in the downstream direction (with much lower upstream bandwidth via so-called "OOB" or out-of-band RF channels providing highly limited upstream communication).

Cable modem or DOCSIS-compliant systems utilize DOCSIS QAMs (RF channels) for enhanced upstream bandwidth capability such as for Internet services, but even such technologies are in their current incarnations significantly limited in capability, and moreover have limited flexibility in the allocation of downstream versus upstream bandwidth, especially dynamically. For example, based on the DOCSIS protocols utilized for e.g., a coaxial infrastructure available in the aforementioned MDU served within a managed HFC network, throughput availability for downstream and upstream is in effect "hard-wired" based on how much of an available amount of spectrum is reserved for each direction. Because of this hard-wired availability, as well as the use of the aforementioned taps and amplifier stages, upstream throughput is limited in the foregoing HFC network.

As alluded to above, one way of achieving higher data rates may require replacement of such amplifier stages (and supporting coaxial cabling) with other mediums such as optical fiber (sometimes referred to as going "fiber deep", which can provide for example higher bandwidth, lower loss, and symmetric operation), microwave dishes at rooftop, and Ethernet cable (which can also provide symmetric operation), including going all the way back to an N+0 configuration throughout the entire network. However, replacement of literally tens of thousands of amplifiers and thousands of miles of cabling with optical fiber or the like is prohibitively expensive, and can take years.

Higher data rates may be achieved by implementation of DOCSIS 4.0 protocols; this version of the DOCSIS standard supports e.g., two (2) modes of use: (i) extended spectrum, without full duplex (which means separate allocation of downstream and upstream bandwidth, which can result in loss of capacity since the downstream and upstream bandwidth needs may not necessarily be static); and (ii) full duplex. Full duplex or symmetric DOCSIS 4.0, while providing significant enhancement over existing asymmetric DOCSIS systems, similarly requires significant capital investment and technology development, including relating to its supporting ecosystem (which in fact is one salient reason why the 4.0 standard also includes the first (i) mode described above, which in effect amounts to a legacy mode). The high implementation cost (including a long lead time) of continuous research and development for the newer developments in DOCSIS is moreover likely to persist, in part due to fragmented MSO selection of one of the aforementioned modes over the other.

Hence, replacing large portions of coaxial cable infrastructure with optical fiber, retrofitting to utilize the latest DOCSIS 4.0 technology, adding FWA for high-speed wireless backhaul, or other such upgrades to the existing MSO infrastructure represent (i) a huge CAPEX cost for the MSO (especially in dense urban environments with literally hundreds of closely spaced MDUs), and (ii) in some cases significant amounts of R&D for development of the necessary supporting ecosystem; these expenditures and development-induced latencies ideally would be at least partly avoided if somehow the extant HFC infrastructure could be enhanced or "repurposed" to include higher data rates, more symmetry between US and DS capability, and expanded types of services (such as mobility services).

Another issue to be addressed is the presence of delivered versus actual capacity "mismatch" with current systems. Even with delivery systems that currently provide a high degree of capability and symmetry (such as optical fiber), extant technologies for utilizing this delivered capacity symmetrically, and to its full capacity, are only now under development and not yet deployed. As such, even with a high US and DS capability available with e.g., optical fiber service, the end-user equipment such as 802.11ac routers can only utilize portions of this capability (and not nearly to its full capacity). Similarly, when considering a coaxial cable, it in theory can provide much higher data rates, and symmetrically, than current delivery paradigms such as DOCSIS 3.1 used by cable modems, and in-band 6 MHz channels (DS) used by DTSBs can provide. Hence, stated simply, the large existing inventory of coaxial cable is physically capable of much better performance than current protocols and end-user components can support.

Yet another issue facing service providers including cable MSOs is service fragmentation. Generally speaking, the average consumer (whether residential, enterprise, or other) maintains multiple separate service providers for different data/telecommunications/content services. For example a typical user might have a cellular subscription (e.g., via 3GPP LTE technology) with an MNO, cable television and high-speed broadband data subscriptions with an MSO, a security monitoring service or subscription with a third party provider, and so forth. IoT (Internet of Things) services or interconnectivity is also generally fragmented, typically relying on proprietary or different protocols, gateways, etc. for interconnectivity to other networks and devices The foregoing services are often not integrated or logically unified, and may require subscription to and use of multiple service provider technologies and infrastructure. For example, unlicensed WLAN APs within a user premises may be backhauled by a cable or fiber or satellite MSO, while cellular service is provided by a wholly separate MNO using licensed cellular infrastructure or via a femto/pico-cell at the end of the pipe between the MSO backhaul and CPE, which provides only a limited amount of capacity for cellular use.

Additionally, with increasing demand for coverage by broadband networking services, such as those delivered via use of unlicensed or quasi-licensed spectrum (such as e.g., CBRS, C-Band, 5G NR-U, etc.), there is an increasing amount of wireless equipment that is being deployed for servicing such demand. One way in which broadband wireless services are provided, including at network edges (e.g., in rural areas), is by use of CBRS Fixed Wireless Access (FWA) devices. FWA devices are basically pole- or building-mounted antennae and receivers which allow premises (including those of individual customers or subscribers) to receive broadband services via wireless links. Such FWA devices are particularly useful in areas where other more typical mechanisms for delivery of broadband services such as coaxial cable or optical fiber are unavailable. For instance, in rural areas, no cable or fiber may be located proximate to a given premises, and hence the user must rely on either a cellular or satellite service provider (if such coverage exists), which are each non-optimal for a variety of reasons. In contrast, use of unlicensed or quasi-licensed spectrum in such applications provides a high level of performance (data rates) and relative ease of use for the subscriber.

However, to service such individual premises FWA or similar installations, one or more "base stations" are required. In the exemplary context of CBRS, so-called CBSDs (Citizens Broadband Radio Service Device) act as base stations or access devices that serve individual FWAs of subscribers. These CBSDs are placed, similar to base stations for cellular systems, at locations advantageous to serve large numbers of subscribers; e.g., on top of or on facades of buildings, on hilltops, on towers, etc. These CBSDs must be "backhauled" to the service provider's network, such as via a fiber drop, DOCSIS cable drop, or the like.

Likewise, so-called "small cells" or femtocells are small cellular base stations which can provide additional coverage in areas e.g., where cellular coverage is otherwise poor or non-existent (including for instance indoors where cellular signals may not penetrate or penetrate effectively. Small cells/femtocells are typically of very low power relative to a traditional cellular bases station (e.g., 3GPP eNB or gNB), or even a CBSD.

In that both small cells and CBSDs must be backhauled to provide connectivity to their larger networks, and the placement of such devices may be largely unpredictable and driven by demand versus traditional cellular cell planning (including into areas not served well by high-bandwidth backhaul mechanisms), apparatus and techniques for flexibly and "reconfigurably" providing high-bandwidth backhaul services for small cells or CBSDs or similar devices are needed. This need is especially salient in light of rapidly increasing demand for such wireless services, and general lack of specialized infrastructure in such areas to support these capabilities. Thus, approaches which make use of already existing infrastructure (thereby reducing service provider CAPEX and delays associated with building out such dedicated infrastructure) are also highly desirable.

Accordingly, improved apparatus and methods for premises equipment are needed to, inter alia, enable optimized delivery of ultra-high data rate services (both wired and wireless) symmetrically, and which leverage extant network infrastructure such as the large inventory of installed coaxial cable and supporting infrastructure in both MSO networks and the premises they serve. Ideally, such improved apparatus and methods would also support user multi-service integration (e.g., aggregation of mobile wireless, premises, and other services), and support incipient IoT applications and technologies, as well as cellular or other wireless small cells or even larger infrastructure base stations such as e.g., CBRS CBSDs.

SUMMARY

The present disclosure addresses the foregoing needs by providing, inter alia, node apparatus and methods for delivering ultra-high data rate services (both wired and wireless) by leveraging extant network infrastructure via e.g., new wireless technology capabilities.

In a first aspect of the disclosure, a method of obtaining broadband data services via a coaxial cable infrastructure is described. In one embodiment, the method includes: receiving one or more RF signals via the coaxial cable infrastructure, the received one or more signals having been transmitted on the coaxial cable infrastructure using at least one frequency band; up-converting the received one or more RF signals to one or more user bands, the one or more user bands associated with the one or more processing modules; processing the received and up-converted one or more RF signals to produce baseband data; and providing at least a portion of the baseband data to at least one premises device associated.

In one variant, the at least one frequency band is wider in frequency range than an operating band of the coaxial cable infrastructure when used for traditional cable operations. For example, the at least one frequency band may comprise a band at least 1200 MHz in width, and have a first sub-band at least 600 MHz in width, and a second sub-band at least 600 MHz in width.

In another variant, the first sub-band and the second sub-band are configured for use in either upstream (US) or downstream (DS) directions, and the method further includes dynamically reallocating at least portions of at least one of the first sub-band or second sub-band between said US or DS directions.

In yet another variant, the up-converting to one or more user bands includes up-converting to at least one IEEE-Std. 802.11ax user frequency band; and the processing includes processing the up-converted one or more RF signals using an IEEE Std. 802.11ax compliant integrated circuit (IC) apparatus.

In a further variant, the method further includes: receiving one or more second RF signals via the coaxial cable infrastructure, the received one or more second signals having been transmitted on the coaxial cable infrastructure using at least one second frequency band and comprising 3GPP (Third Generation Partnership Project) Long Term Evolution (LTE) or 5G New Radio (NR) compliant waveforms; up-converting the received one or more second signals to one or more 3GPP LTE or 5G NR bands; and transmitting the up-converted received one or more second signals within the one or more 3GPP bands.

In another variant, the method further includes: receiving one or more second RF signals via the coaxial cable infrastructure, the received one or more second signals having been transmitted on the coaxial cable infrastructure using at least one second frequency band and comprising 3GPP (Third Generation Partnership Project) Long Term Evolution (LTE) or 5G New Radio (NR) compliant waveforms; up-converting the received one or more second signals to one or more Citizens Broadband Radio Service (CBRS) frequency bands; and transmitting the up-converted received one or more second signals within the one or more CBRS bands.

In another aspect of the disclosure, user premises apparatus for use within a coaxial cable network is described. In one embodiment, the user premises apparatus includes: a first port for interfacing with the coaxial cable network for receipt of radio frequency (RF) signals; first frequency shifter apparatus configured to up-convert at least a first portion of the received signals to a first prescribed frequency band; second frequency shifter apparatus configured to up-convert at least a second portion of the received signals to a second prescribed frequency band; at least one RF integrated circuit (IC) configured to at least receive signals within the first prescribed frequency band and process the received signals to generate baseband data packets consistent with a data networking protocol; and antenna apparatus in signal communication with the second frequency shifter apparatus, the antenna apparatus configured to at least transmit the up-converted at least second portion of the signals.

In one variant, the first prescribed frequency band includes an IEEE Std. 802.11ax user band disposed between 5 Ghz and 6 GHz, and the second prescribed frequency band includes a 3GPP unlicensed frequency band.

In another variant, the first prescribed frequency band includes an IEEE Std. 802.11ax user band disposed between 5 Ghz and 6 GHz, and the second prescribed frequency band includes a CBRS quasi-licensed frequency band comprising one of GAA (general authorized access) or PAL (priority access license) spectrum within the frequency band comprising 3.550 GHz to 3.700 GHz.

In a further variant, the user premises apparatus further includes amplification logic in communication with the first port and configured to amplify at least portions of the RF signals received via the first port; and switch apparatus configured to selectively switch the up-converted at least first portion of the received signals to at least two ports of the RF IC.

In one implementation, the switch apparatus includes at least one Butler matrix switch apparatus.

In another variant, the user premises apparatus further includes: at least one ISM (Instrumentation, Scientific, Medical) band receiver in signal communication with the port first port; and controller logic in communication with the at least one ISM band receiver and configured to control the switch apparatus, the control of the switch apparatus based at least in part on control data received via the ISM receiver and the coaxial cable network.

In another variant, the user premises apparatus further includes: personal area network (PAN) transceiver apparatus in data communication with the at least one RF IC, the PAN transceiver apparatus configured to transact baseband data with the at least one RF IC for transmission of IoT (internet of Things) data upstream via at least the RF IC to a corresponding RF IC at a node of the coaxial cable network serving the user premises apparatus.

In another aspect, a simplified or reduced-complexity user premises apparatus is disclosed. In one embodiment the simplified apparatus includes a single 802.11ax chipset coupled to DS/US frequency shifter apparatus. In one variant, the 802.11ax chipset can produce both local (WLAN) waveforms and waveforms for transmission on the coaxial cable (as well as reception of each).

In another aspect of the disclosure, a method of providing a small cell wireless service via coaxial cable infrastructure is described. In one embodiment, the method includes: receiving one or more radio frequency (RF) signals at a user premises device in communication with the coaxial cable infrastructure, the one or more radio frequency (RF) signals received via the coaxial cable infrastructure; converting the received one or more RF signals to one or more cellular RF domain signals via a frequency shifter apparatus of the premises device; and transmitting the one or more cellular RF domain signals to a user apparatus within a wireless range of the premises via one or more antenna apparatus of the premises device.

In one variant of the method, the receiving the one or more radio frequency (RF) signals via the coaxial cable infrastructure includes receiving the one or more RF signals transmitted from a node apparatus within a prescribed frequency band, the one or more RF signals having been down-converted to the prescribed frequency band from a cellular frequency band prior to transmission to the user premises device.

In another aspect of the disclosure, a method of providing redundancy in data communication via a coaxial cable infrastructure is disclosed. In one embodiment, the method includes: transmitting first signals via a first cable radio frequency (RF) band over a first cable path of the coaxial cable infrastructure; transmitting second signals via a second cable RF band over a second cable path of the coaxial cable infrastructure; processing at least one of the transmitted first and the second signals at a common node; and transmitting the processed signals to premises equipment associated with the common node.

In one variant of the method, the transmitting first signals via the first cable radio frequency (RF) band over the first cable path of the coaxial cable infrastructure includes transmitting the first signals in a first radio frequency (RF) band that can be supported by the first cable path; the transmitting second signals via the second cable radio frequency (RF) band over the second cable path of the coaxial cable infrastructure includes transmitting the second signals in a second radio frequency (RF) band that can be supported by the second cable path, the second band not overlapping the first band in frequency; and the processing at least one of the transmitted first and second signals at a common node includes combining the first and second signals at the common node. In one implementation thereof, the transmitting the processed signals to premises equipment associated with the common node includes transmitting the combined first and second signals to an RF premises apparatus via a coaxial cable.

In another variant, the method further includes distributing the combined first and second signals via at least the premises equipment to a plurality of users of the premises, the plurality of users having a number greater than a number of users supportable via use of either the first or second cable path alone.

In yet another variant, the transmitting first signals via the first cable radio frequency (RF) band over the first cable path of the coaxial cable infrastructure includes transmitting the first signals in a first radio frequency (RF) band that can be supported by the first cable path; the transmitting second signals via the second cable radio frequency (RF) band over the second cable path of the coaxial cable infrastructure includes transmitting the second signals in the first radio frequency (RF) band, the second signals only transmitted during an absence of the first signals; and the processing at least one of the transmitted first and second signals at a common node includes selecting an available one or the other of the first and second signals at the common node. In one implementation thereof, the transmitting the processed signals to premises equipment associated with the common node includes transmitting the selected first or second signals to an RF premises apparatus via a coaxial cable.

In another implementation, the method further includes detecting a failure of a first distribution node in signal communication with and which supports the first cable path; and based at least on the detecting, cause said transmitting of the second signals.

In a further aspect of the disclosure, methods and apparatus for reallocating frequency spectrum within a coaxial cable network topology are disclosed. In one embodiment, the methods and apparatus are configured to reallocate spectrum based on direction of traversal within the network (e.g., US or DS). In another embodiment, the methods and apparatus are configured to reallocate based on failure of one or more components within a multi-path coaxial cable topology.

In another aspect, a frequency plan for use on a hybrid fiber/optical network is disclosed. In one embodiment, the frequency plan includes a total available spectrum of greater than 1 GHz (e.g., approximately 1.6 GHz in total), with high-speed symmetric US and DS capability, as well as utilization of portions of the available spectrum for cellular (e.g., 3GPP 4G or 5G) service, and for ISM-band (e.g., 900 MHz) communications. In one variant, the extant capability of IEEE Std. 802.11ax devices (e.g., chipsets) for 160 MHz channel bandwidth is used to generate two approximately 640 MHZ-wide sub-bands each with four (4) 160 MHz channels which can be independent allocated to different users, and to different delivery directions (i.e., US or DS).

In one variant, the plan includes frequency assets that are allocated to or divided up among two or more discrete user premises device or CPE apparatus. For example, in one implementation, multiple CPE apparatus are used, each with cellular, high-speed symmetric US/DS, and ISM band capability. In one configuration, all but the ISM band capability is non-overlapping between the CPE. In another variant, the various CPE utilize specifically allocated sub-bands for at least some of the US/DS communication with nodes apparatus upstream therefrom.

In a further aspect, apparatus and methods for delivering mobility service through an extant network infrastructure without interfering with broadband data service are disclosed.

In yet an additional aspect, apparatus and methods for utilization of technology adapted for a first wireless paradigm to a wired paradigm (e.g., WLAN 802.11ax technology onto an extant HFC network infrastructure) are disclosed.

In another aspect, apparatus and methods for enabling transmission of cellular technology (e.g., 4G-LTE/5G-NR) with unlicensed (e.g., NR-U, LTE-LAA, or LTE-U) or quasi-licensed spectrum (e.g., CBRS) are disclosed.

In another aspect, base station apparatus is disclosed. In one embodiment, the base station apparatus is backhauled by a coaxial cable network and includes a transceiver device configured to exchange signals with one or more upstream node apparatus within prescribed frequency bands. In one variant, the prescribed frequency bands are between 85 and 1600 MHz. In another variant, the prescribed bands are below 85 MHz.

In one implementation, the base station apparatus includes an 802.11ax chipset for processing user-band signals up-converted from the prescribed frequency band signals, and generating baseband data for use by a cellular chipset of the base station.

In another implementation, wireless protocol waveforms from a cellular chipset in a serving node are transmitted within the prescribed band(s), and the base station up-converts these waveforms and transmits them over its antennae without requiring a corresponding cellular chipset.

In one configuration, the bases station is configured as a CBRS CBSD.

In a further aspect, apparatus and methods for providing local WLAN AP functionality via a user premises device is disclosed. In one embodiment, the apparatus and methods utilize a secondary band of wireless chipset capability (e.g., 2.4 GHz for WLAN) for providing the local capability via antenna mounted on the premises device.

In another aspect, methods of retaining value of an MSO infrastructure investment are disclosed. In one embodiment, the methods include repurposing uses of an existing coaxial cable installed base (such as in an MDU) so as to extend its useable lifetime and at least delay (if not obviate) its replacement.

In a further aspect, apparatus and methods for shifting a frequency of LBT signal are disclosed.

In yet an additional aspect, apparatus and methods for shifting a frequency of TDD signal are disclosed.

In an additional aspect, apparatus and methods for shifting frequency of an FDD signal are disclosed.

In an additional aspect, apparatus and methods for splitting and combining power and signals onto a coaxial cable are disclosed.

In a further aspect, apparatus and methods for communicating with an external cellular source are disclosed.

In another aspect, apparatus and methods for providing Wi-Fi AP service are disclosed.

In another aspect, apparatus and methods for using a controlling entity to control a switch for mapping inputs of signals from a Wi-Fi AP onto ports of a Wi-Fi STA, or vice versa, are disclosed.

In yet an additional aspect, a network architecture implementing one or more of the foregoing aspects of the disclosure are disclosed.

In yet an additional aspect, a software architecture implementing one or more of the foregoing aspects of the disclosure are disclosed.

In a further aspect, a frequency shifting architecture is disclosed. In one embodiment, the architecture includes a plurality of frequency shifters to accommodate two or more different multiple access schemes and associated frequency bands. In one variant, a first set of shifters is utilized in conjunction with an 802.11 chipset (operating via LBT and/or CSMA/CD protocols), while a second set of shifters is used in conjunction with a 3GPP chipset (operating via FDD or TDD protocols).

In another aspect, methods and apparatus for controlling two or more client devices so as to enable utilization of a common bearer medium is disclosed. In one embodiment, the methods and apparatus include use of a controller entity which coordinates switching components within the respective client devices so as to access waveforms associated with different spatial diversity channels encoded on a coaxial cable bearer so as to optimize data rates to each of the different client devices.

In another aspect, an optical to coaxial cable transducer that can transmit and receive IEEE Std. 802.11 and 3GPP 4G LTE and 5G NR waveforms to multiple CPE through a single coaxial cable is disclosed.

In still a further aspect of the disclosure, a method for providing ad hoc mobile device broadband is described. In one embodiment, the method includes providing wireless coverage via one or more user premises devices.

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device includes a multi-logic block FPGA device.

In a further aspect, Butler matrix switching apparatus useful in an RF user premises device is disclosed.

In another aspect, a computer readable storage apparatus implementing one or more of the foregoing aspects is disclosed and described. In one embodiment, the computer readable apparatus includes a program memory, or an EEPROM. In another embodiment, the apparatus includes a solid state drive (SSD) or other mass storage device. In another embodiment, the apparatus includes a USB or other "flash drive" or other such portable removable storage device. In yet another embodiment, the apparatus includes a "cloud" (network) based storage device which is remote from yet accessible via a computerized user or client electronic device. In yet another embodiment, the apparatus includes a "fog" (network) based storage device which is distributed across multiple nodes of varying proximity and accessible via a computerized user or client electronic device.

In a further aspect, an optical-to-coaxial cable transducer that can transmit and receive 3GPP 4G LTE and 5G NR waveforms to multiple CPE through a single coaxial cable interface is disclosed.

In a further aspect, a method of introducing expanded data network services within a network infrastructure are disclosed. In one embodiment, the network includes an HFC cable network.

These and other aspects shall become apparent when considered in light of the disclosure provided herein.

Figure 1A:
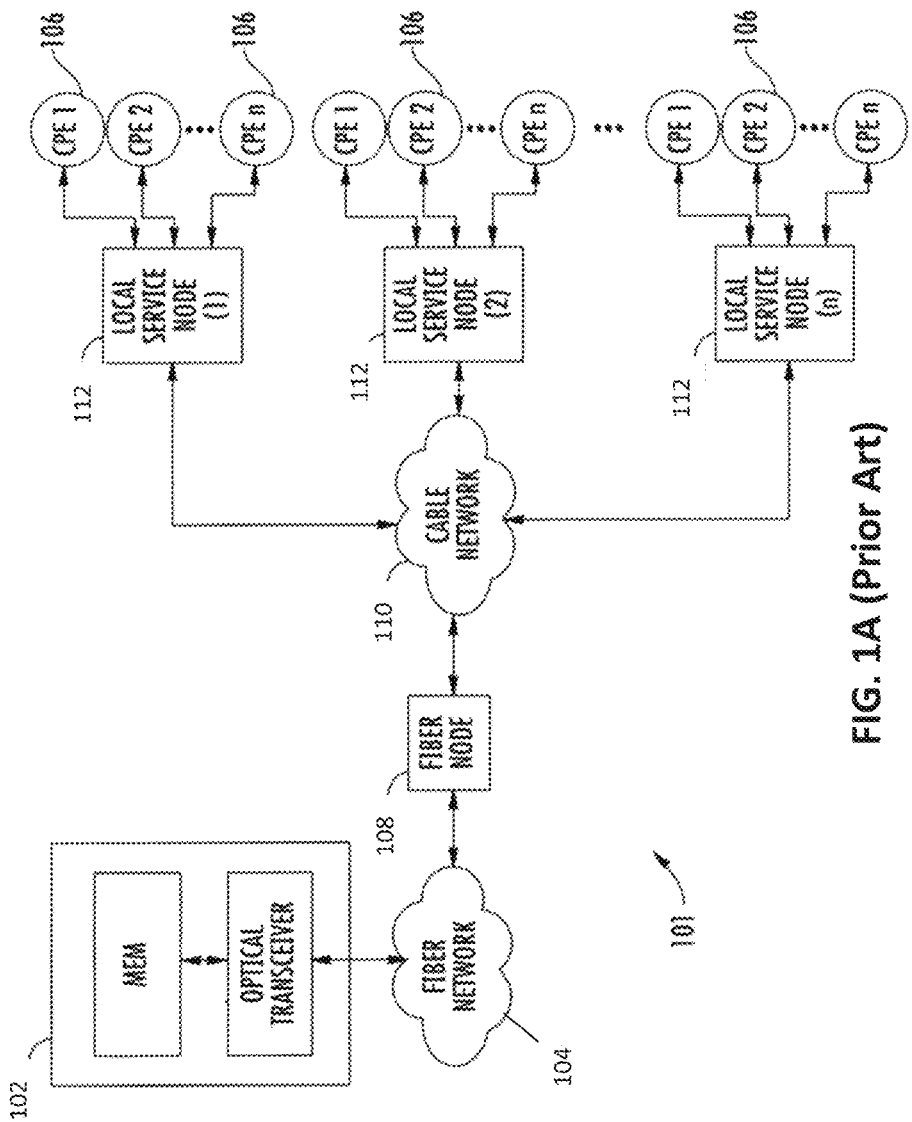
FIGS. 1A and 1B are functional block diagrams illustrating a typical prior art managed (e.g., HFC cable) content delivery network architecture.

All Figures© Copyright 2019-2020 Charter Communications Operating, LLC. All rights reserved.

DETAILED DESCRIPTION

Reference is now made to the drawings wherein like numerals refer to like parts throughout.

As used herein, the term "access node" refers generally and without limitation to a network node which enables communication between a user or client device and another entity within a network, such as for example a CBRS CBSD, a cellular xNB, a Wi-Fi AP, or a Wi-Fi-Direct enabled client or other device acting as a Group Owner (GO).

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "CBRS" refers without limitation to the CBRS architecture and protocols described in *Signaling Protocols and Procedures for Citizens Broadband Radio Service (CBRS): Spectrum Access System (SAS)—Citizens Broadband Radio Service Device (CBSD) Interface Technical Specification*—Document WINNF-TS-0016, Version V1.2.1. 3, January 2018, incorporated herein by reference in its entirety, and any related documents or subsequent versions thereof.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOCSIS" refers to any of the existing or planned variants of the Data Over Cable Services Interface Specification, including for example DOCSIS versions 1.0, 1.1, 2.0, 3.0, 3.1 and 4.0.

As used herein, the term "headend" or "backend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), and 4G/4.5G LTE.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, 5G NR, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein the terms "5G" and "New Radio (NR)" refer without limitation to apparatus, methods or systems compliant with 3GPP Release 15, and any modifications, subsequent Releases, or amendments or supplements thereto which are directed to New Radio technology, whether licensed or unlicensed.

As used herein, the term "QAM" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "SAS (Spectrum Access System)" refers without limitation to one or more SAS entities which may be compliant with FCC Part 96 rules and certified for such purpose, including (i) Federal SAS (FSAS), (ii) Commercial SAS (e.g., those operated by private companies or entities), and (iii) other forms of SAS.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "users" may include without limitation end users (e.g., individuals, whether subscribers of the MSO network, the MNO network, or other), the receiving and distribution equipment or infrastructure such as a FWA/CPE or CBSD, venue operators, third party service providers, or even entities within the MSO itself (e.g., a particular department, system or processing entity).

As used herein, the term "Wi-Fi" refers to, without limitation and as applicable, any of the variants of IEEE Std. 802.11 or related standards including 802.11 a/b/g/n/s/v/ac/ad/ax/ba or 802.11-2012/2013, 802.11-2016, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3GPP/3GPP2, HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, 5G NR, LoRa, IoT-NB, SigFox, analog cellular, CDPD, satellite systems, millimeter wave or microwave systems, acoustic, and infrared (i.e., IrDA).

As used herein, the term "xNB" refers to any 3GPP-compliant node including without limitation eNBs (eU-TRAN) and gNBs (5G NR).

Overview

In one exemplary aspect, the present disclosure provides improved architectures, methods and apparatus of premises equipment (e.g., CPE) for providing enhanced ultra-high data rate services which, inter alia, leverage existing managed network (e.g., cable network) infrastructure. Advantageously, the disclosed architectural components (nodes, amplifiers and counterpart CPE) can be utilized in a variety of topologies, with network nodes disposed so as to support multiple downstream CPE including e.g., wherever an optical waveform is to be converted to a signal to be transmitted via coaxial cable. For instance, in one configuration, a node may be used further back towards the service provider core, such as to support a number of individual customer premises (e.g., homes) served by coaxial cable infrastructure. In another configuration, the node may be used at the very edge of the network to service a number of customers within a residential multi-dwelling unit or MDU (e.g., apartment building or condominium complex), that is wired with coaxial cable yet served by a proximate fiber drop (e.g., FTTC). Further, other exemplary configurations can support various types of use cases (including premises-specific ones) such as e.g., providing an indoor or outdoor small cell service, backhaul of base stations such as CBRS CBSDs, a distributed antenna system (DAS) for an enterprise or campus premises, a venue-specific DAS, and additional reliability through redundancy. Still, numerous other configurations are possible.

In one embodiment of the architecture, a Hybrid Fiber Coax (HFC) plant infrastructure and 802.11ax (colloquially termed "Wi-Fi 6") protocols are used as bases for provision of standards-compliant ultra-low latency and high data rate services (e.g., with capabilities associated with 3GPP 4G and 5G, and IEEE Std. 802.11 services based on 802.11ax technology). These services may include symmetric or asymmetric US and DS bandwidth which can be dynamically allocated, flexible scheduling of data to e.g., prioritize real-time data over non-real-time data), and support of cellular, WLAN and PAN (e.g., IoT) services, all via a common service provider. The exemplary use of Wi-Fi 6 technology provides not only the capability for symmetric operation of downstream (DS) and upstream (US) transmissions but also a symmetric capacity, which may not be possible with e.g., use of an 802.11ac router backhauled by DOCSIS.

In one variant, an expanded frequency band (approximately 1.6 GHz in total bandwidth) is used over the coaxial portions of the HFC infrastructure. This expanded band is allocated to two or more primary data sub-bands, as well as to ISM and cellular uses. Wideband amplifier apparatus are used to support DS and US utilization of the sub-bands within the network, including by premises devices via re-use of coaxial infrastructure. This allows the entity that installed such coaxial infrastructure to maintain its footprint in its customer's premises and continue to provide additional services without laying any significant amounts of optical fiber or other such alternate solutions.

In another variant, the use of 802.11ax APs for delivery of ultra-high data rate services allow e.g., 4.8 Gbps data rate services, which can allow for example two (2) users to take advantage of 2.4 Gbps data rate in parallel (instead of allowing one (1) user to get all of 4.8 Gbps due to silicon limitation). In another variant, a plurality of access and modulation scheme, such as an OFDM and TDD/FDD/LBT-based scheme is used to allow for maximal efficiency and flexibility in allocating bandwidth to downstream and upstream transmissions over the HFC infrastructure.

Moreover, latency within the disclosed infrastructure is reduced by, inter alia, obviating encapsulation and other network/transport protocols normally necessitated through use of e.g., DOCSIS bearers and equipment (i.e., DOCSIS modems and CMTS apparatus within the MSO core.

Using Wi-Fi protocols such as 802.11ax through HFC also enables broadband service benefits stemming from the rich feature set, vendor diversity and operational reliability that Wi-Fi ecosystem (which is being innovated at a high frequency) has already developed for a multitude of users of Wi-Fi technology in various devices. Furthermore, the exemplary embodiments can help streamline the delivery of broadband services (including increased service velocity) and the roadmap for service improvement by aligning the technology used to deliver broadband data to the customers' premises with the technology used by customers to consume the broadband data (e.g., Wi-Fi).

The improved architecture also advantageously facilitates mobility support by re-purposing one or more spectrum (e.g., 5-85 MHz) typically used as upstream spectrum for DOCSIS for cellular signal extension and distribution (including both at the intermediary network nodes and the end-user's CPE).

By incorporating at least Wi-Fi and 3GPP technologies, the premises equipment of the present disclosure facilitates user multi-service integration (e.g., aggregation of mobile wireless, premises, and other services), and supports incipient IoT applications and technologies.

DETAILED DESCRIPTION OF EXEMPLARY EMBODIMENTS

Exemplary embodiments of the apparatus and methods of the present disclosure are now described in detail. While these exemplary embodiments are described in the context of the previously mentioned HFC cable system adapted for use with 802.11ax and 3GPP technology, and network nodes and CPE associated with or supported at least in part by a managed network of a service provider (e.g., MSO), other types of radio access technologies ("RATs"), and other types of networks and architectures that are configured to deliver digital data (e.g., text, images, games, software applications, video and/or audio) may be used consistent with the present disclosure. Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed service area, venue, or other type of premises), the present disclosure may be readily adapted to other types of environments including, e.g., commercial/retail, or enterprise domain (e.g., businesses), or even governmental uses.

Additionally, while described primarily with reference to exemplary architectures and components set forth in co-owned and co-pending U.S. patent application Ser. No. 16/788,138 filed Feb. 11, 2020 and entitled "APPARATUS AND METHODS FOR PROVIDING HIGH-CAPACITY DATA SERVICES OVER A CONTENT DELIVERY NETWORK," and Ser. No. 16/855,747 filed contemporaneously herewith on Apr. 22, 2020 and entitled "NODE APPARATUS AND METHODS FOR PROVIDING HIGH-CAPACITY DATA SERVICES VIA A CONTENT DELIVERY NETWORK ARCHITECTURE," each previously incorporated herein by reference in its entirety, the methods and apparatus of the present disclosure are not so limited, and in fact may adapted for use with other architectures and components by one of ordinary skill when given the present disclosure.

Also, while certain aspects are described primarily in the context of the well-known Internet Protocol (described in, inter alia, *Internet Protocol DARPA Internet Program Protocol Specification*, IETF RCF 791 (September 1981) and Deering et al., *Internet Protocol, Version 6 (IPv6) Specification*, IETF RFC 2460 (December 1998), each of which is incorporated herein by reference in its entirety), it will be appreciated that the present disclosure may utilize other types of protocols (and in fact bearer networks to include other internets and intranets) to implement the described functionality.

Other features and advantages of the present disclosure will immediately be recognized by persons of ordinary skill in the art with reference to the attached drawings and detailed description of exemplary embodiments as given below.

Exemplary Network Architecture

As a preliminary matter, it is useful to understand extant cable system topology and operation so that the various aspects of the present disclosure may be more clearly distinguished and contrasted.

Figure 1B:
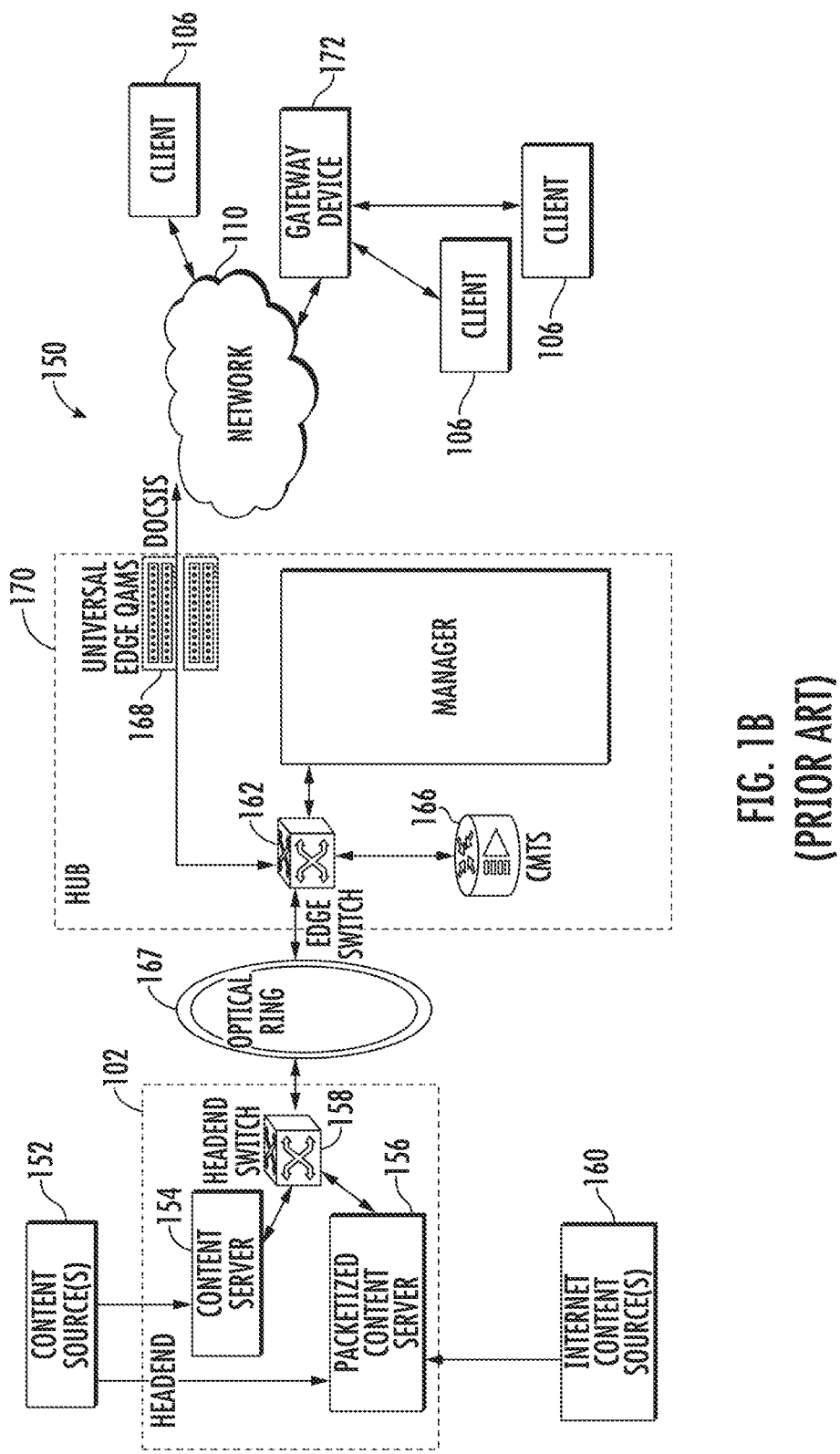
Figure 2:
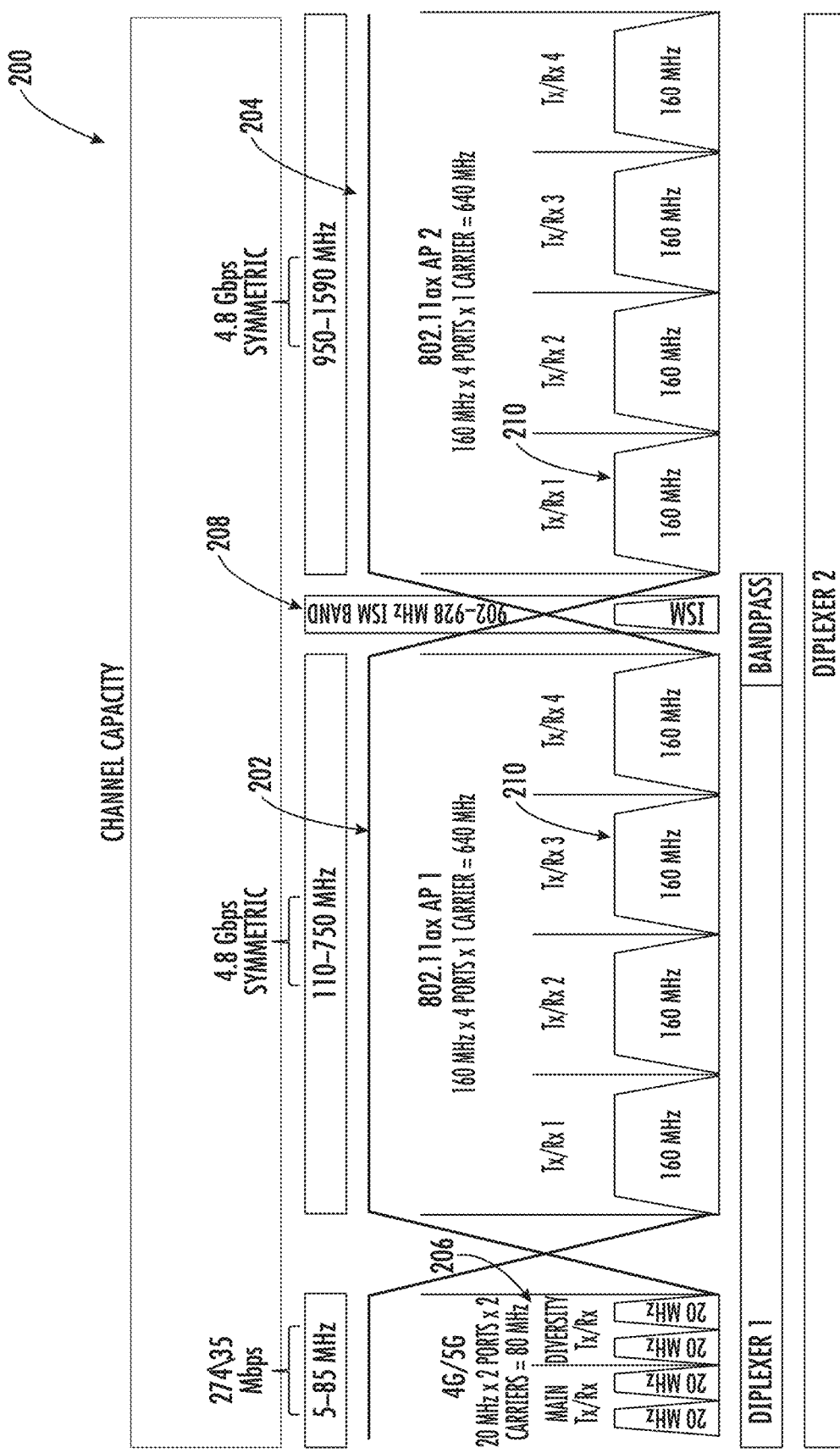
FIG. 2 is a graphical representation of an exemplary frequency band functional assignment according to one embodiment of the present disclosure.

Under existing paradigms, network operators deliver data services (e.g., broadband) and video products to customers using a variety of different devices, thereby enabling their users or subscribers to access data/content in a number of different contexts, both fixed (e.g., at their residence) and mobile (such as while traveling or away from home). FIGS. 1 and 2 are functional block diagrams illustrating a typical prior art managed (e.g., HFC) content delivery network architecture used to provide such data services.

In such networks, data/content delivery may be specific to the network operator, such as where video content is ingested by the network operator or its proxy, and delivered to the network users or subscribers as a product or service of the network operator. For instance, a cable multiple systems operator (MSO) may ingest content from multiple different sources (e.g., national networks, content aggregators, etc.), process the ingested content, and deliver it to the MSO subscribers via their hybrid fiber coax (HFC) cable/fiber network, such as to the subscriber's set-top box or DOCSIS cable modem. Such ingested content is transcoded to the necessary format as required (e.g., MPEG-2 or MPEG-4/AVC), framed and placed in the appropriate media container format ("packaged"), transmitted via e.g., statistical multiplex into a multi-program transport stream (MPTS) on 6 MHz radio frequency (RF) channels for receipt by the subscribers via RF tuners, de-multiplexed and decoded, and rendered on the users' rendering devices (e.g., digital TV) according to the prescribed coding format.

Within the cable plant, VOD and so-called switched digital video (SDV) may also be used to provide content, and via utilization of a single-program transport stream (SPTS) delivery modality. In U.S. cable systems for example, downstream RF channels used for transmission of television programs are 6 MHz wide, and occupy a multitude of 6-MHz spectral slots between 54 MHz and 860 MHz. Upstream and "out of band" communications are normally relegated to the lower end of the available spectrum, such as between 5 and 85 MHz. Deployments of VOD services have to share this spectrum with already established analog and digital cable television services such as those described above. Within a given cable plant, all homes that are electrically connected to the same cable feed running through a neighborhood will receive the same downstream signal. For the purpose of managing e.g., VOD services, these homes are grouped into logical groups typically called Service Groups. Homes belonging to the same Service Group receive their VOD service on the same set of RF channels.

VOD service is typically offered over a given number (e.g., 4) of RF channels from the available spectrum in cable. Thus, a VOD Service Group consists of homes receiving VOD signals over the same 4 RF channels.

In most cable networks, programs are transmitted using MPEG (e.g., MPEG-2) audio/video compression. Since cable signals are transmitted using a Quadrature Amplitude Modulation (QAM) scheme, available payload bitrate for typical modulation rates (e.g., QAM-256) used on HFC systems is roughly 38 Mbps. For example, in many VOD deployments, a typical rate of 3.75 Mbps is used to send one video program at resolution and quality equivalent to NTSC broadcast signals. In digital television terminology, this is called Standard Definition (SD) television resolution. Therefore, use of MPEG-2 and QAM modulation enables carriage of 10 SD sessions on one RF channel (10×3.75=37.5 Mbps<38 Mbps). Since a typical Service Group consists of 4 RF channels, 40 simultaneous SD VOD sessions can be accommodated within a Service Group.

Entertainment-quality transmission of HD (High Definition) signals requires about four times as much bandwidth as transmission of SD signals. For an exemplary MPEG-2 Main Profile—High Level (MP@HL) video compression, each HD program requires around 15-Mbps bitrate.

Hence, in sum, existing cable systems utilize what in effect amounts to an FDM system with 6 MHz channels and roughly 700 MHz of available bandwidth capacity in total, each of the channels being QAM modulated and delivered to the end user via e.g., a tree-and-branch type of topology, with user's CPE (e.g., digital settop boxes, DOCSIS modems, and gateways) utilizing RF tuners to tune to the appropriate DS channels to receive their respective data or program streams. As previously noted, this approach has limitations on its capacity, and hence can only be expanded so far in terms of available bandwidth (both DS and US), and serving additional customers with additional services.

Accordingly, a new model is needed. As shown in the exemplary frequency plan 200 of FIG. 2, various embodiments of the present disclosure utilize two bands 202, 204 each comprised of four (4) 160-MHz-wide channels 210, the two bands as supported by each of two (2) 802.11ax-based APs (described herein and in co-pending U.S. patent application Ser. No. 16/788,138, incorporated by reference in its entirety supra), can each provide a symmetric data service at the rate of 4.8 Gbps. Due to extant silicon limitations in current 802.11ax chipsets as of the date of this disclosure, the entirety of the 4.8 Gbps bandwidth cannot be allocate to a single user; however, such capability is incipient, and the present disclosure explicitly contemplates such configurations. However, even under the existing silicon, two (2) users can each utilize up to 2.4 Gbps in parallel. Therefore, the two (2) 802.11ax APs can provide a very high data rate service by utilizing the two sets of four (4) 160-MHz channels.

Moreover, the frequency use plan 200 of FIG. 2 includes provision for other functions (in addition to symmetric or asymmetric primary band uses), including support of cellular waveforms provided via 5-85 MHz band 206 (which as noted previously is generally used for upstream data communication for DOCSIS or OOB communication in traditional cable systems), as well as data communication via one or more ISM bands 208 (e.g., at 902-928 MHz).

As will be described in greater detail below, the cellular band(s) 206 can support transmission of e.g., 3GPP 4G/4.5G/5G waveforms to and from the customer's premises, in effect making the MSO's system a huge DAS (distributed antenna system) for a cellular operator or MNO, or even the MSO itself when acting as a wireless service provider. For instance, in one such model, the MSO may use 3GPP-based technology as an underpinning for providing unlicensed or quasi-licensed service via e.g., NR-U bands, CBRS bands, C-Band, or even mmWave bands to its users or subscribers.

Similarly, the ISM band(s) 210 within the frequency plan 200 provide a number of different functions to aid in, among other things, CPE control and fault detection by the MSO.

As shown in FIG. 2, the overall spectrum utilized by the plan 200 is on the order of 1.6 GHz, roughly twice that of a typical MSO cable band under the prior art. Notably, the portions of the extant HFC architecture leveraged as part of the architectures of the present disclosure are not inherently limited by their medium and architecture (i.e., optical fiber transport ring, with coaxial cable toward the edges); coaxial cable can operate at frequencies significantly higher than the sub-1 GHz typically used in cable systems, and such additional bandwidth is made use of in the exemplary embodiments described herein.

Figure 2A:
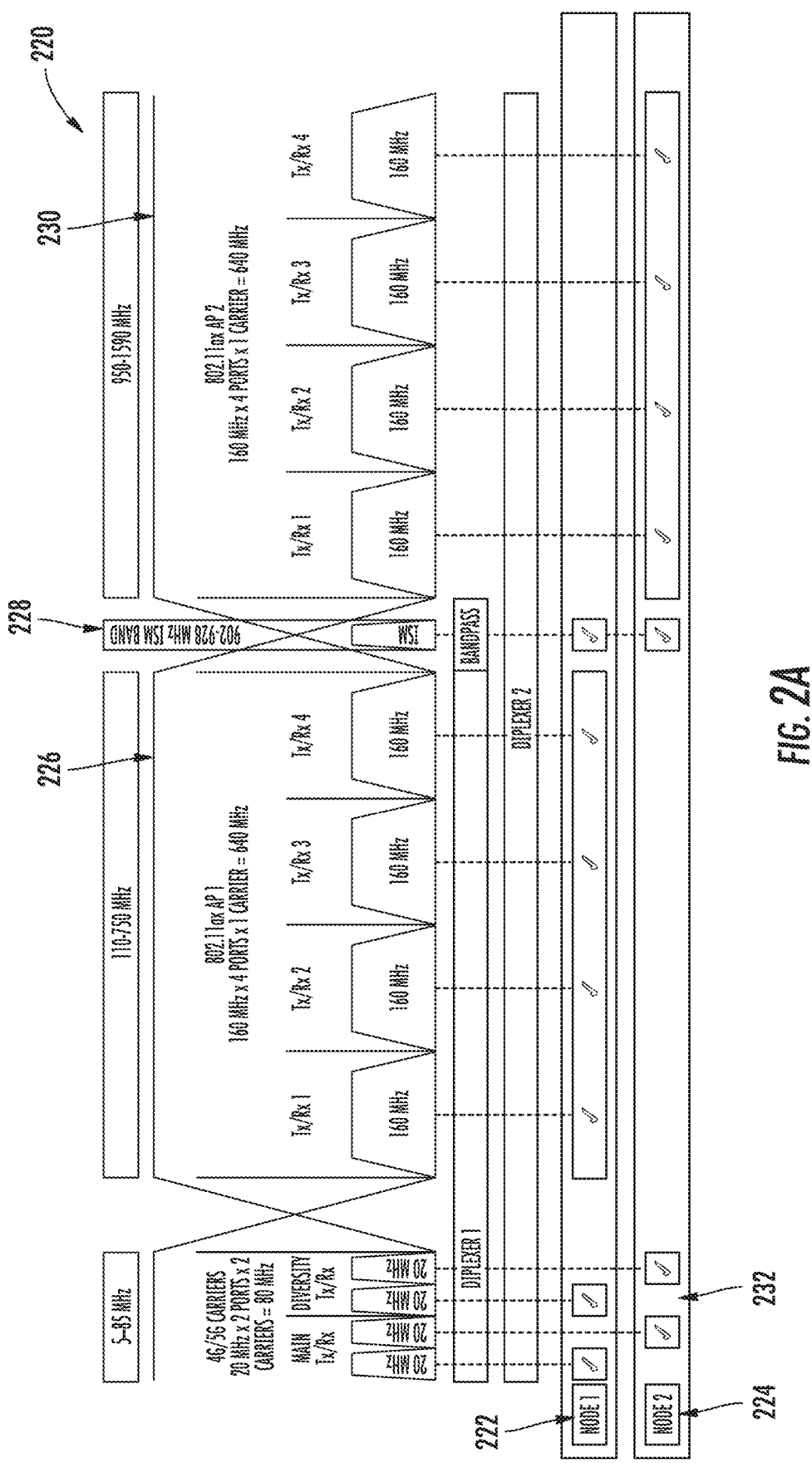
FIGS. 2A and 2B are graphical representations of respective first and second exemplary frequency band functional assignments according to embodiments of the present disclosure.

Further, the foregoing spectrum of e.g., 1.6 GHz in bandwidth can be divided between multiple (e.g., two (2)) sub-nodes to allow, inter alia, a spectrum use plan that can be advantageous in providing data services that are more tailored to user premises and/or applications being served. For example, as shown in the embodiment of FIG. 2A, the plan 220 allocates approximately 700 MHz of bandwidth to one sub-node (Node 1) 222 while allocating another approximately 700 MHz of bandwidth to another sub-node (Node 2) 224. The division can be used for a multitude of purposes, including e.g., providing high-capacity data services to different parts of one or more user premises, via two or more nodes providing different paths (including combining or alternating such paths to provide e.g., additional reliability through redundancy), as discussed in more detail elsewhere herein.

As can be seen in FIG. 2A, one sub-node 222 can be allocated e.g., 640 MHz of bandwidth 226 that can be serviced by one (1) 802.11ax AP, while another sub-node 224 can be allocated another 640 MHz of bandwidth 230. As discussed further herein, each node can generate and/or provide its own data to be transmitted via ISM band 228, which is a shared-use channel. Accordingly, each sub-node 222, 224 can utilize the ISM band 228 as shown in FIG. 2A, to e.g., send control data. Furthermore, the cellular band(s) 232, as introduced with respect to FIG. 2 above, can also be divided between the two sub-nodes 222, 224 as needed by e.g., utilizing one or more carrier signals or bands for each sub-node 222, 224 (e.g., in 20 MHz wide slices) as shown in FIG. 2A.

Figure 2B:
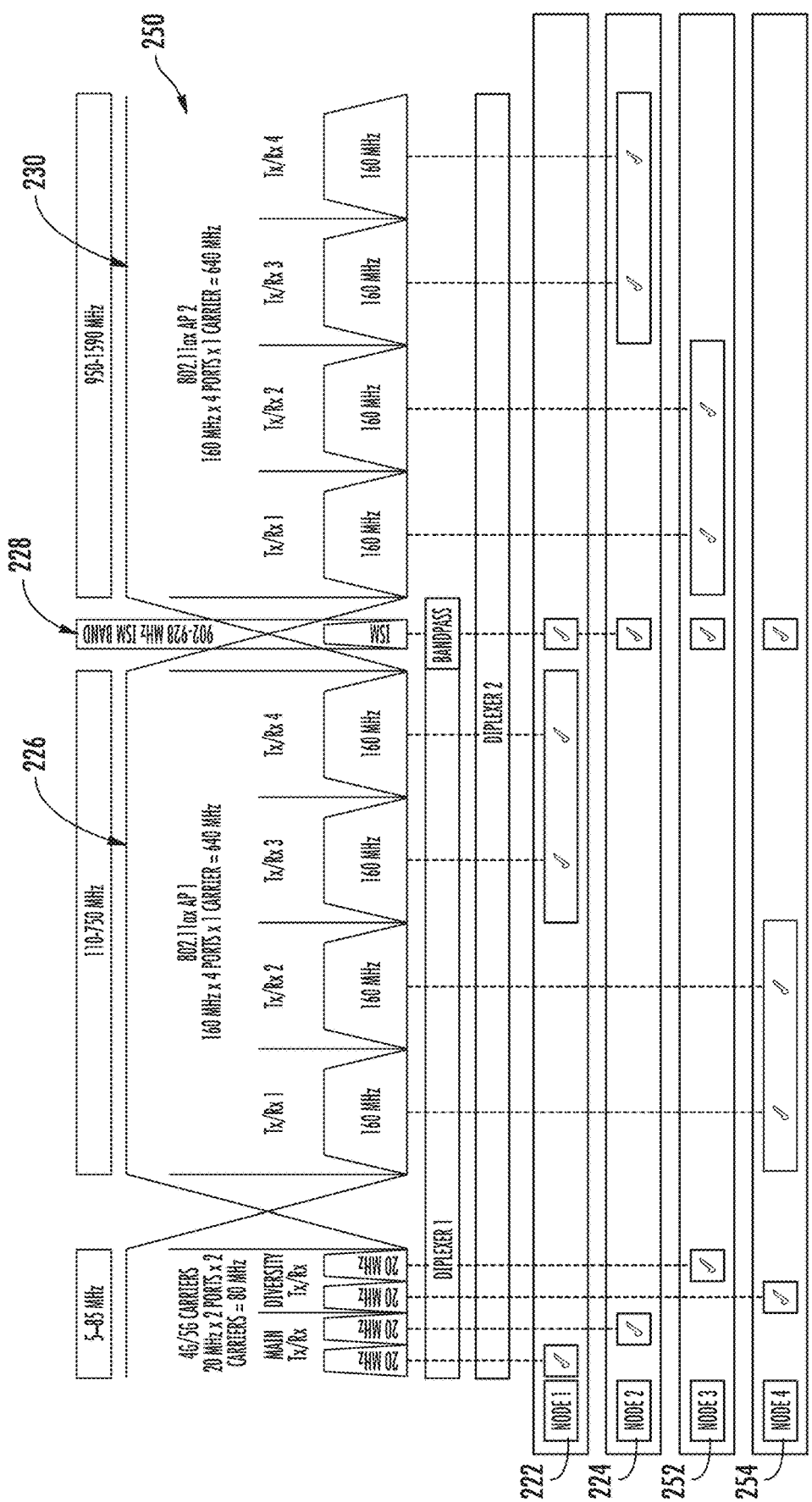

FIG. 2B illustrates yet another embodiment of a frequency plan 250 according to the present disclosure. In this plan, there are four (4) nodes 222, 224, 252, 254 which are each allocated a cellular band, two sub-band portions (of the four total comprising the bandwidth 226, 230), and use a common ISM band 228.

It will also be appreciated that the attenuation associated with any coaxial cable infrastructure is a function of, inter alia, coaxial conductor length, and hence higher levels of "per-MHz" attenuation may be acceptable for shorter runs of cable. Stated differently, nodes servicing (or serviced by) shorter runs of cable may be able to better utilize the higher-end portions of the RF spectrum (e.g., on the high end of the aforementioned exemplary 1.6 GHz band) as compared to those more distant, the latter requiring greater or disproportionate amplification. As such, the present disclosure also contemplates embodiments which make use of selective mapping of frequency spectrum usage as a function of total cable medium run length or similar.

Accordingly, referring now to FIGS. 3A-3E, various embodiments of an enhanced service provider (e.g., cable MSO) network architecture making use of the exemplary frequency plan of FIGS. 2-2B are shown and described in detail. As described in greater detail subsequently herein, each of the architectures 300, 320, 340, 360 of FIGS. 3A-3D make use of an existing, developed technology "ecosystem" as a basis of its new data and signal processing and delivery capabilities (in both DS and US directions). This use of much of the existing "last mile" of infrastructure, and existing high-performance wireless components, advantageously obviates much of the previously discussed long development cycles and R&D costs associated with developing components from "the ground up," and accordingly each greatly enhances customer service velocity (i.e., the rate at which new services and capabilities can be added to the system) as well as customer satisfaction and loyalty.

Figure 3A:
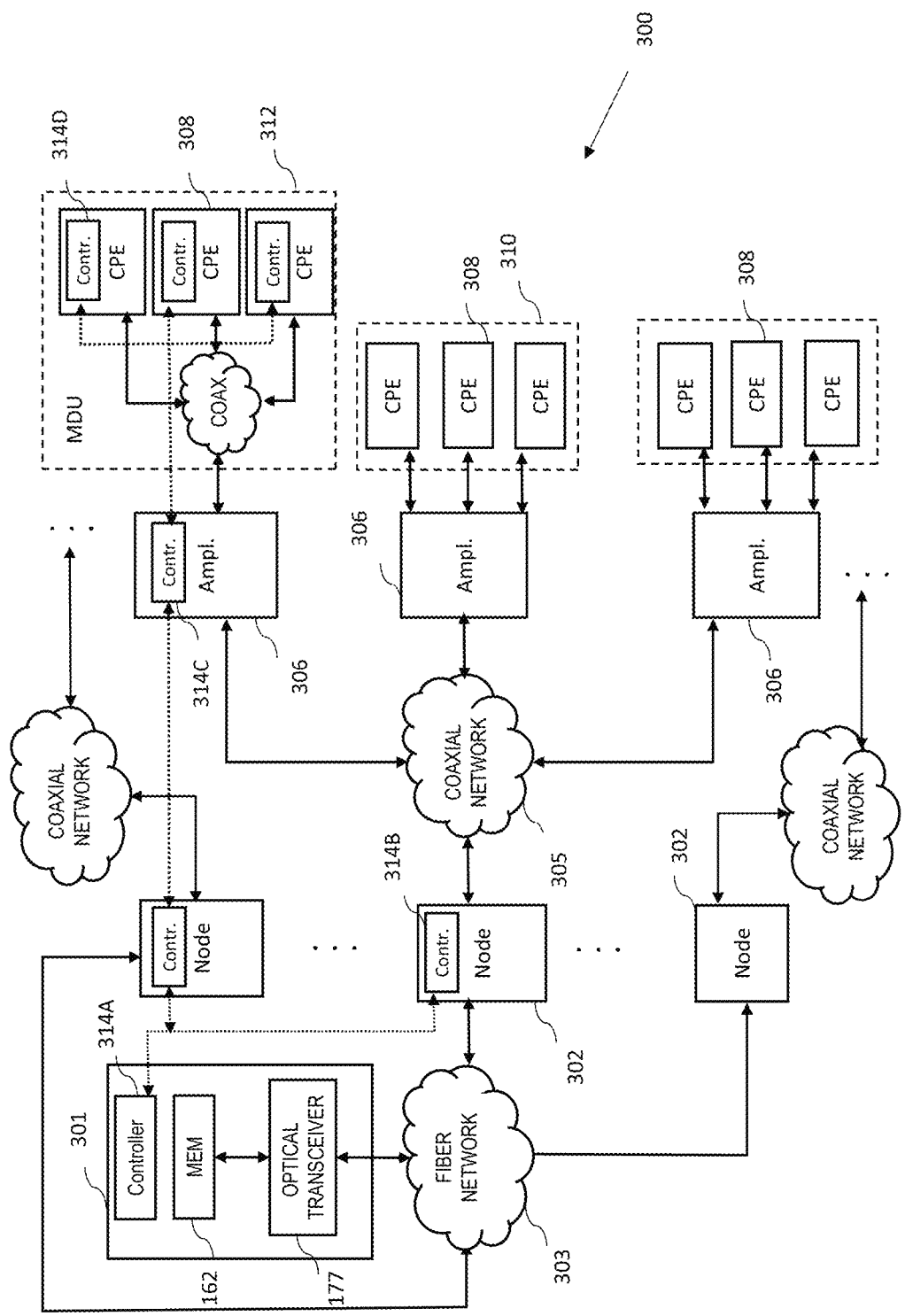
FIG. 3A is a functional block diagram illustrating a first exemplary embodiment of a service provider network architecture according to the present disclosure.

In a first embodiment illustrated in FIG. 3A, the improved network architecture 300 according to the present disclosure includes a headend 301, optical fiber distribution network 303 (e.g., DWDM ring or similar), and a plurality network nodes 302 connected to the network/ring 303 within the MSO network (such nodes which may be e.g., near edge portions of the network, or further towards the core, depending on configuration and the particular portions of the network served). Furthermore, the architecture 300 also includes a plurality of amplifiers 306, which are used to compensate for transmission losses due to the coaxial medium 305 by amplifying the signal in the downstream and upstream directions as required. The architecture 300 also includes a multitude of served CPE 308, which are used to process and transmit signals to end users as described in greater detail below.

As shown in FIG. 3A, in one embodiment of the network architecture 300, the network nodes 302 are backhauled by optical fiber, although this is merely illustrative, as other types of backhauls may be used (e.g., RF wireless such as mmWave systems, or Metro Ethernet with twisted copper).

Also included in the architecture 300 of FIG. 3A are controller entities or processes 314a, 314b, 314c which are in logical communication with one another via e.g., the distribution network architecture. As described in greater detail below, these controller processes enable, inter alia, control by a headend controller 314a of the nodes and amplifiers for configuration and re-configuration of the devices during operation, such as to reallocate frequency spectrum, change modulation/coding schemes (MCS) on the various devices, and enable ISM-band based functionality.

Returning to FIG. 3A, a plurality of taps (not shown) and the amplifiers 306 are utilized to distribute signals to the multitude of CPE 308, which may be disposed as groups of individual premises/customers 310 with respective CPE 308 served by a given amplifier and "branch" of the coaxial topology, or alternatively as groups of CPE 308 within aggregated premises such as MDUs, enterprise or educational campuses or similar 312. As shown, in the case of the MDUs/campuses 312, the target premises includes an indigenous coaxial cable network (whether star, tree, or other topology), such as may have been installed at time of construction of the building(s) served. It will be appreciated that any number and topology of network nodes 302, taps, amplifiers 306, and CPE 308 can be used to deliver high-capacity data services to the CPE 308 that are disposed at customer premises of residential customers as well as enterprise, educational, government/military, or other types customers.

The MSO network architecture 300 of FIG. 3A is particularly useful for the delivery of packetized content (e.g., encoded digital content carried within a packet or frame structure or protocol) consistent with the various aspects of the present disclosure. In addition to on-demand and broadcast content (e.g., live or "linear" video programming), the system of FIG. 3A can deliver and receive Internet data and OTT (over-the-top) services to the end users via the Internet protocol (IP), although other protocols and transport mechanisms of the type well known in the digital communication art may be substituted. Moreover, as discussed in greater detail below, the architecture also includes provision for cellular service, ISM band service, and WLAN backhaul, as well as supporting low-latency functionality of the user such as distributed gaming and AR/VR application support.

The architecture 300 of FIG. 3A further provides a consistent and seamless user experience with IPTV or streaming media over both wireline and wireless interfaces. Additionally, in the IP paradigm, dynamic switching between unicast delivery and multicast/broadcast can be used based on e.g., local demand. For instance, where a single user (device) is requesting content, an IP unicast can be utilized. For multiple devices (i.e., with multiple different IP addresses, such as e.g., different premises), multicast can be utilized where similar content is delivered. This approach provides for efficient and responsive switching of delivery and obviates other more equipment/CAPEX-intensive approaches.

Moreover, the architecture can be used for both broadband ("Internet") data delivery as well as simultaneous delivery of "content" (e.g., movie channels), and obviates much of the need for a separate infrastructure for "in band" and DOCSIS (and "out of band" (OOB)) transport.

In certain embodiments, the service provider network 300 also advantageously permits the aggregation and/or analysis of subscriber- or account-specific data. As but one example, device-specific IDs can be cross-correlated to MSO subscriber data maintained at e.g., the network head ends (not shown) so as to permit or at least facilitate, among other things, (i) user/device authentication to the MSO network; (ii) correlation of aspects of the area, premises or venue where service is provided to particular subscriber capabilities, demographics, or equipment locations, such as for delivery of location-specific or targeted content or advertising; and (iii) determination of subscription level, and hence subscriber privileges and access to certain services as applicable. Moreover, device profiles for particular devices can be maintained by the MSO, such that the MSO (or its automated proxy processes) can model the device for wireless or other capabilities.

Figure 3B:
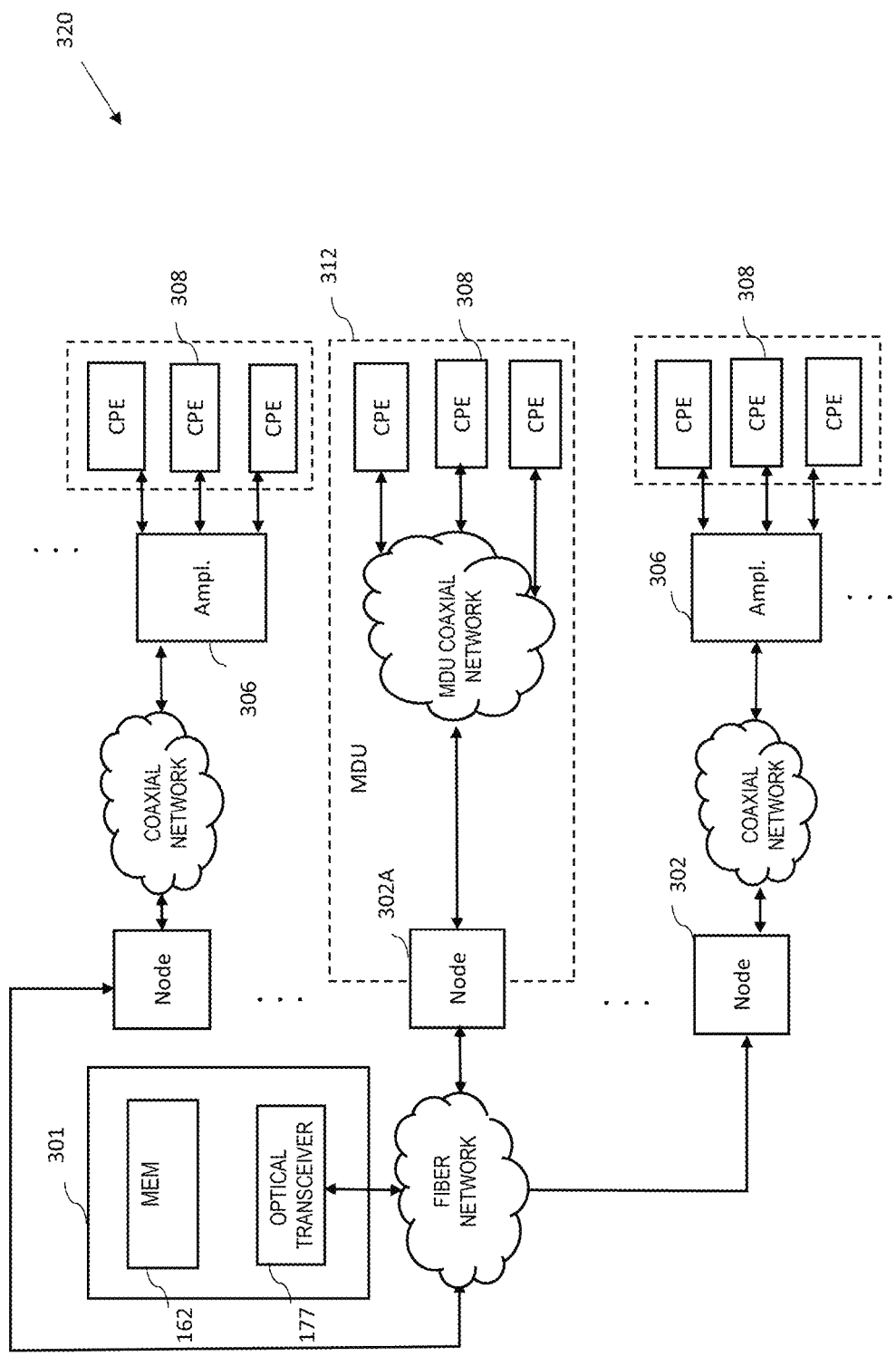
FIG. 3B is a functional block diagram illustrating a second exemplary embodiment of a service provider network architecture according to the present disclosure.

FIG. 3B illustrates another embodiment of the network architecture 320, wherein both groups of individual premises 310 and MDUs or similar 312 are served. In this embodiment, one or more "local" nodes 302a are used to deliver MSO data and signals directly to the MDU 312 and its local (premises) coaxial distribution network without need of an interposed amplifier 306. For instance, the MDU 312 may have an optical fiber drop (e.g., FTTC or FTTH) node proximate thereto or serving the premises (whether via the MSO as in FIG. 3B, or a third party service provider network 344 as shown in FIG. 3C), such that the node 302a can be used to directly serve the MDU premises 312, such as being mounted on a utility pole proximate the premises, or in the case where the node 302a serves only the premises, integrated within the premises itself (e.g., in a telecommunications service ingress/egress room or similar).

In yet other configurations (not shown), the node 302a may be associated with a wireless backhaul (e.g., a roof-mounted antenna/FWA apparatus, such as one utilizing quasi-licensed CBRS spectrum for backhaul).

It will also be recognized that the node 302a may be dedicated to a given premises or MDU 312 (e.g., a "micro-node"), or alternatively be scaled accordingly to serve multiple local MDUs 312 (not shown).

Figure 3C:
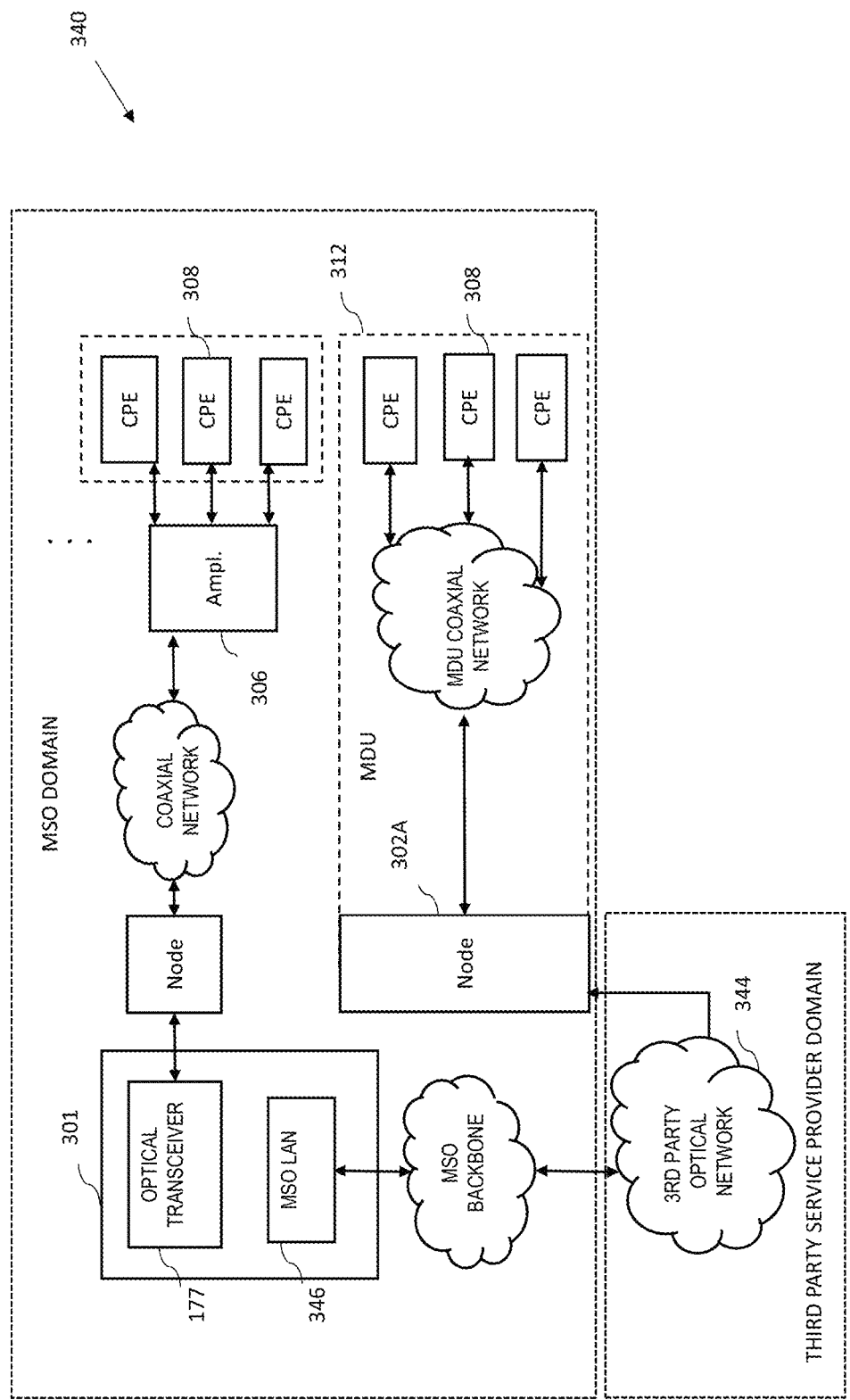
FIG. 3C is a functional block diagram illustrating a third exemplary embodiment of a service provider network architecture according to the present disclosure.

In the architecture 340 of FIG. 3C, one or more nodes in direct communication with the MSO optical network 177 serve a plurality of premises and CPE 308 via one or more interposed amplifiers 306, while one or more MDUs 312 are served by "direct feed" nodes 302a, the latter backhauled by a third-party service provider network 344 such as a FiOS or FTTC provider separate from the MSO.

Figure 3D:
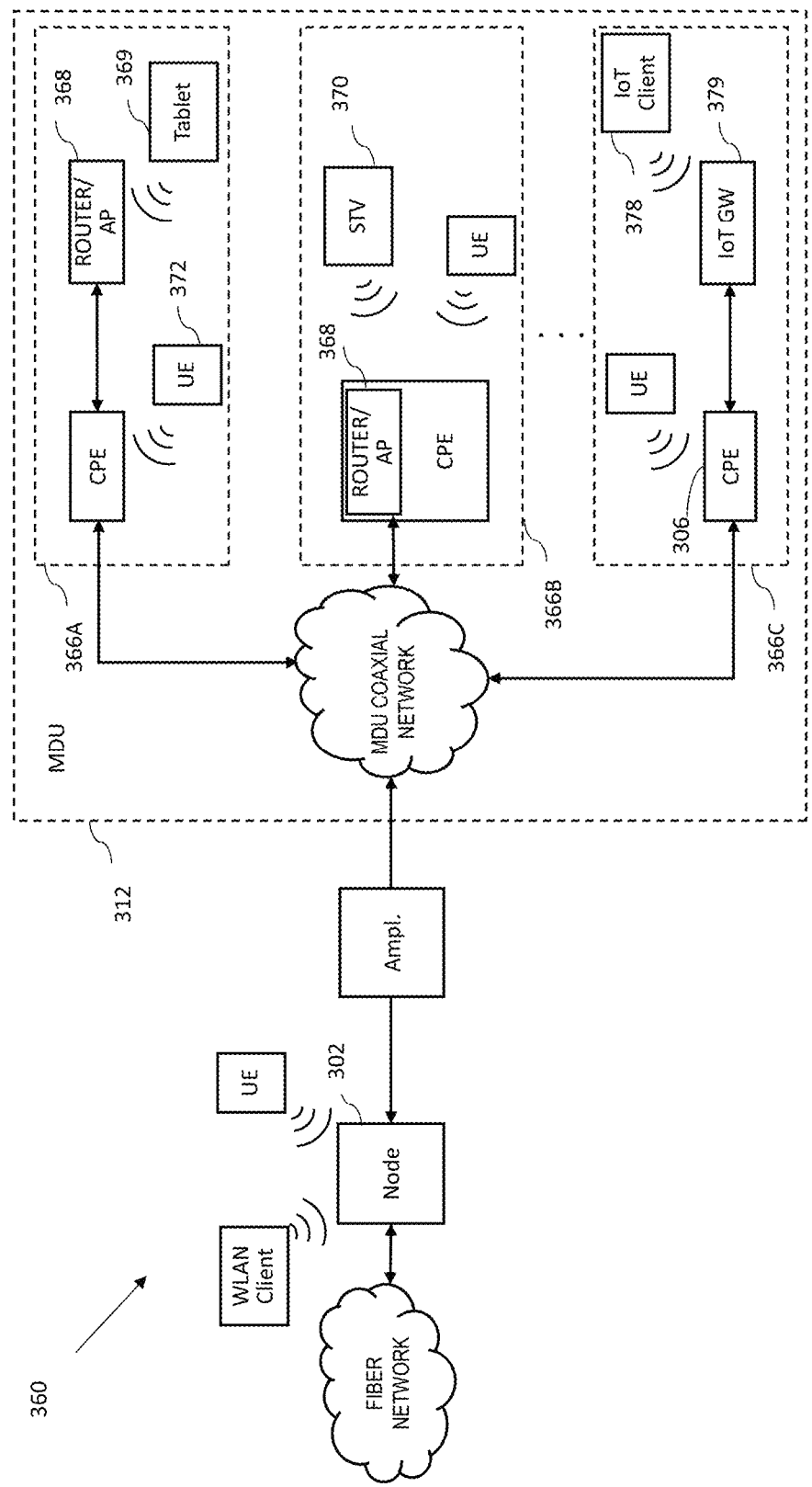
FIG. 3D is a functional block diagram illustrating an exemplary embodiment of a client-side architecture (in the context of an MDU) served by a service provider network architecture.

FIG. 3D is a functional block diagram illustrating an exemplary embodiment of a client-side architecture 360 (in the context of an MDU) served by a service provider network architecture such as one of those of FIGS. 3A-3C. As shown, the node 302, which may be backhauled by e.g., an optical fiber network of the MSO or another service provider, acts as both (i) a backhaul for the MDU 312 and its individual subscribers/users 366a, 366b, 366c, as well as (ii) an ad hoc access node for e.g., WLAN clients (i.e., those operating in one embodiment in the unused 2.4 GHz band associated with the 802.11ax chipsets of the node) as well as user mobile devices such as 3GPP-compliant UE (i.e., the node 302 acts as a cellular repeater or DAS of sorts) by virtue of the node's 3GPP functionality described in greater detail in co-pending U.S. patent application Ser. No. 16/788,138, incorporated by reference in its entirety supra).

In terms of MDU premises services, the node 302 may backhaul UE 372 (whether operating in a licensed cellular band or in an unlicensed or quasi-licensed band such as an NR-U or CBRS or C-band), user mobile WLAN devices such as tablets 369, smart TVs 370 with WLAN capability, and IoT devices such as gateways 379 and/or IoT client devices 378. Various other served premises configurations will be appreciated by those of ordinary skill, including those described further herein with respect to e.g., FIGS. 9-12.

It will also be appreciated that the frequency plan 200 of FIG. 2 may be constructed so as to co-exist with other premises media or protocols which may utilize the indigenous cable medium such as e.g., MoCA 2.0, 2.1, 2.5, or 3.0 systems (whether using channel bonding or otherwise). For instance, in one approach, dynamic spectrum utilization (e.g., for the upper band 204) may be programmed to avoid certain bands which are being utilized or may be occupied by the other systems. In one variant, the controller (discussed below) is informed of such actual occupied or putatively occupied bands by e.g., the MoCa adapter or other such device operative in the premises. In another approach, an LBT or similar medium access approach is used to avoid contention with such systems.

Moreover, while shown primarily in optical backhaul configurations (e.g., the node(s) 302 acting as the boundary between the optical of RF coaxial domains), the nodes 302 may be adapted to utilize other backhaul.

In another aspect of the disclosure, an architecture for providing high data rate, low latency coverage to e.g., large indoor spaces such as office buildings, enterprises, universities, MDUs, etc. is disclosed. One implementation of this architecture utilizes one or more of the foregoing network nodes 302 to supply one or more CPE 308 within the enterprise, etc. via HFC infrastructure, such as a star, bus, ring, tree, or other coaxial cable topology within the served premises. The CPE, by virtue of their repeater/extender functions for cellular and WLAN, provides coverage within the structure for both cellular and Wi-Fi, as well as indoor/outdoor mobility, such as via local pole-mounted access node 302 with 4G/5G and WLAN capability. As such, the CPE collectively act as a distributed antenna system (DAS) for cellular and WLAN signals, as do the intermediary network nodes 302 disposed e.g., at or near the premises in some cases.

Figure 3E:
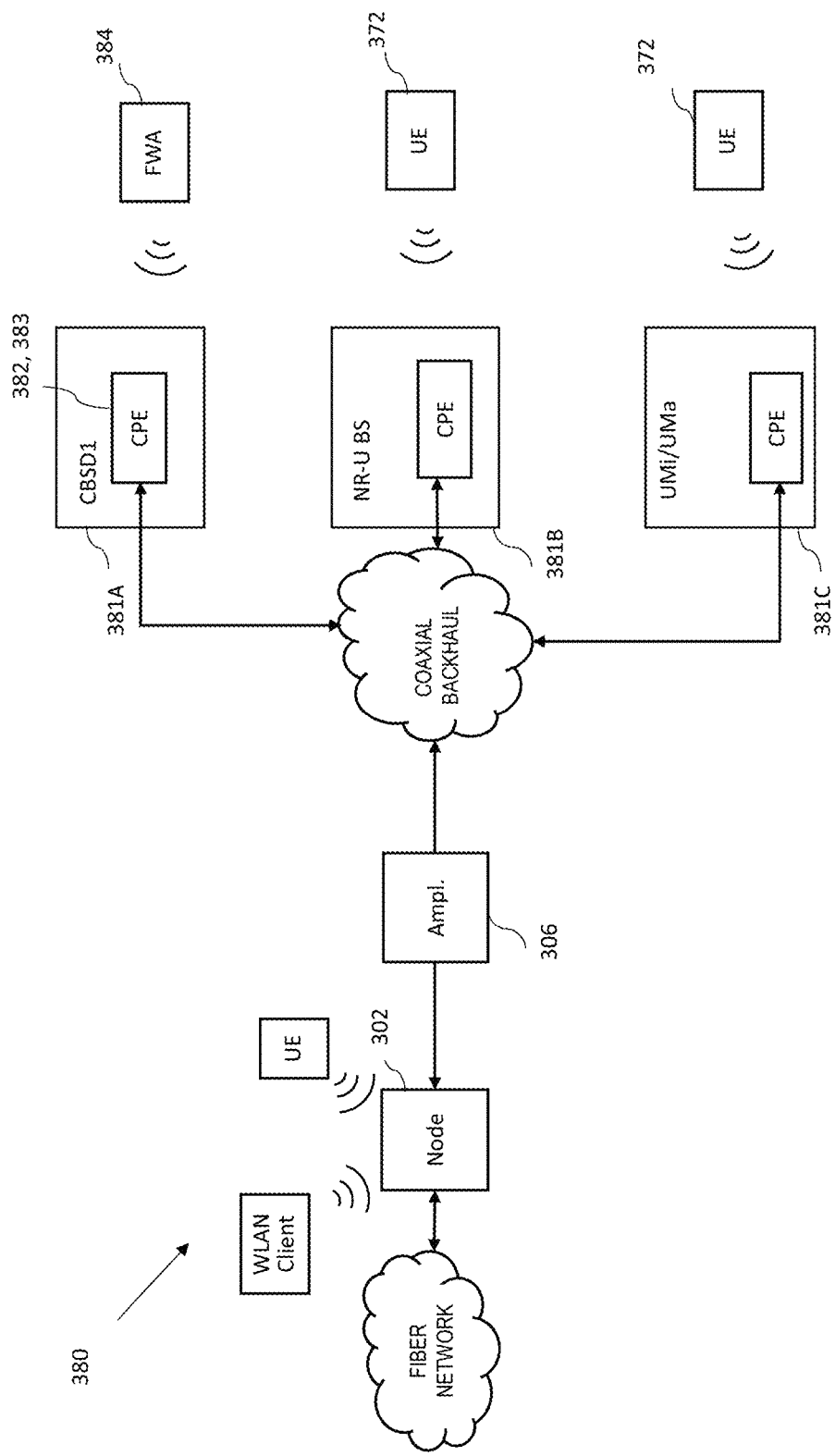
FIG. 3E is a functional block diagram illustrating a first exemplary embodiment of a client-side architecture (in the context of backhaul of CBRS CBSDs and/or other base stations) served by a service provider network architecture.

FIG. 3E is a functional block diagram illustrating another exemplary embodiment of a client-side architecture, in the context of backhaul of CBRS CBSDs and/or other base stations. In this embodiment, the coaxial network of the service provider is used as a backhaul for various base stations or similar apparatus, such as the CBRS CBSD 381A, 3GPP NR-U base station 381B (which may comprise gNB functionality in some embodiments), and a 3GPP UMi/Uma (urban microcell/urban macrocell) mmWave system 381c. In the illustrated configuration, each of the foregoing base stations is disposed at a different physical location where extant coaxial cable exists (or can be routed to), with the cable acting as the data backhaul for the base station to the service provider network via the coaxial infrastructure and node(s) 302 (e.g., back to an MSO headend or core portion via the optical fiber network). The various base station devices include CPE (which may include CPE 382, 383 specifically adapted to the operating environment and needs of the particular air interface served by the host base station; see e.g., the exemplary devices of FIGS. 6-6A. Various types of client devices (e.g., CBRS FWAs of subscriber premises 384, or UEs such as mobile devices 372) are served by the respective base stations, with communications backhauled as previously described. It will be noted that in the configuration of FIG. 3E, the aggregate backhaul data rate of the coaxial cable served by the node is limited to the node capacity in DS or US; hence, the base stations (including type, number, capacity, etc.) are selected so as to not overrun the backhaul capacity. As such, if more capacity is required for a given base station, that base station may be e.g., assigned to another node (or another node added) consistent with the overall capacity of that portion of the network (including the fiber backhaul capacity for all nodes served by a give optical drop).

Figure 3F:
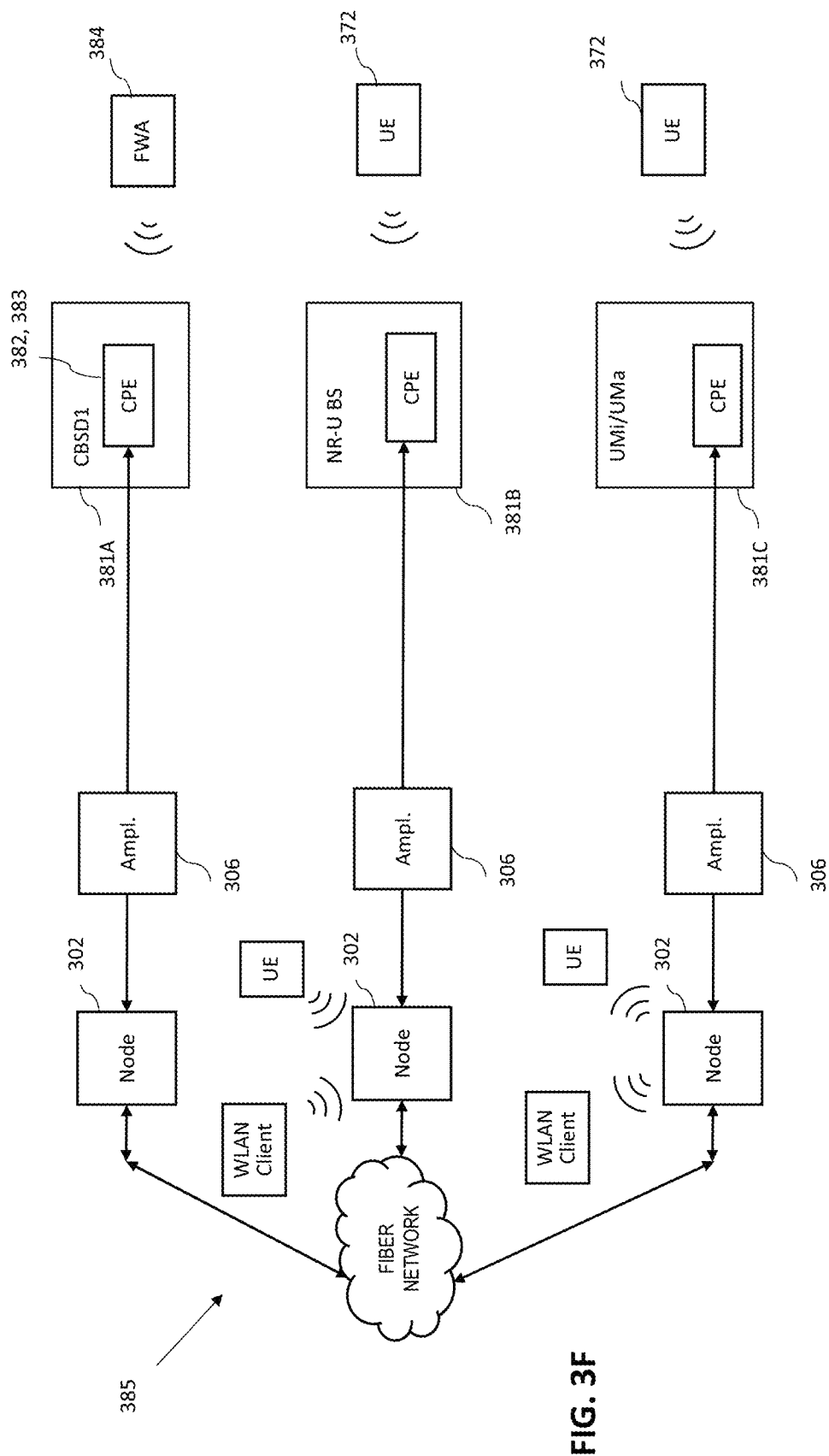
FIG. 3F is a functional block diagram illustrating a second exemplary embodiment of a client-side architecture (in the context of backhaul of CBRS CBSDs and/or other base stations) served by a service provider network architecture.

FIG. 3F illustrates another embodiment of the architecture 385, in this instance where each base stations 381A-C is backhauled by a dedicated node/amplifier back to the optical network. This approach provides more bandwidth for each base station, and hence is more suitable for data—intensive applications such as cellular or CBRS/C-Band or similar macro-cells such as eNBs or gNBs serving significant numbers of UE/FWA devices.

Figure 3G:
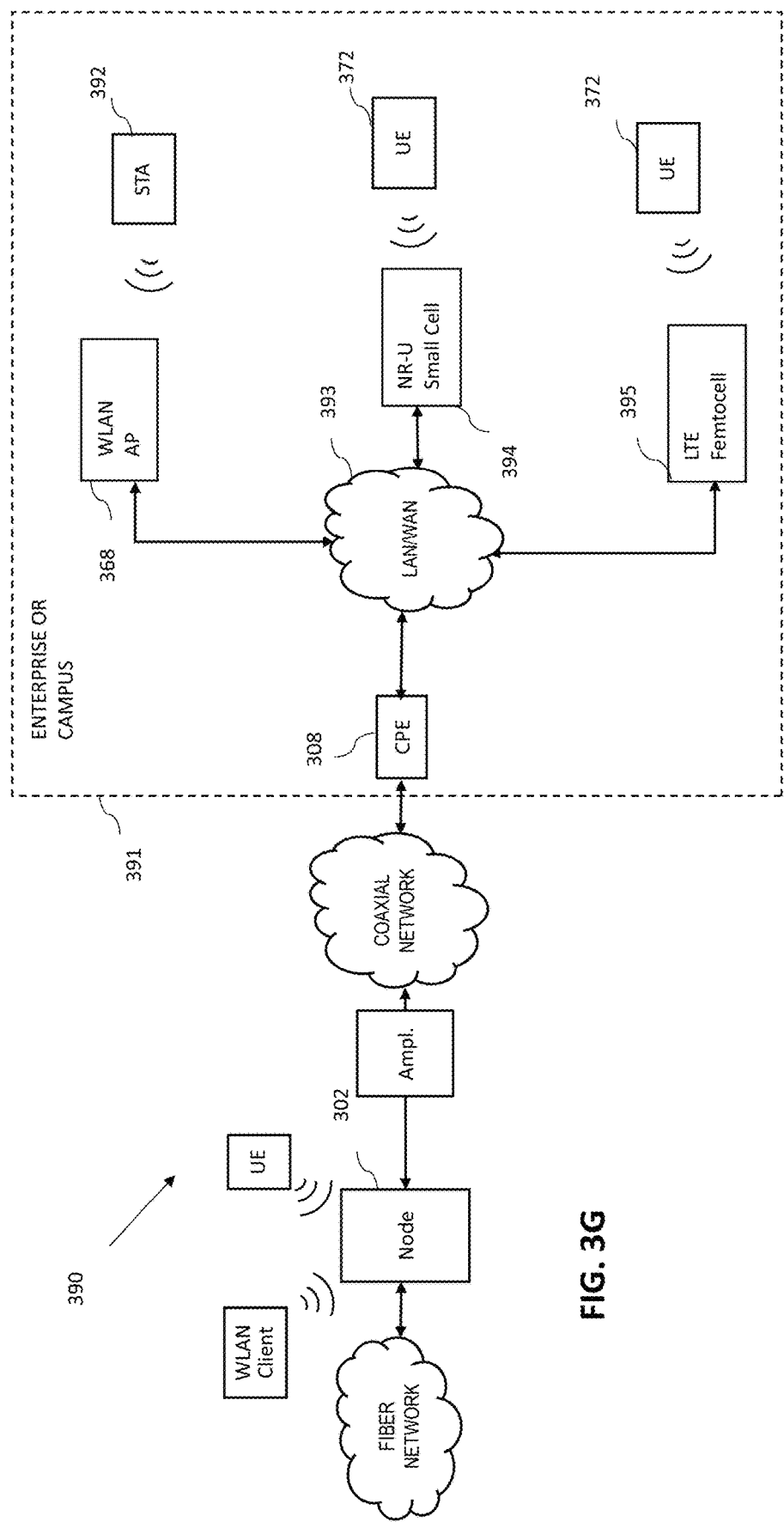
FIG. 3G is a functional block diagram illustrating an exemplary embodiment of a client-side architecture (in the context of backhaul of an enterprise or campus) served by a service provider network architecture.

FIG. 3G is a functional block diagram illustrating an exemplary embodiment of a client-side architecture 390 in the context of backhaul of an enterprise or campus. In this embodiment, multiple client premises devices are backhauled (generally similar to the architecture of FIG. 3E); however, a unitary CPE 308 is used as the basis of the backhaul, with the client devices 368, 394, 395 backhauled via the premises LAN or WAN 393 (e.g., an Ethernet LAN of sufficient Gbps capacity) which is coupled to the CPE 308 via the latter's Ethernet port(s) (see FIG. 4). The exemplary client devices include a WLAN AP 368, a 5G NR-U small cell 394, and a $G (LTE) femtocell, but it will be recognized that different numbers/combinations of devices may be used consistent with the disclosure.

Exemplary CPE Apparatus

Figure 4:
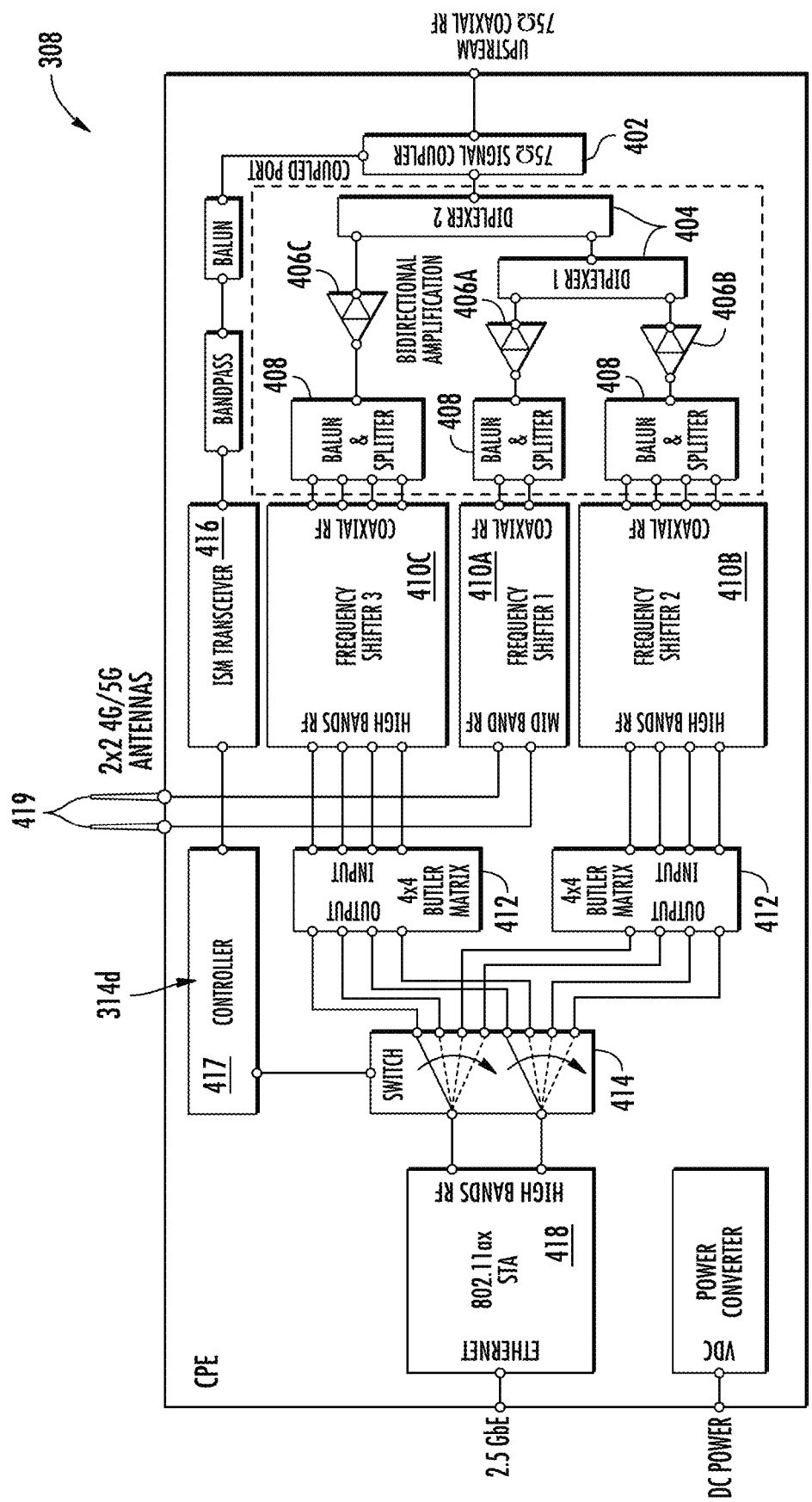
FIG. 4 is a functional block diagram illustrating a first exemplary configuration of a CPE apparatus according to the present disclosure.

FIG. 4 illustrates an exemplary embodiment of a CPE 308 configured according to the present disclosure. As shown, the CPE 308 includes, inter alia, a 75-Ω signal coupler 402, a plurality of diplexers 404, a plurality of bidirectional amplifiers 406, a plurality of frequency shifters 410, two (2) 4×4 Butler matrices 412, a switch 414, an ISM transceiver 416, a controller module 417, an 802.11ax STA (station) 418, and 2×2 cellular antennas 419.

In one variant, the coupler 402 is configured to couple the ISM data from the other data encoded in the RF signal (e.g., control data transmitted from an upstream controller process within the designated ISM band 210 on the cable) received by the CPE via coaxial cable in the HFC distribution network. In one implementation, the information received via ISM band as processed by the ISM transceiver 416 comprises information related to controlling the switch(es) 414 so that the information from appropriate combinations of ports from the Butler matrices 412 can be communicated to the 802.11ax STA module 418 for transmission of the data to one or more user devices (e.g., via the GbE port of the CPE). The controller 417 receives the foregoing information from the ISM transceiver 416 and operates or configures the switch 414 accordingly. In one approach, the controller logic 314d of the controller 417 receives real-time data that causes the switches 414 to operate so that the CPE can make use of the appropriate ports of the Butler matrices (i.e., the first switch is coupled to one of the diversity ports of the 802.11ax chipset, and switched between inputs from the second and third frequency shifters 410B, 410C such that each STA/CPE can access either the upper or lower bands as output from the respective frequency shifters).

In another variant, multiple Butler matrices 412 (e.g., the number matching the number of Wi-Fi APs configured in an exemplary embodiment of a network node 302) are used to transmit the received data originating from four ports of each of the multiple Wi-Fi modules of a network node 302 to one or more user devices via two ports of Wi-Fi STA 418 of the CPE 308. The foregoing mapping is done with 4×4 Butler matrices 412 and a switch 414, which is controlled by controller 417 as discussed supra. This approach allows the CPE 308 to utilize the appropriate number of node AP ports (i.e., since the node AP has four ports or spatial diversity channels, and the commodity STA of the CPE 308 has only two ports/channels). As such, the STA of the CPE can access either band 204, 206 (FIG. 2), and the full 4.8 Gbps bandwidth of symmetric data (as shown in FIG. 2) can be utilized for two (2) CPE 308, each of which can be allocated 50% of the full 4.8 Gbps bandwidth.

As a brief aside, a Butler matrix is normally used to feed e.g., a phased array of antenna elements for the purpose of enabling beamforming via the array of antenna elements. The beamforming allows directional signal transmission and reception by enabling (via e.g., an N×N Butler matrix made of hybrid couplers and fixed-value phase shifters) a combination of the antenna elements as required for such directional signal transmission and reception.

In a similar way, an exemplary 802.11ax STA available as of the date of this disclosure, with its two (2) RF ports as shown in FIG. 4, can communicate with a 4×4 802.11ax AP (e.g., as used in a node that can be used with a CPE 308 of this disclosure—described in more detail in co-pending U.S. patent application Ser. No. 16/855,747 filed contemporaneously herewith on Apr. 22, 2020 and incorporated by reference in its entirety supra). Due to the aforementioned extant silicon limitations in some 802.11ax chipsets as of the date of this disclosure (e.g., for cost saving), a single 802.11ax STA can process only 2.4 Gbps symmetric data (i.e., 50% of the 4.8 Gbps that are available from a 4×4 802.11ax AP) via the two (2) RF ports, by which the 802.11ax STA determines allocation of which 50% to process when communicating with the 802.11ax AP wirelessly.

In the exemplary configuration of the CPE 308 of the present disclosure, the 802.11ax STA 418 is electrically connected to various components of the CPE 308 and processes data receive from or for transmission to the 4×4 802.11ax AP of the node 302 by data communication over a wireline path. Therefore, in the example of DS signals, there is a resulting need to determine which 50% of the 4.8 Gbps symmetric data available (via the wireline path) from the 4×4 802.11ax AP of the node 302 the 802.11ax STA 418 is supposed to receive and process.

The aforementioned Butler matrix is an exemplary solution to satisfy the foregoing need of the 802.11ax STA 418, because inter alia enables only a certain combination of input-output mapping.

It will be appreciated those of ordinary skill that while Butler matrices are useful in the present embodiment for providing the desired switching functionality, other type of methodologies and/or components that can serve a similar function can be substituted to enable the 802.11ax STA 418 of the CPE 308 to determine data allocation relative to the 4×4 802.11ax AP of the node 302. For instance, it is envisaged by the inventors hereof that FPGA-based solutions may be utilized to implement the switching functions, as may ASICs (the latter especially having the advantage of speed over a software-based solution). Yet other approaches may be used as well. Additionally, Butler matrix logic can be implemented in such devices.

Moreover, the exemplary embodiment of the CPE 308 uses multiple diplexers 404 in tiers or hierarchy, and multiple bidirectional amplifiers 406 to amplify the different types and bands of signals (e.g., LBT/TDD/FDD), based on the source of the signals. Similarly, multiple frequency shifters 410 are used to convert the foregoing different types of signals to a frequency appropriate for transmission to one or more user devices (e.g., to frequency multiplex the signals into different bands in the DS direction, or combine the various signals onto the cable in their respective bands in the US direction), or subsequent processing, such as by the 802.11ax chipset.

Figure 5:
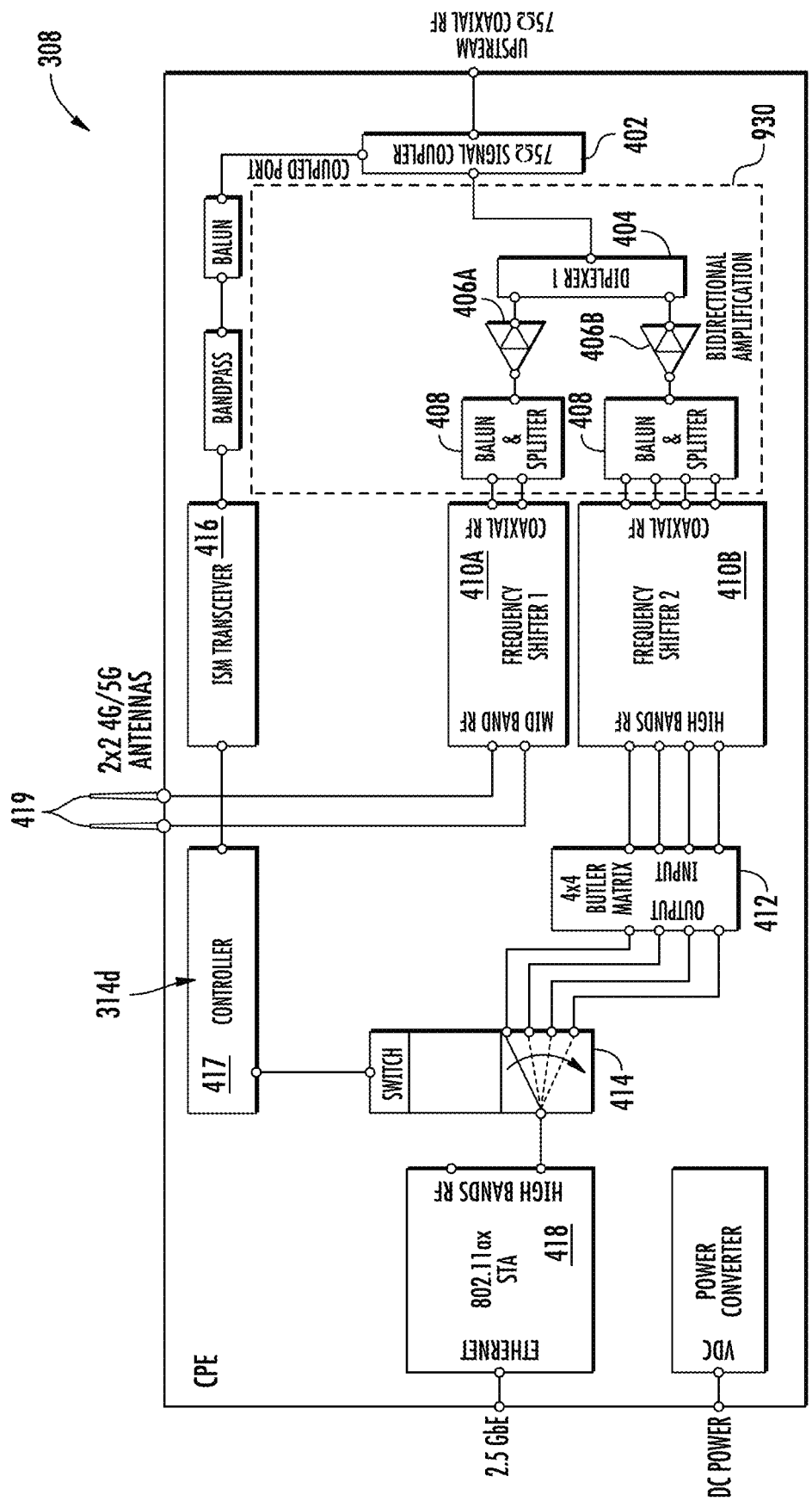
FIG. 5 is a functional block diagram illustrating a second exemplary configuration of a CPE apparatus according to the present disclosure.

FIG. 5 illustrates an exemplary variant of the CPE 308 of FIG. 4 according to the present disclosure. As shown, the CPE 308 includes, inter alia, a 75-Ω signal coupler 402, a diplexer 404, a plurality of bidirectional amplifiers 406, a plurality of frequency shifters 410, one (1) 4×4 Butler matrix 412, a switch 414, an ISM transceiver 416, a controller module 417, an 802.11ax STA 418, and 2×2 cellular antennas 419.

The CPE 308 of FIG. 5 functions in much the same way as the CPE of FIG. 4, with an exception of having a reduced complexity and capacity. The CPE 308 of FIG. 5 includes e.g., only one (1) 4×4 Butler matrix and thus can work with a node 302 that includes only one (1) 4×4 802.11ax AP (as discussed in more detail in co-pending U.S. patent application Ser. No. 16/855,747 filed contemporaneously herewith on Apr. 22, 2020 and incorporated by reference in its entirety supra. The foregoing CPE 308, as well as the node 302 with one (1) 4×4 802.11ax AP, can be useful for instance to communicate e.g., the 2.4 Gbps bandwidth of symmetric data (as discussed with respect to the frequency plan 220 of FIG. 2A), such as over two or more paths of an extant coaxial cable infrastructure of a user premises so as to support redundancy of data (as discussed further elsewhere herein).

In this variant of FIG. 5, the coupler 402 is configured to couple the ISM data from the other data encoded in the RF signal received by the CPE 308 via coaxial cable in the HFC distribution network. In one implementation, the information received via ISM band as processed by the ISM transceiver 416 comprises information related to controlling the switch 414 so that the information from appropriate combinations of ports from the Butler matrix 412 can be communicated to the 802.11ax STA module 418 for transmission of the data to one or more user devices (e.g., via the GbE port of the CPE). Because the CPE 308 of this variant is receiving RF signal from a node 302 with only one (1) 4×4 802.11ax AP as described above, the single diplexer 404 splits the received RF signal over two paths: (i) one for up-conversion in frequency so that the 3GPP portion of the signal can be radiated out via the 2×2 4G/5G antennas 419; and (ii) another for up-conversion in frequency for the "Wi-Fi" portion to be delivered to the 4×4 Butler matrix 412 and the switch 414 to be processed and delivered to user premises devices via the 802.11ax STA 418 and 2.5 GbE interface.

Similar to the device shown with respect to the CPE 308 of FIG. 4, the controller 417 receives the foregoing information from the ISM transceiver 416 and operates or configures the switch 414 accordingly. In one approach, the controller logic 314*d* of the controller 417 receives real-time data that causes the switches 414 to operate so that the CPE 308 can make use of the appropriate ports of the Butler matrix.

Figure 5A:
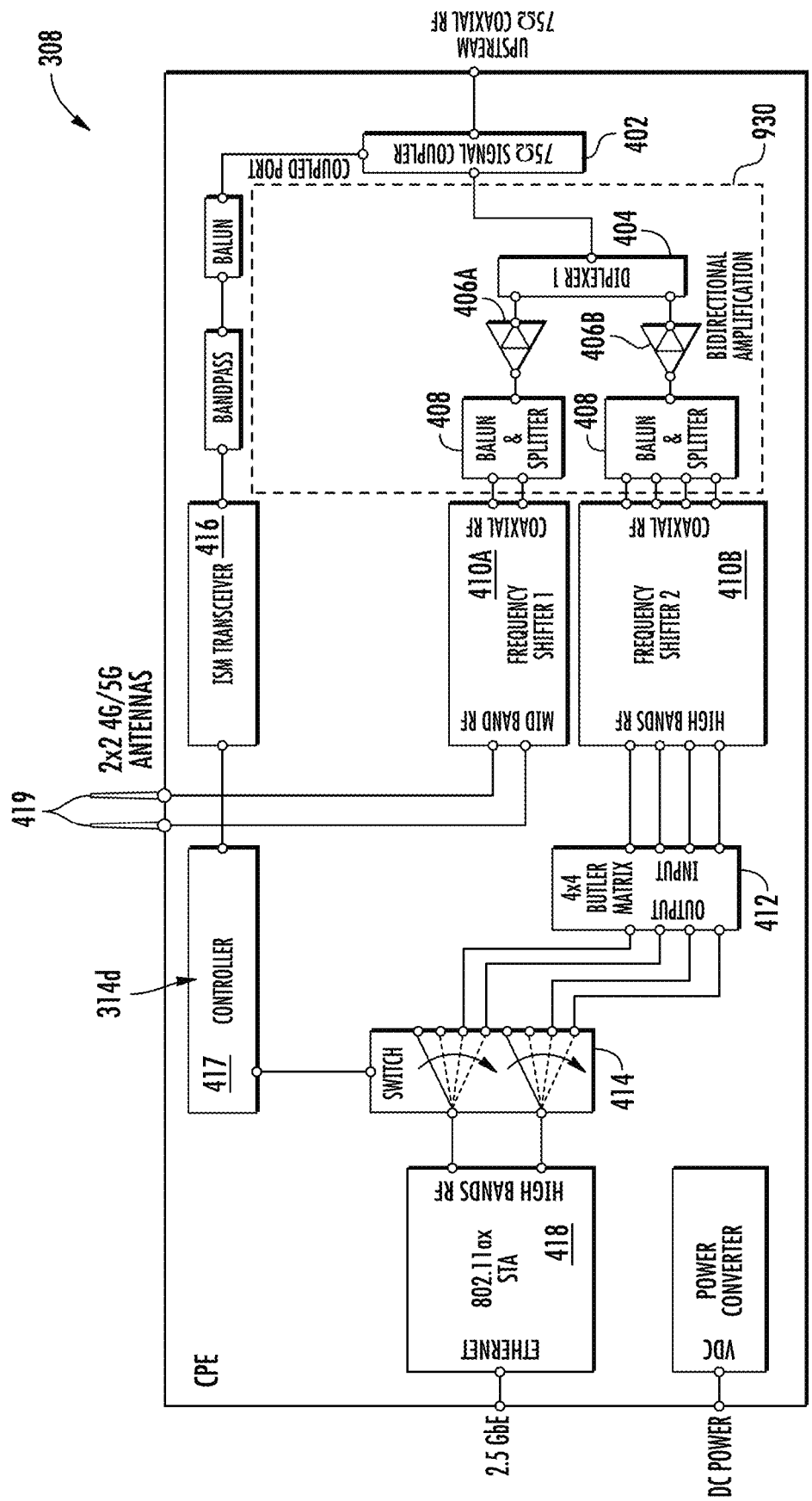
FIG. 5A is a functional block diagram illustrating one variant of the second exemplary configuration of the CPE apparatus of FIG. 5, according to the present disclosure.

FIG. 5A illustrates another possible configuration of the CPE 308, in this case with a dual Butler matrix 414 connected to both ports of the 802.11ax STA chipset, and respectively coupling ports of the first Butler matrix 412 which are in turn coupled to the high-band (e.g., 5 GHz) band ports of the frequency shifter 410B.

Figure 6:
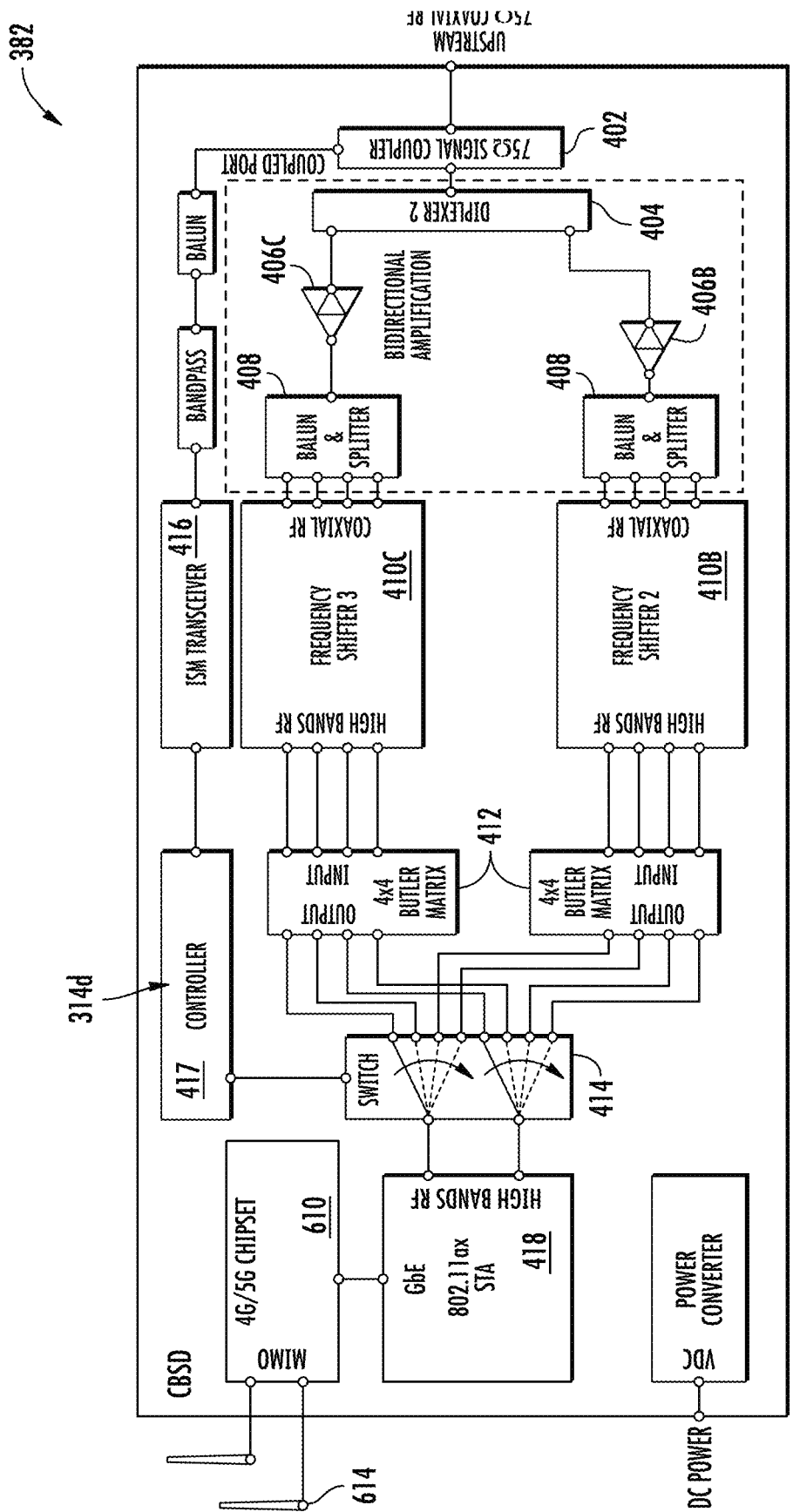
FIG. 6 is a functional block diagram illustrating a first exemplary configuration of a wireless node (e.g., CBSD) apparatus according to the present disclosure.

FIG. 6 illustrates another embodiment of the "CPE" of the disclosure; in this embodiment, the device 382 is configured as a CBRS CBSD (or similar type of base station) which is disposed typically outside of an end-user premises, such as to wirelessly serve a plurality of end-user FWA devices as previously described. The operation of the device is generally similar to the CPE 308 of FIG. 4, yet in this case the cellular capability obtained via the signals transmitted over the coaxial cable (and frequency shifted to cellular bands as in FIG. 4) is obviated in favor of a cellular chipset 610. Hence, in operation, "cellular" signals (e.g., CBRS band) are generated by the chipset 610 for transmission to the various served FWA 384 via MIMO or spatially diverse antennae 614 and associated RF front ends (part of the chipset; not shown) rather than merely up-converting the cable-band cellular waveforms received at the CPE as in the configuration of FIG. 4. The 802.11ax chipset is accordingly leveraged to e.g., (for DS) receive the cable-band signals (e.g., lower and/or upper band of the frequency plan of FIGS. 2-2B) at up-converted "WLAN domain" frequencies (e.g., 5 GHz band), which the 802.11ax chipset 418 of the device 382 converts to baseband and forwards to the cellular chipset 610 via e.g., high-bandwidth IPC link or GbE interface as shown. The cellular chipset 610 then up-converts and distributes the waveforms locally via the antennae 614 at cellular target frequency (which may be e.g., on the order of 1.6 GHz up to mmWave frequencies, depending on the cellular chipset selected. In this fashion, the device 382 is not beholden to the node 302 upstream to process its cellular waveforms, and as such the node 302 can even be configured without a cellular chipset if desired.

Figure 6A:
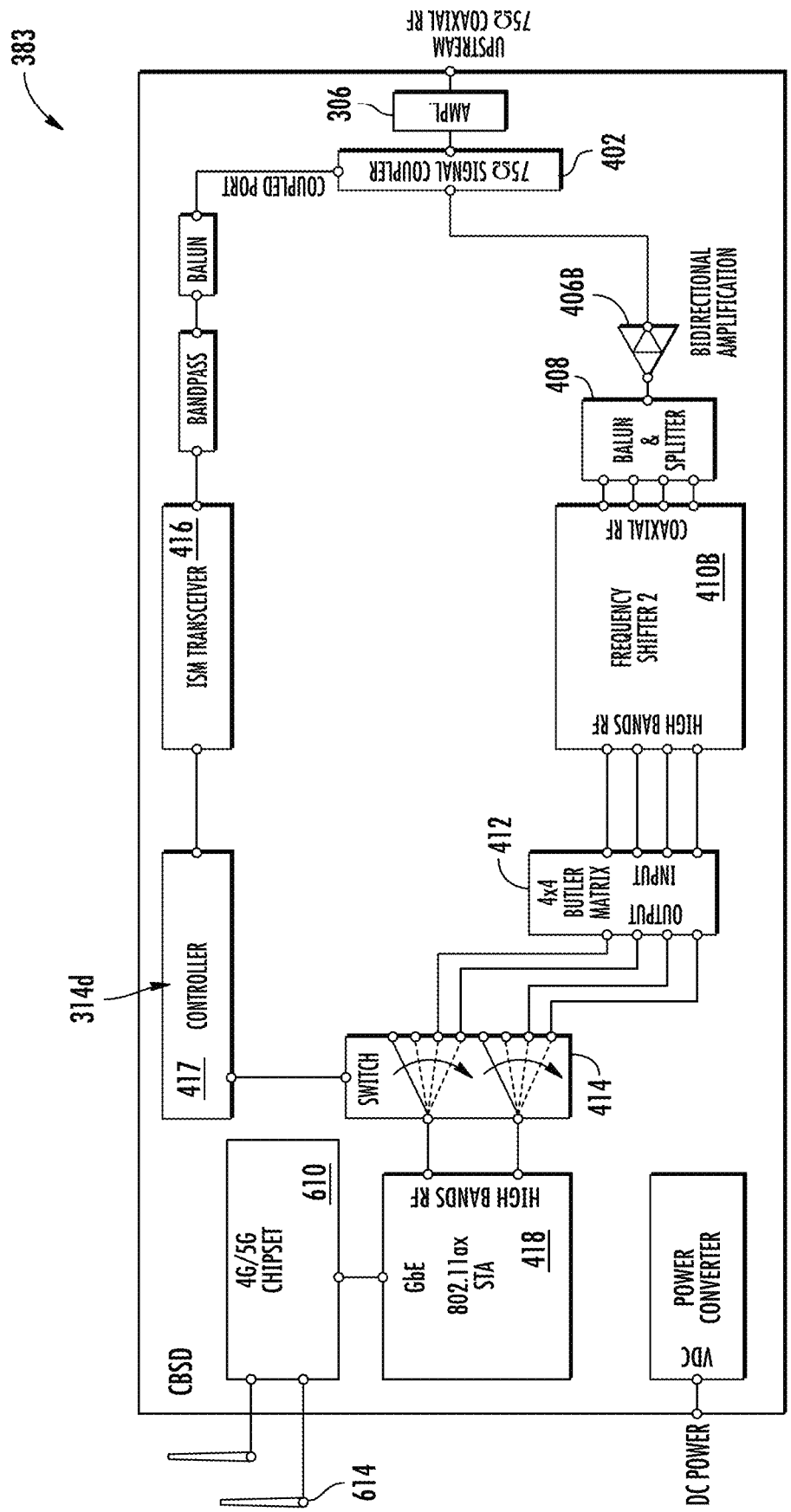
FIG. 6A is a functional block diagram illustrating a second exemplary configuration of a wireless node (e.g., CBSD) apparatus according to the present disclosure.

FIG. 6A illustrates another possible configuration of the device 382, in this case with a dual Butler matrix 414 connected to both ports of the 802.11ax STA chipset, and respectively coupling ports of the first Butler matrix 412 which are in turn coupled to the high-band (e.g., 5 GHz) band ports of the frequency shifter 410B. This is in effect a simplified version of the embodiment of FIG. 6, but further includes an integrated amplifier 306 in the network-side interface of the device 382, so that the device may be more "stand alone" thereby increasing flexibility of the types of applications within which it can be used (e.g., it can be backhauled by cable runs which do not have an indigenous amplifier associated therewith, such as where the cable run taps off before the amplifier, or where there is simply no amplifier in the run anywhere such as for short-haul applications).

Figure 7:
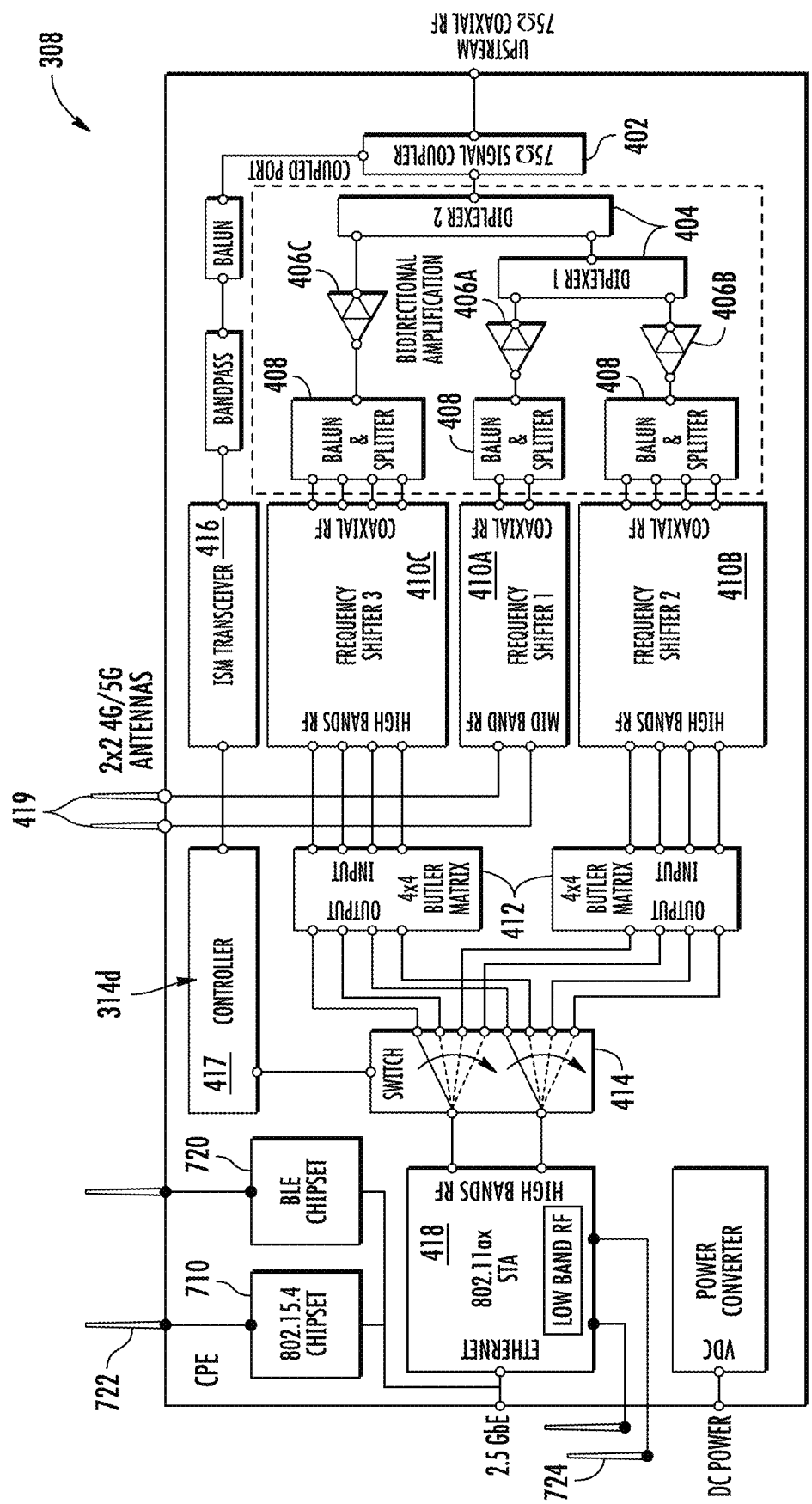
FIG. 7 is a functional block diagram illustrating another exemplary configuration of a CPE apparatus according to the present disclosure, including IoT/PAN interfaces.

FIG. 7 illustrates yet another configuration of the CPE 308 of the disclosure, wherein the 802.11ax chipset 418 is used to transact baseband data to/from PAN chipsets 710, 720 such as an IEEE Std. 802.15.4 chipset and a BLE (Bluetooth Low Energy) chipset which are used to enable IoT and other PAN functions within the premises. As such, IoT gateway functionality can be integrated into the CPE 308 of FIG. 7 such that IoT devices of the premises can utilize the CPE as a backhaul to the larger MSO network (and beyond) without requiring the user to purchase and maintain a separate gateway. Likewise, the 802.11ax STA can include AP-like functionality (such as via a Wi-Fi Direct or similar functionality) such that it can act as both (i) STA relative to the 802.11ax chipset in its parent node 302, and (ii) an AP for user premises client devices such as tablets, smartphones, printers, Smart TVs, etc. The local WLAN signals are transmitted/received via the low-band (e.g., 2.4 GHz band) ports of the chipset and via spatially diverse antennae 724 in the illustrated embodiment, although other configurations may be utilized.

Figure 8:
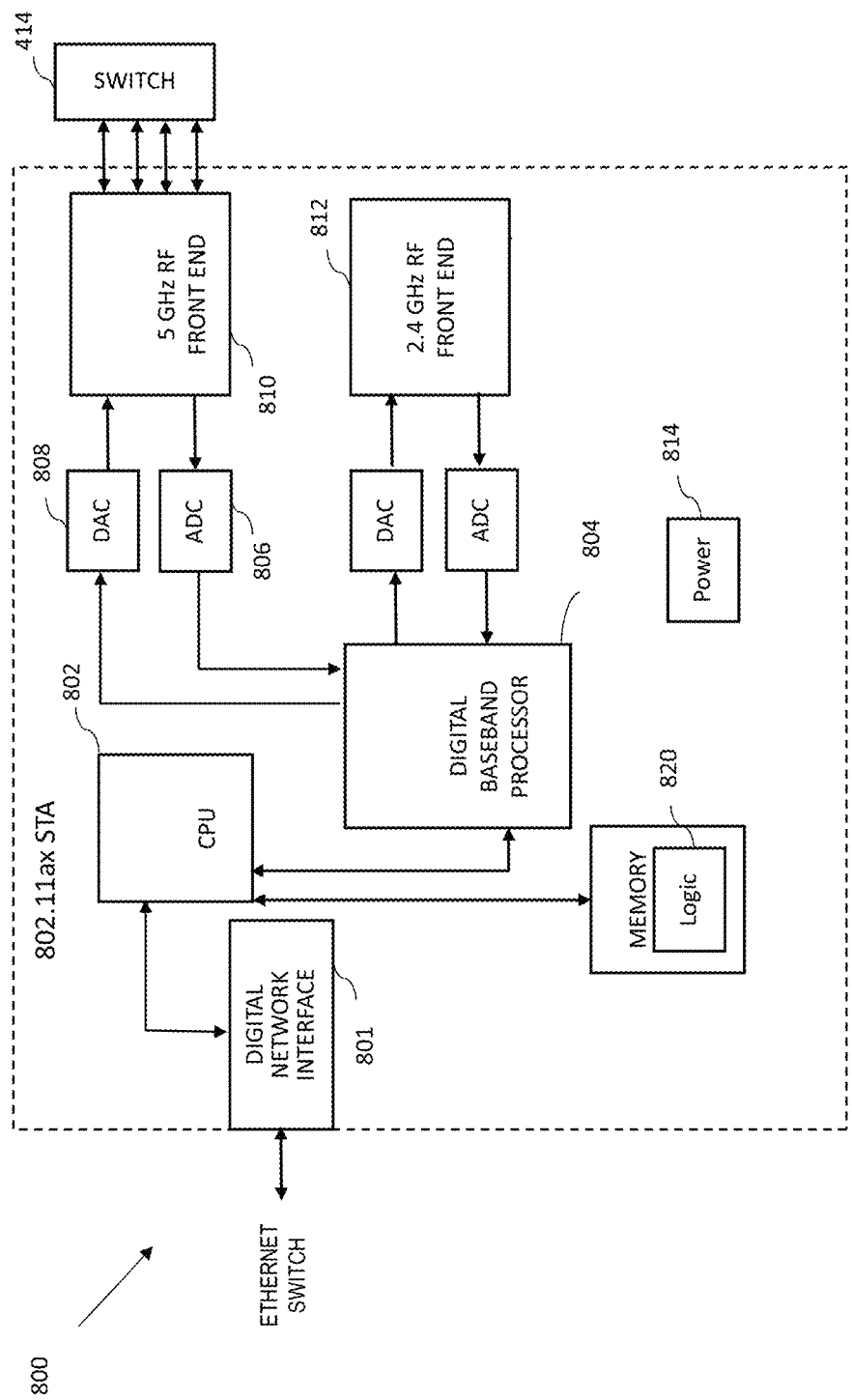
FIG. 8 is a functional block diagram of one embodiment of an IEEE Std. 802.11ax-enabled STA device according to the disclosure.

FIG. 8 illustrates one embodiment of an exemplary IEEE Std. 802.11ax chipset used in conjunction with the CPE 308 of FIGS. 4-7. As shown, the chipset 800 includes a digital network interface 801 (e.g., Ethernet or other protocol), a CPU 802, a digital baseband processor 804, DAC 808 and ADC 806 for digital to analog domain (and vice versa, respectively) conversion of the baseband signals, two RF front ends 810, 812 for the 5 GHz and 2.4 GHz bands respectively, wherein the 5 GHz RF front end 810 is used to interface with the switch 414 of the CPE 308.

In operation, the baseband chipset processes RF transmission-band data received from the node 302 for transmission over the digital network interface 801 to user devices (not shown), as well as signals received thereby for transmission upstream to the node 302. In that chipsets of the type shown in FIG. 8 are readily available and effectively commoditized, they have excellent data bandwidth performance, are readily available at comparatively low cost, and are fully featured in terms of support for various protocols and functions, thereby making them highly useful choices for including with the CPE 308 (and node 302) of the exemplary embodiments of the present disclosure.

Exemplary Use Cases

Figure 9:
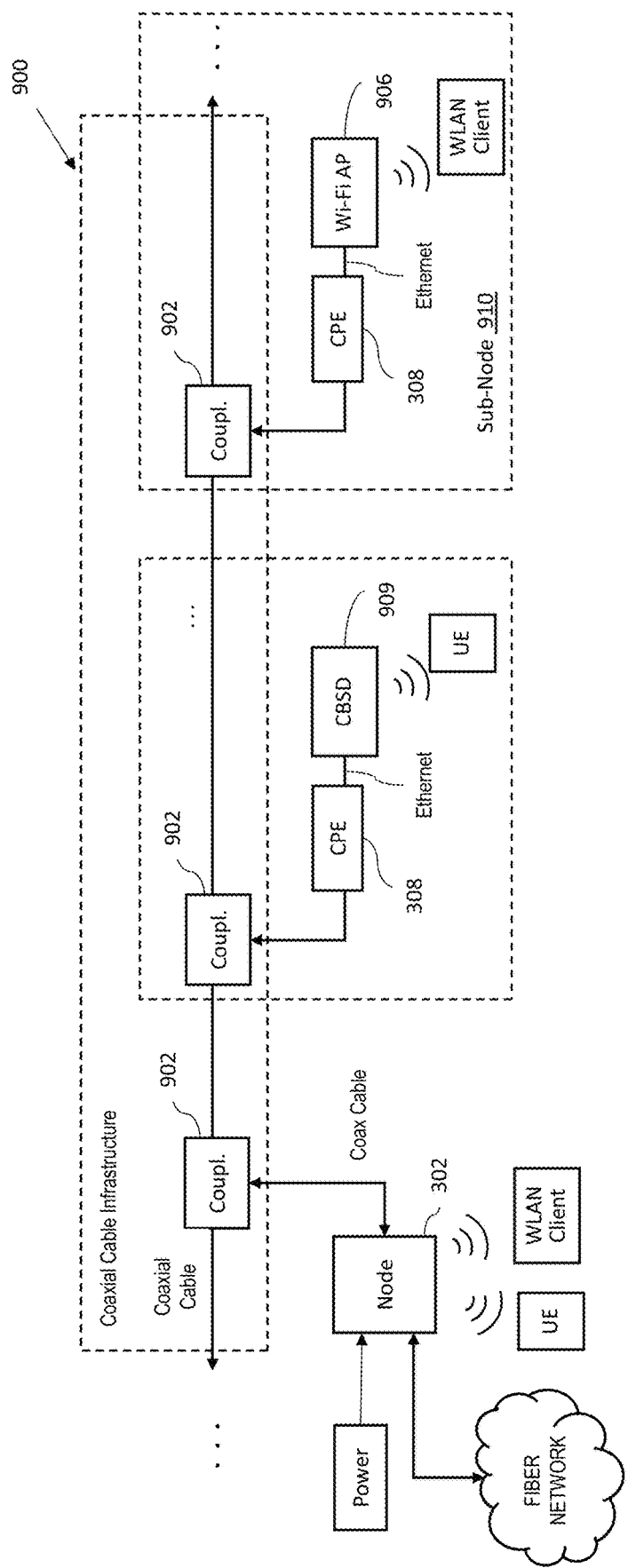
FIG. 9 is a functional block diagram illustrating a first exemplary use case of utilizing the exemplary CPE apparatus according to the present disclosure.

FIG. 9 is a functional block diagram illustrating an exemplary embodiment of a network architecture 900 for providing small cell service by using the node apparatus of the present disclosure. Exemplary applications of this use case include extant coaxial cable infrastructure such as overhead cable runs (e.g., on telephone poles or similar structures), as well as underground cable runs.

As a brief aside, a small cell is typically a low-powered cellular radio access node that operates in licensed and unlicensed spectrum, e.g., with a range of 10 meters to a few kilometers. The FCC defines small cell equipment further at e.g., https://www.fcc.gov/document/fcc-facilitates-wireless-infrastructure-deployment-5g. As such, exemplary applications of the node apparatus 302 of the present disclosure can utilize relatively low powered devices which operate in unlicensed or quasi-licensed (e.g., CBRS or C-Band) spectrum which provide enhanced coverage for e.g., MSO subscribers.

As shown in the exemplary application of FIG. 9, a first node 302 is disposed between a backhaul network (such as e.g., fiber network shown in FIG. 9) and an existing wireline (e.g., coaxial cable) infrastructure. In one variant, such network architecture can provide an improved data services at an edge of e.g., an access network such as that provided via cellular radio technology like 3GPP 4G/5G by an MNO or even the MSO itself, as long as the existing wireline infrastructure is accessible. Hence, even though user devices disposed at the edge of such network may not be able to receive high-rate data services from the access network itself (due to e.g., lack of cable drops or wireless access nodes such as NodeB's or CBSDs), the architecture 900 of FIG. 9 utilizes the inventive node 302 coupled to an existing coaxial cable infrastructure to provide the high-rate data services enabled by e.g., the 4×4 802.11ax chipset capabilities. For example, once a given node 302 is coupled to the existing coaxial cable infrastructure by a coupler 902, any user devices at a premises with access to the coaxial cable can utilize a CPE 308, which can be coupled to the coaxial cable to receive and send data via e.g., connecting to the CPE itself (e.g., an Ethernet connection) or a connected Wi-Fi AP 906. Likewise, a CPE 308, cable and node 302 can act in effect as a backhaul for MSO small cell devices such as CBRS CBSDs 309 as shown.

Hence, multiple different coupler/CPE "sub-node" equipment 910 can be used to support various types of wireline and wireless services at each individual premises.

It will be appreciated that based on configuration of the node(s) 302: (i) cellular-enabled UE and/or WLAN clients local to the node 302 itself can be serviced, and (ii) premises connected to or tapped off the coaxial cable and having suitable CPE 308 can provide unlicensed/quasi-licensed small-cell functionality and Wi-Fi functionality at end-user premises. Thus, the node(s) 302 can support both incidental or ad hoc users in proximity thereto (e.g., who happen to be walking by or situated near a node on a telephone poll or neighborhood box), as well as a number of end-user premises with CPE 308 and associated WLAN or small-cell wireless transceivers, as shown in FIG. 9.

Figure 10:
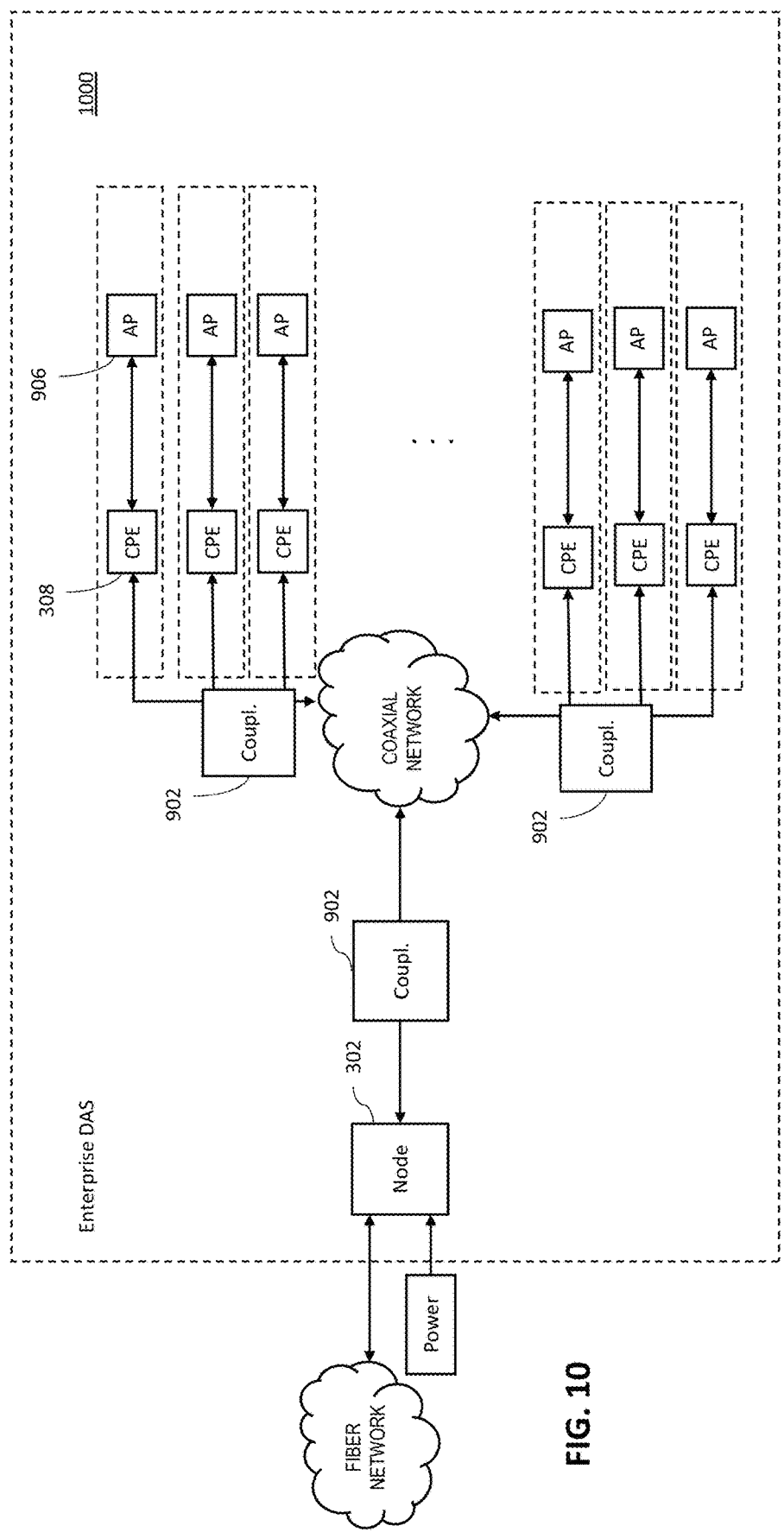
FIG. 10 is a functional block diagram illustrating a second exemplary use case of utilizing the exemplary CPE apparatus according to the present disclosure.

FIG. 10 is a functional block diagram illustrating another exemplary embodiment of a network architecture 1000, in this scenario for providing a DAS (distributed antenna system) for an enterprise or similar premises (e.g., one with multiple structures, rooms, spaces or departments, which may be distributed within a larger campus or area).

As previously described with respect to e.g., FIG. 3B herein, the DAS architecture includes one or more "local" nodes 302 which is/are disposed at the enterprise premises and used to deliver MSO data and signals directly to the enterprise premises and its local (premises) coaxial distribution network, including in some cases without need of any interposed amplifier. For example, the enterprise premises may have an optical fiber drop (e.g., FTTC or FTTH) node 302 proximate thereto or serving the premises, such that the inventive node 302 can be used to directly serve the enterprise premises, such as by being mounted on a utility pole proximate the premises, or in the case where the node 302 serves only the premises, integrated within the premises itself (e.g., in a telecommunications service ingress/egress room or similar). In this configuration, the optical node delivers signals to the 802.11ax node 302, the latter which transforms the signals to the RF domain for delivery on the premises coaxial network of the enterprise (e.g., to different rooms or departments or structures thereof) to individual CPE 308 via one or more couplers 902. To the degree that the node 302 is physically/topologically proximate to the various CPE 308 it serves, the use of an amplifier as in other more distant configurations can be avoided, thereby further reducing cost, complexity and CAPEX.

It should be appreciated that the architecture of the premises network and topology thereof can be literally of any shape or size, and advantageously may be pre-existing such that it can be "repurposed" rather than having to be rewired with e.g., optical fiber or CAT-5/6 cabling. The different areas of the premises are served by the existing coaxial infrastructure, and a multitude of couplers 902 may be used to branch into different areas of the premises (if not present) to allow CPE 308, as well as optional Wi-Fi APs 906 or small cells 909 to be connected to provide the high-rate data services as enabled by the 4×4 802.11ax chipset capabilities of the node 302 (and the CPE 308).

Such architecture would be especially useful in e.g., network edge deployments which do not have good cellular coverage otherwise. For example, such buildings would not require any additional fiber installation or additional cellular towers be placed nearby by an MNO; the node 302 and the CPE 308 can provide the high-rate data wireless and wireline services via utilization of the existing coaxial cable infrastructure.

Figure 11:
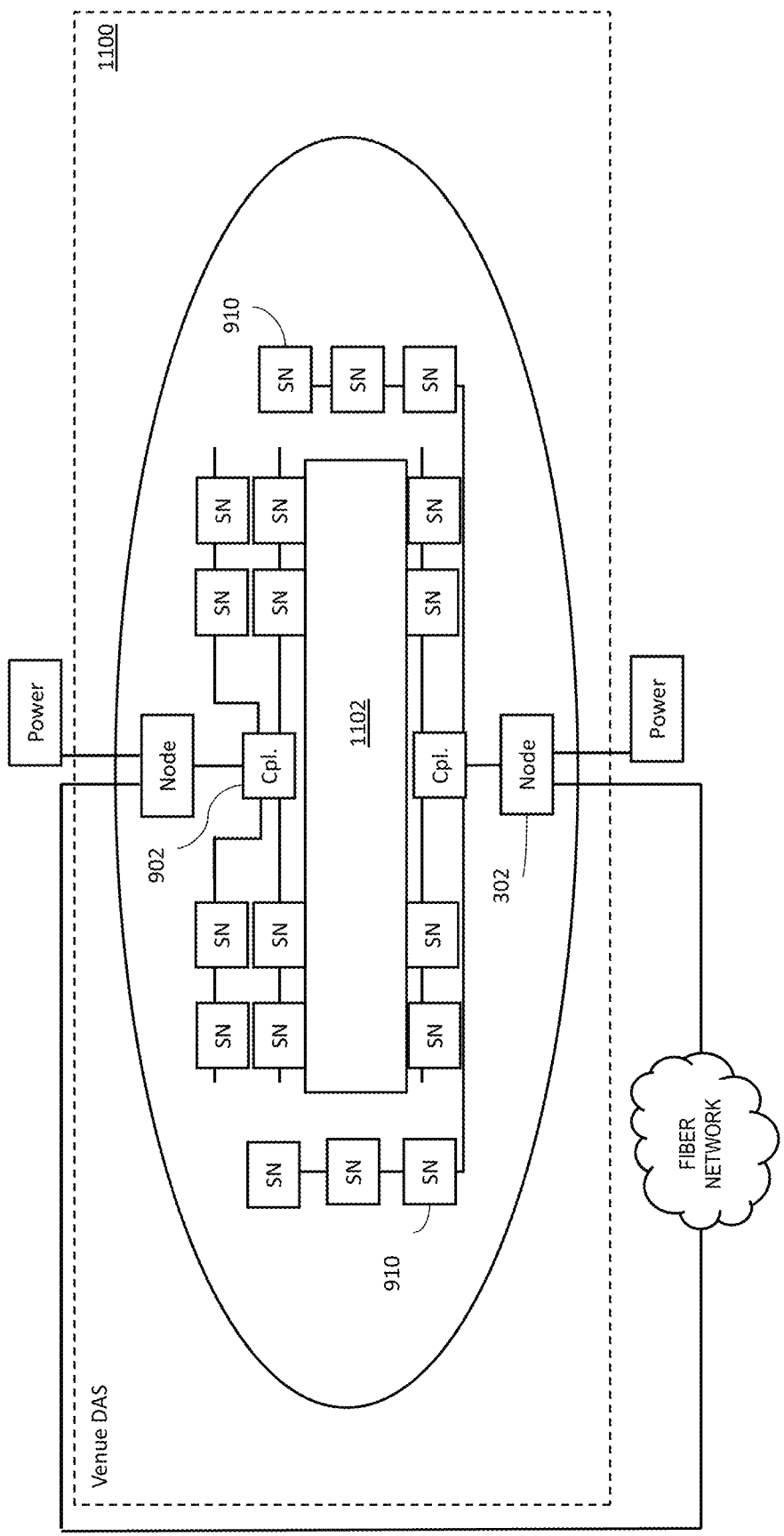
FIG. 11 is a functional block diagram illustrating a third exemplary use case of utilizing the exemplary CPE apparatus according to the present disclosure.

FIG. 11 is a functional block diagram illustrating another exemplary embodiment of a network architecture 1100 for providing a DAS, in this case for a venue such as a sports stadium, convention center, or other similar application.

Similar to the architecture of FIG. 10, the present embodiment includes one or more "local" nodes 302 disposed at the venue. The venue of FIG. 11 includes an existing or added wireline infrastructure made up of multiple paths branching out or otherwise distributed from the local nodes 302. In one variant, the nodes 302 are coupled onto an existing coaxial cable infrastructure branching into various parts of the venue. A plurality of network sub-nodes 910, each including a coupler 902, CPE 308, and an optional small-cell (e.g., CBSD) or Wi-Fi AP (see FIG. 9) are coupled onto various parts of the existing coaxial cable infrastructure by a plurality of centralized couplers 902 (although the sub-nodes 910 may couple directly to cable, as in the embodiment of FIG. 9). As with previously described embodiments, the local nodes 302 can be used in conjunction with the coaxial infrastructure to provide high-rate data services to user devices disposed at different parts of such venue, such as to ensure adequate wireless coverage of all seating or other areas (which may have very high user density and hence prospective levels of interference), including to account for physical or environmental factors specific to the venue (e.g., "dead" spots due to certain types of materials, added structures, etc. The ability to couple onto the existing or extended coaxial cable of the venue at literally any free location can also aid in ad hoc placements which were not necessarily contemplated at time of the cable installation or venue construction.

In one variant, a fiber drop within the HFC network which runs all the way to the venue may be used as the basis for supporting the local node(s) 302. As such, the nodes can be placed at locations within the venue where such fiber drop(s) come in, including placement of two or more nodes in a common location of the venue (not shown) which each serve respective portions of the extant (or added) cable topology of the venue.

It should be appreciated that the architecture of the venue can also be of any shape or size. The different areas of the venue can be served by the coaxial infrastructure, including any extensions thereof which may be added to ensure more complete coverage consistent with the physical attributes (range, directionality, etc.) of the installed CPE 308 and supported end-user devices such as small cells or WLAN APs. As long as the CPE can couple onto the coaxial infrastructure, the CPE can provide network connection to any user devices that can connect to the CPE (or its daughter devices).

Figure 12:
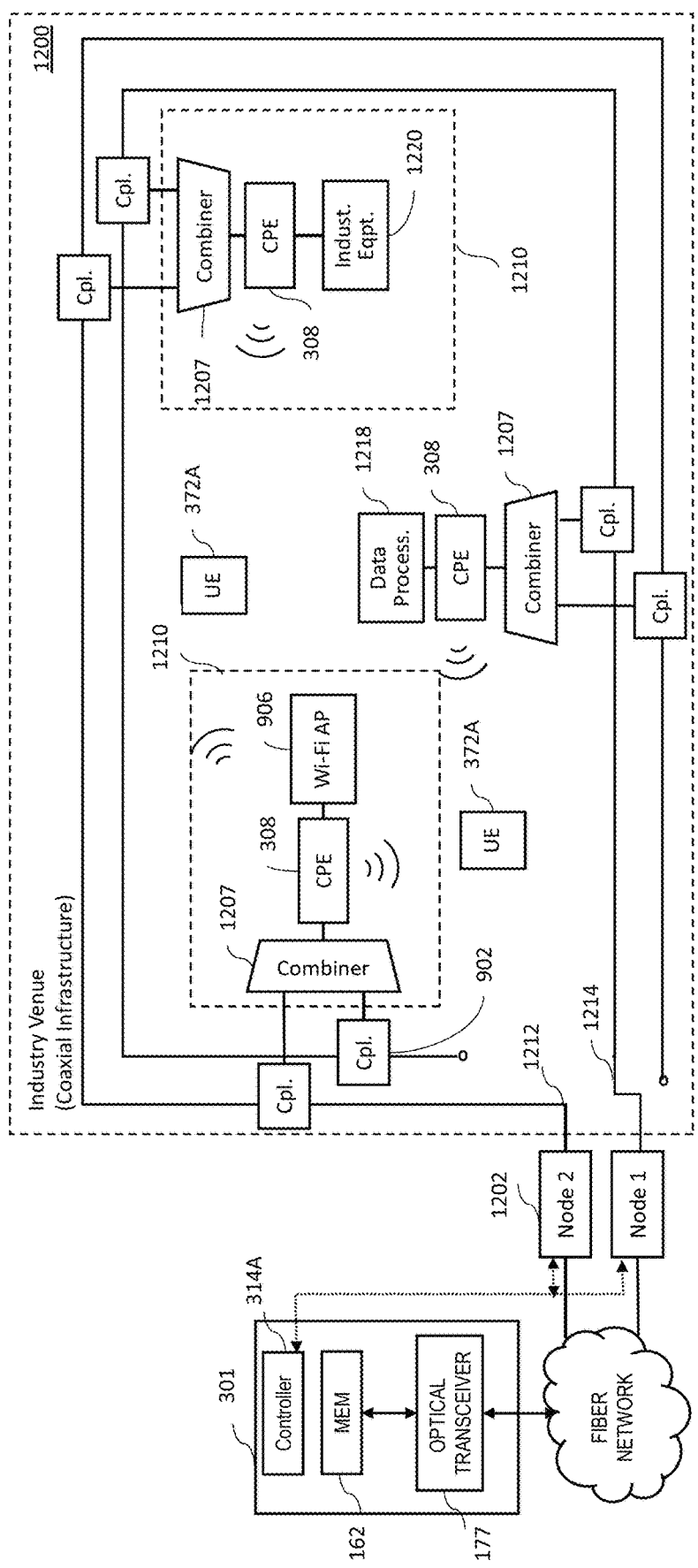
FIG. 12 is a functional block diagram illustrating a fourth exemplary use case of utilizing the exemplary CPE apparatus according to the present disclosure.

FIG. 12 is a functional block diagram of another exemplary architecture is described. In this architecture 1200, a reliability of data services is provided via redundancy. Such redundancy/reliability is useful in e.g., industrial or other critical applications. For instance, for many chemical processes, loss of electrical power or process data can result in significant costs or material losses. Similarly, for certain data-intensive industrial applications (such as cloud services, server farms, distributed storage, etc.), data reliability/redundancy may be a significant or even critical feature. Hence, as used herein, the terms "reliability" and "redundancy" are meant to broadly encompass, without limitation: (i) provision of additional capability over that provided or capable of being provided by a single distribution infrastructure (such as e.g., a single branch of a coaxial cable topology), as well as (ii) provision of backup or fail-over capability to the capacity provided by said single distribution infrastructure.

With the foregoing as a backdrop, the embodiment of the architecture 1200 of FIG. 12 includes a control device 301 in data communication with each of Node 1 and Node 2 1202 of FIG. 12 via fiber network; the control device 301 can for example implement the band allocation plan 220 so as to allocate e.g., half of the aforementioned exemplary 1.6 GHz of bandwidth to Node 1 while allocating the other half to Node 2. In one variant, Node 1 can process one set of data via signaling over ~700 MHz of bandwidth, while Node 2 processes another set of data via signaling over the other ~700 MHz of bandwidth. Then, the processed signals can be distributed to the various CPE 308 at the premises and/or optional Wi-Fi AP 906 (or small cell 909, not shown) after being combined through a combiner 1207, to provide network coverage to user devices such as UE 372A, or factory/automation or data processing equipment 1218, 1220.

As a brief aside, the attenuation associated with any coaxial cable infrastructure is a function of, inter alia, coaxial conductor length. Accordingly, by dividing the data set to be transmitted to various parts of the industry venue shown in FIG. 12, the network architecture 1200 can take advantage of the two (or by extension any number of) paths 1212, 1214 of an existing coaxial infrastructure, by which the signal sent out of Node 1 can reach one part of the infrastructure, and likewise signals sent out of other nodes can reach other parts of the infrastructure (as contrasted with a single long coaxial cable). Through coordination of node and CPE placement, both redundancy and reliability can be achieved by having nodes service different sub-portions of the coaxial cable topology, including variants where signals transmitted from two different nodes are distributed to common CPE (albeit from different cable runs) so as to minimize the amount of attenuation and potential loss of data by sending and combining data as sent over the paths 1212 and 1214. Moreover, if the signals are redundant of one another, the signals distributed to a given CPE 308 can be selectively used in cases where one signal is lost; i.e., the signals may be delivered redundantly to the same node, and the secondary or backup signals used only in the event of the loss of primary signals delivered via another cable segment (e.g., in the even of one branch's node failure, cable cut, etc.)

It will also be appreciated that typical wireless access nodes such as Wi-Fi APs have an effective connectivity range on the order of one hundred (100) feet, depending on factors such as the presence or absence of buildings or other structures (and their materials of construction), and other interfering emitters. The optimal location of the wireless interface (e.g., an access point (AP), wireless access point (WAP), router, etc.) is sometimes a three-dimensional spatial problem, as client devices that will communicate with the wireless interface may be located on the same floor of a building or structure (in any azimuth direction), and also on different floors above and below the wireless interface's position. In addition, at any of the locations where a client device is located, other local factors affecting the device's ability to communicate with the wireless interface may also exist, such as radio frequency (RF) signal path loss/attenuation (such as due to interposed materials, electronic, etc.), ionosphere signal reflections and refractions (e.g., atmospheric ducting), and fading (which degrades the radio signals due to rapid fluctuations of the amplitudes, phases, or multipath delays of a radio signal over a short period or short travel distance due to interfering environment). Moreover, interference from other RF or electromagnetic sources such as other wireless-enabled devices in the same frequency band, non-communication interference sources (e.g., microwave ovens), solar radiation, and so forth can further attenuate or disrupt WLAN and similar signals including those of PAN networks (e.g., Bluetooth or IEEE Std. 802.15.4 or the like).

The foregoing issues are particularly acute for mmWave systems such as those operating above 40 GHz; due to the propagation characteristics of such high-frequency electromagnetic waves, even ordinary objects such as walls or even people can interfere significantly with signal propagation, and hence active and dynamic management of propagation characteristics and beam steering are needed in most mmWave applications, including those intended for indoor use.

Additionally, the characteristics of a lower frequency wireless interface such as an 802.11 AP (as well as the corresponding client devices) are also such that they may have directional RF properties due to, e.g., variances in antenna gain in different directions, obstruction by internal components of the device, etc.

As such, the various aspects of the present disclosure advantageously enable an enhanced degree of flexibility both in terms of placement of CPE and similar/supported devices (such as CBSDs, femtocells, APs, etc.) and service differentiation, since high-capacity, multi-service (and customized) capability can be supported through often ubiquitous coaxial cable infrastructure. This is enabled in significant part by the use of the enhanced feature set of the 802.11ax ecosystem and chipsets, which provide a readily-adaptable solution when coupled with the aforementioned pervasive inventory of coaxial cable, operated with expanded bandwidth such as according to the frequency plan(s) of FIGS. 2-2B. For instance, if a particular venue or premises requires a large area of unlicensed mobile device coverage, a CBSD or similar device can be installed at and backhauled from the site simply through use of an inventive device 382 as previously described and an existing coaxial cable drop. Similarly, a large number of individual WLAN APs (such as may be needed to adequately cover more challenging use environments) can be supported via a limited number of CPE 308 and similarly backhauled by the existing cable. Real-time or low-latency traffic from the premises or venue may also be prioritized using the 802.11ax feature set, as may QoS for certain traffic classes. Similarly, the plurality of CPE 308 disposed at various parts of the extant coaxial cable infrastructure that permeates a larger venue such as e.g., a concert hall or sports arena can mitigate the aforementioned problems within such large venues and provide high-capacity data services to most anywhere within the venue, whether via wireless or wireline capability.

Exemplary Methods

Figure 13:
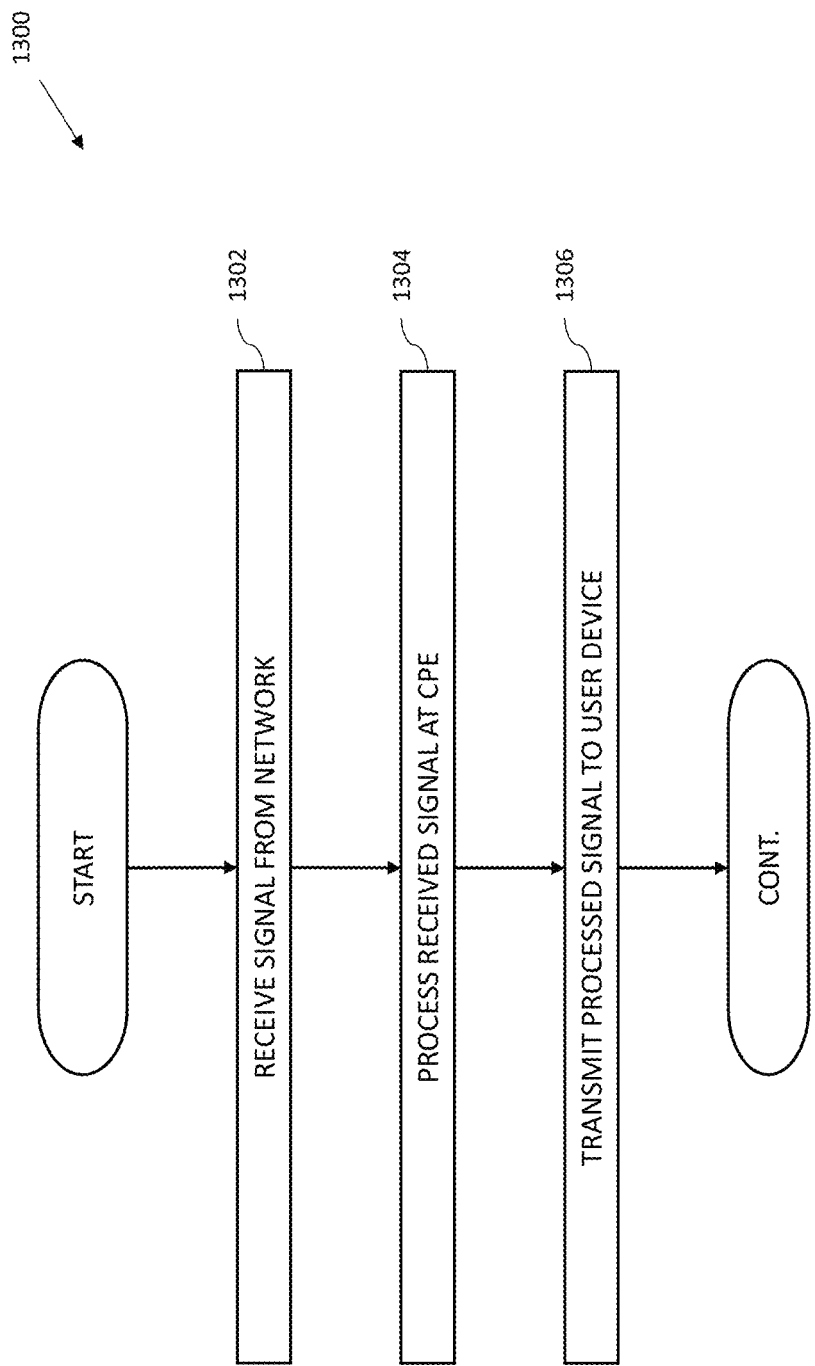
FIG. 13 is a logical flow diagram of an exemplary embodiment of a generalized method for providing high-capacity data service over a content delivery network, according to the present disclosure.

Referring now to FIG. 13, one embodiment of a general methodology for providing high data rate services via premises apparatus (e.g., CPE 308) over a content distribution network such as the architectures 300, 320, 340, 360, 380, 385, 390 previously described with respect to FIGS. 3A-3G is described.

As shown, per step 1302, one or more signals are received from a network node 302. In one variant, the signals are received via an RF interface to a coaxial infrastructure (such as e.g., 75 Ohm connector or similar). Such transmission of the signals from a network node 302 or interposed amplifier 306 to e.g., CPE 308 via the coaxial cable allows the signal to be propagated via e.g., an extant coaxial cable infrastructure of an MSO, so that high data rate services can be conveniently provided to a large number of users without rewiring at the edge of the network.

Per step 1304, the received signals are processed at the CPE 308. In one variant, as shown and described in greater detail with respect to FIG. 15, an 802.11ax-based component is utilized to process the received coaxial domain signal (e.g., after a frequency conversion). For example, after an up-conversion of the received signals by a plurality of frequency shifters 410 (e.g., from the signals as received from the coaxial cable infrastructure at the appropriate portion of the bands shown in the frequency plan 200 of FIG. 2, to be transmitted via 5 GHz band signals, which are then processed to baseband data by the 802.11ax STA), an 802.11ax STA module 418 (FIG. 4) can be used to process the signal to e.g., enable an enhanced feature set as supported by the 802.11ax technology ecosystem. The foregoing feature set includes, but is not limited to, e.g., symmetric high-bandwidth data operation, and data processing scheduling (e.g., prioritization of real-time data over non-real-time data, QoS prioritization, etc.). Exemplary protocols for the STAs (as well as the APs described further in co-pending U.S. patent application Ser. No. 16/788,138, incorporated by reference in its entirety supra) are set forth in "P802.11ax—IEEE Draft Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications Amendment Enhancements for High Efficiency WLAN" dated Dec. 6, 2017, which is incorporated herein by reference in its entirety.

Per step 1306 of FIG. 13, the baseband data from the up-converted and processed signals are distributed to the served user devices (e.g., UE 372A) or optional Wi-Fi AP 704. In one variant, an Ethernet interface (e.g., 2.5 GbE port) is utilized for distribution of the baseband data, such as via a MAC (Layer 2/3) process operative to execute within the 802.11ax STA chipset.

It will be appreciated that generally speaking, the methodology for UL/US transmissions is analogous to that for DL/DS, yet inverted. For instance, baseband data obtained from an Ethernet-connected WLAN AP is received by the CPE 308 and up-converted to the 802.11ax chipset frequency, and then frequency shifted onto the cable RF domain frequency (e.g., 700 MHz band) for transmission upstream to the amplifier (if any) and ultimately the serving node 302.

Figure 14:
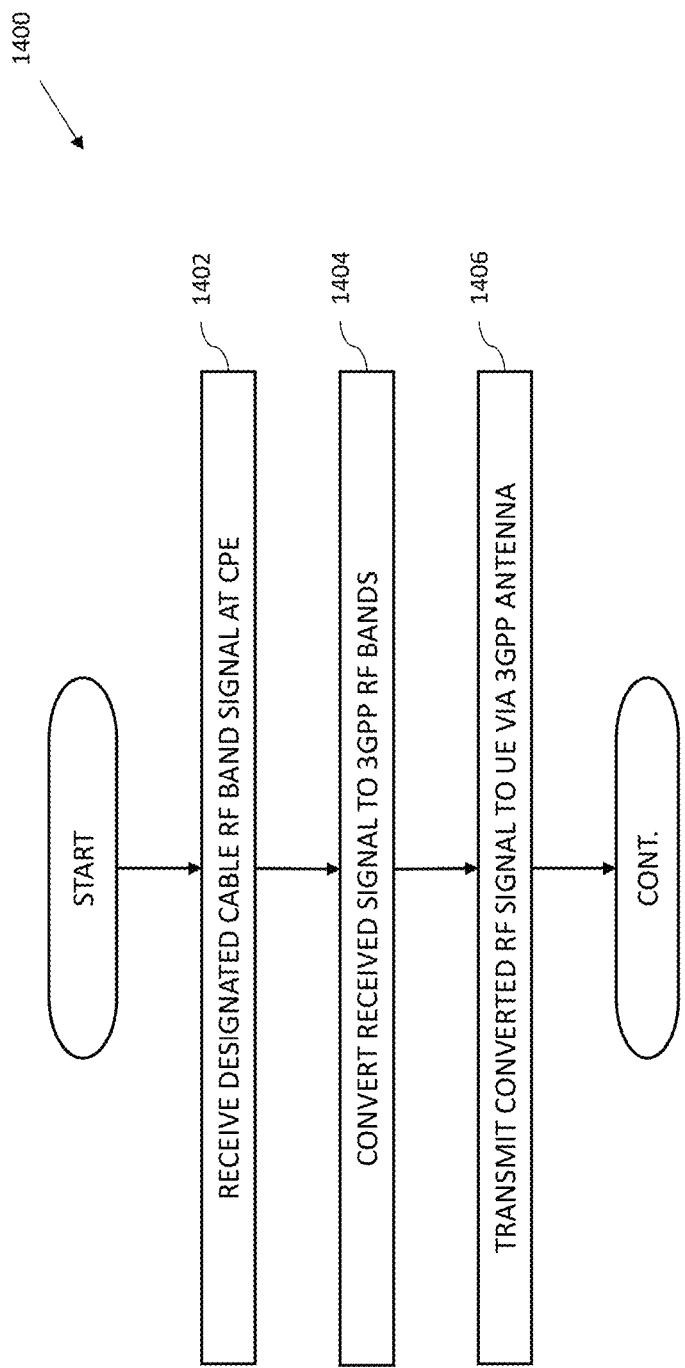
FIG. 14 is a logical flow diagram representing one variant of the generalized method of FIG. 13, according to the present disclosure.

FIG. 14 illustrates one exemplary implementation of the general method of FIG. 13, particularly adapted for generation of 3GPP cellular (whether licensed, quasi-licensed or unlicensed) waveforms. As shown, the method 1400 of FIG. 14 includes first receiving a signal of a designated cable RF band at the CPE 308 (e.g., via a 75 Ohm or similar connector or port) per step 1402.

Next, the received signal is up-converted from the cable RF band (e.g., 85 MHz and below) to the 3GPP RF band(s) per step 1406, such as via a plurality of frequency shifters 410. It will be noted that the cellular waveforms arriving at the CPE 308 have already been modulated according to 3GPP protocols by the 4G/5G chipset within the serving node 302 and are, other than frequency, suitable for transmission over antennae to e.g., served UE in proximity to the CPE 308, and as such there is no complementary "receiving" chipset or the like. Rather, the CPE 308 merely up-converts the received signals to the appropriate cellular band(s) for transmission.

Figure 15:
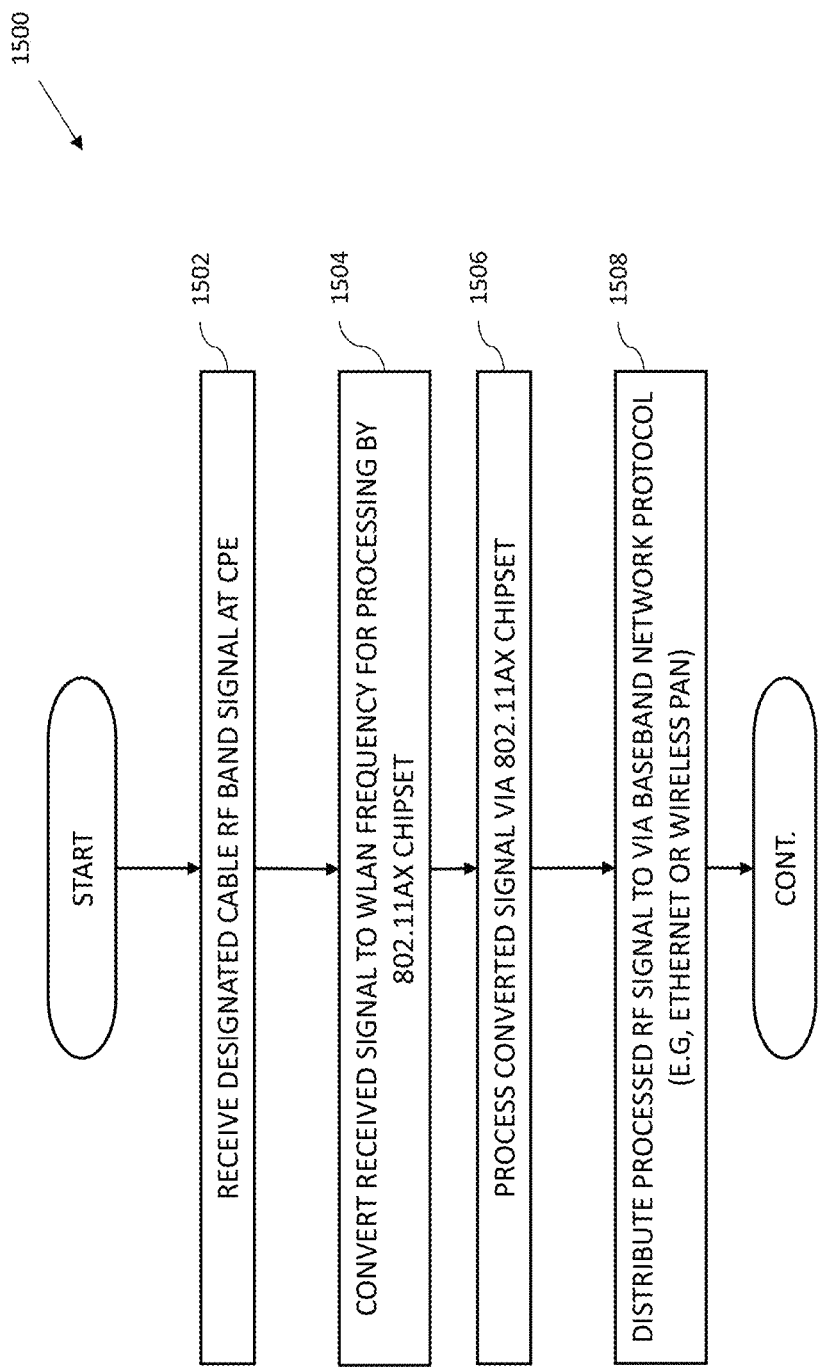
FIG. 15 is a logical flow diagram representing another variant of the generalized method of FIG. 13, according to the present disclosure.

FIG. 15 illustrates another exemplary implementation of the general method of FIG. 13. As shown, the method 1500 of FIG. 15 also includes first receiving a signal of a designated cable RF band at the CPE 308 per step 1502.

At step 1504, the received signal is up-converted by the CPE to one or more user frequency bands, such as by a frequency shifter within the CPE. For instance, the cable band signal (e.g., in a band between 1600 MHz and 85 MHz in the frequency plans of FIGS. 2-2B) is up-converted to the 5 GHz band of the 802.11 ax STA chipset within the CPE.

Next, the up-converted signal is processed by the 802.11 STA module per step 1506. The processing by the 802.11 STA module supports the rich set of enhanced features available via 802.11 Wi-Fi protocols.

Lastly, at step 1508, the up-converted and processed signal is transmitted at the served premises by the CPE (or other devices connected thereto, such as via Ethernet interface) for use by the user's equipment (see e.g., FIG. 3D).

Note that the steps of the implementation 1500 of FIG. 15, and those of the implementation 1400 of FIG. 14, can advantageously be executed simultaneously so as to support the aforementioned service integration (e.g., of wired, wireless, and cellular service) and IoT technologies, including utilization of the 802.11ax feature set for signals associated with that interface.

Figure 16:
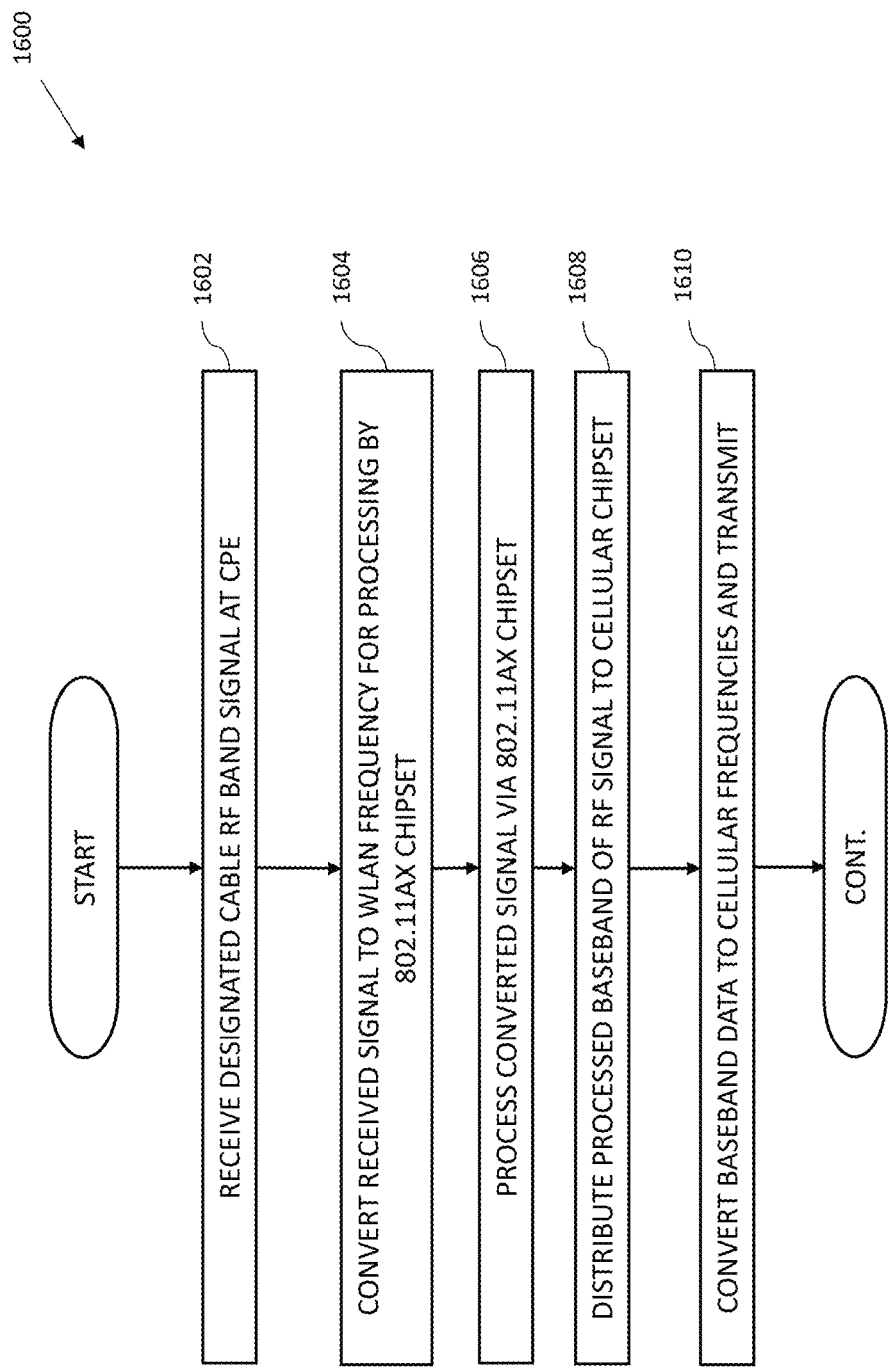
FIG. 16 is a logical flow diagram representing yet another variant of the generalized method of FIG. 13, according to the present disclosure.

Referring now to FIG. 16, an exemplary embodiment of a method for providing indigenous or local cellular signals from a CPE according to the disclosure is described.

Per step 1602 of the method 1600, signals are received at the CPE 308 from the serving node 302. These signals may be for example baseband data transmitted to the CPE in the user bands (e.g., between 1.6 GHz and 85 MHz in the frequency plans of FIGS. 2-2B) that have been processed by the 802.11ax "AP" chipset at the node 302.

Per step 1604, the received signals are up-converted to the 802.11ax STA chipset frequency band (e.g., 5 GHz) by the frequency shifter apparatus of the CPE 308.

Next, per step 1606, the up-converted signals are processed to baseband by the 802.11ax chipset to again produce the baseband data. It will be recognized, however, that in contrast to merely transmitting the baseband data without 802.11ax processing to the CPE from the node 302, the derived baseband signals of the present embodiment of the methodology can leverage the 802.11ax feature set, such as for prioritization of real-time or latency-sensitive signals, QoS, or other.

Per step 1608, the recovered baseband data is then provided to the cellular chipset of the CPE (see FIGS. 6 and 6A) such as via a GbE or high-speed IPC link between the processors. The cellular chipset utilizes the baseband data to generate cellular-band waveforms according to the prescribed protocol (e.g., 3GPP 4G or 5G) for transmission over the local antennae of the CPE 308 (see FIGS. 6 and 6A). Conversely, the cellular antennae and chipset receive transmitted signals from the local UE, down-convert them to BB, provide the BB data to the 802.11ax chipset, which processes and up-converts the signals to the 802.11ax chipset user band (5 GHz) for transmission upstream to the serving node 302.

Figure 17:
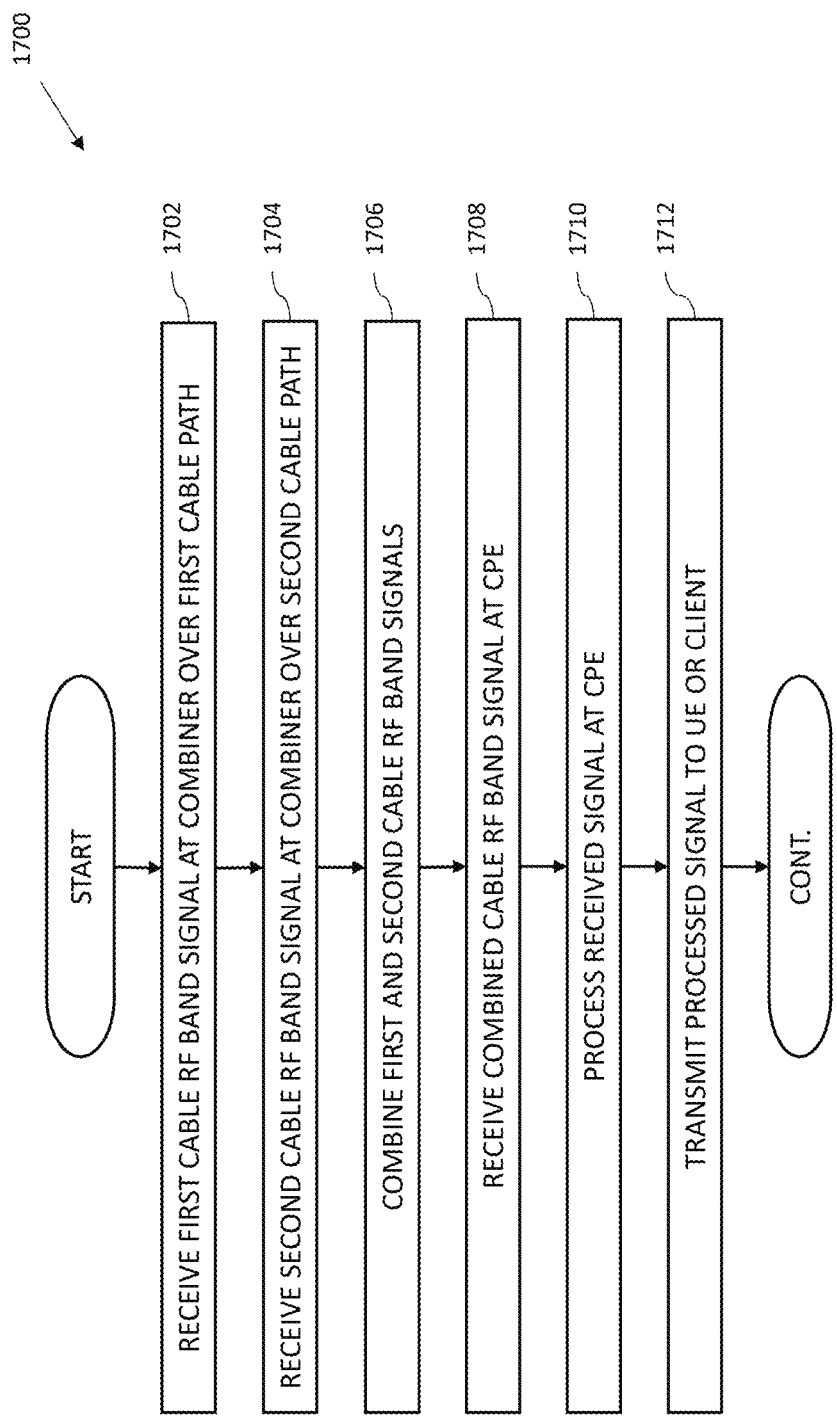
FIG. 17 is a logical flow diagram representing one embodiment of a method for providing redundancy of data service over a content delivery network, according to the present disclosure.

Referring now to FIG. 17, one embodiment of a methodology for providing redundancy of data service over a content delivery network such as previously discussed with respect to e.g., FIG. 12 is described.

As shown, per step 1702, a first cable RF band signal is received at e.g., a signal combiner 1202 over a first cable path, transmitted through a first network node (e.g., Node 1 of FIG. 12).

Per step 1704, a second cable RF band signal is received at the signal combiner 1202 over a second cable path, transmitted through a second network node (e.g., Node 2 of FIG. 12).

In one variant, the two cable RF band signals (transmitted over two different cable paths of the extant coaxial cable infrastructure) are received at the combiner 1202 via a plurality of couplers 902 (e.g., as shown in FIG. 12). In one implementation thereof, the two cable RF band signals include signals of two different frequency bands (e.g., as shown in e.g., the frequency plan 220 of FIG. 2A).

Per step 1706, the two cable RF band signals are then combined at the signal combiner 1002. For example, in the case of the two signals occupying different frequency bands of the frequency plan, the two signals can simply be added or superimposed onto a common output cable via an RF signal combiner of the type known in the art.

Thereafter, the combined signal is received at the CPE 308 per step 1708 and then processed by the 802.11ax STA, per step 1710, as described in greater detail elsewhere herein.

Lastly, the processed signal from step 1710 is transmitted to user equipment via e.g. a gigabit Ethernet interface (e.g., 2.5 GbE port) per step 1712.

It will be appreciated by those of ordinary skill that use of the first and second paths of the methodology 1700 of FIG. 17 is merely exemplary; in fact, more paths may be used (e.g., four via four separate cable pathways) and combined and processed according to a similar methodology. Likewise, as previously noted, transmission of signals from CPE or associated user devices upstream toward the node(s) is effectively the reverse of the foregoing process.

Figure 17A:
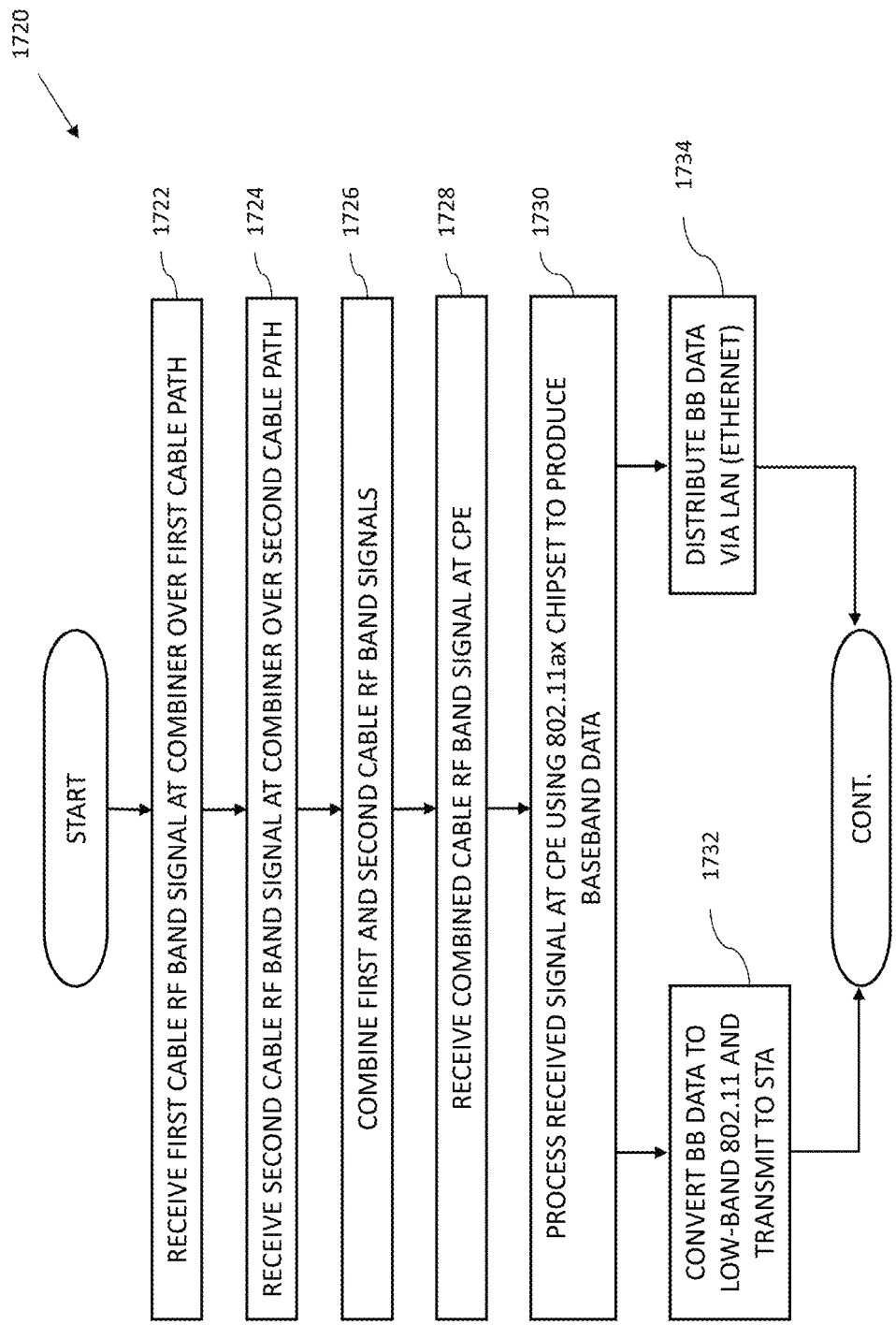
FIG. 17A is a logical flow diagram representing one implementation of the method for providing redundancy of data service over a content delivery network of FIG. 17.

FIG. 17A illustrates one variant of the methodology of FIG. 17. As shown, per step 1722, the first RF band signals are received via the first path, and per step 1724, the second cable band signals are received via the second path. The first and second signals are combined per step 1726, and the received and combined signals are then transmitted to the CPE where they are received for further processing (e.g., via a coaxial cable at the output of the combiner) per step 1728.

Per step 1730, the received (combined) signals are processed at the CPE using the 802.11ax chipset in order to generate baseband data from the received signals. In this embodiment, the signals transmitted by the serving node(s) 302 are within the chipset's user band (e.g., 5 GHz), and hence can be directly received and processed by the 802.11ax chipset after combination without further up-conversion or down-conversion.

Figure 18:
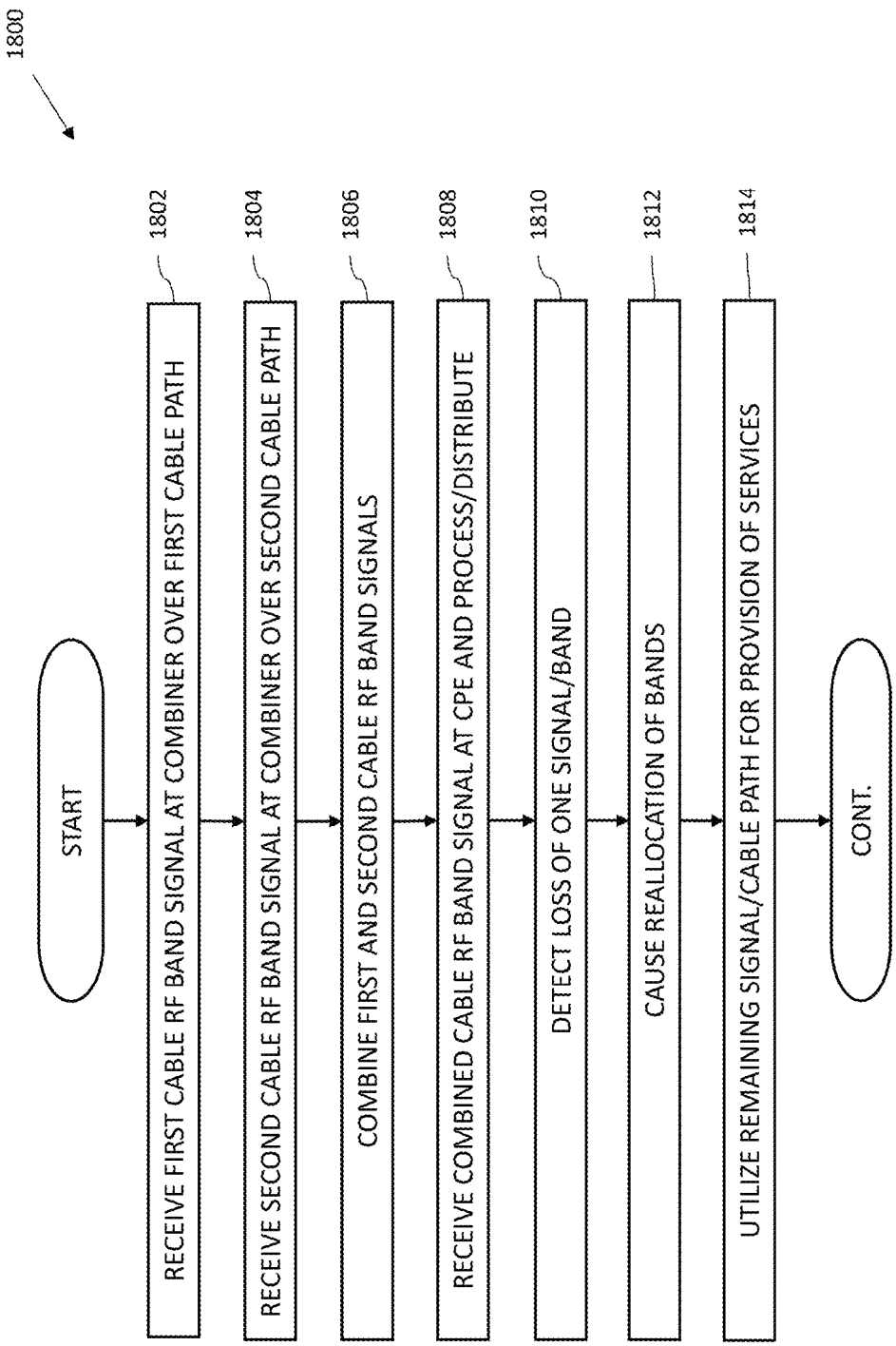
FIG. 18 is a logical flow diagram representing another embodiment of a method for providing redundancy of data service over a content delivery network, according to the present disclosure.

Per step 1732, the baseband (BB) data produced by the chipset is then up-converted to 802.11 user frequency bands such as in the 2.4 GHz range (e.g., for use by a local STA device using the 802.11ax chipset as an "AP" (e.g., via Wi-Fi Direct or a similar protocol wherein the 802.11ax chipset can operate both as an STA to the node AP function, and an AP to user or client device STA chipsets). Contemporaneously or alternatively (e.g., using indigenous Layer 2/3 MAC functions of the 802.11ax chipset), the BB data is also distributed to local area network devices such as PCs, Wi-Fi APs, gateways (e.g., where the conversion/transmission of step 1732 is not utilized, or in addition thereto, etc. While the methodologies of FIGS. 17 and 17A is useful for providing e.g., CPE/wireless coverage of a multitude of different areas within a premises, venue or similar application, the various aspects of the present disclosure also advantageously enable provision of fail-over capability (i.e., not to enhance coverage or increase the number of users served, but rather to compensate for failure or loss of components or signal path(s)), such as for e.g., industrial automation or other critical functions. Hence, referring now to FIG. 18, another embodiment of a methodology for providing such redundancy of data services is described.

As shown, per step 1802, a first cable RF band signal is received at e.g., a signal combiner 1202 over a first cable path, transmitted through a first network node (e.g., Node 1 of FIG. 12).

Per step 1804, a second cable RF band signal is received at the signal combiner 1202 over a second cable path, transmitted through a second network node (e.g., Node 2 of FIG. 12).

In one variant, the two cable RF band signals (transmitted over two different cable paths of the extant coaxial cable infrastructure) are received at the combiner 1202 via a plurality of couplers 902 (e.g., as shown in FIG. 12).

In another variant, the two cable RF band signals include signals of two different frequency bands (e.g., as shown in e.g., the frequency plan 220 of FIG. 2A).

Per step 1806, the two cable RF band signals are then combined at the signal combiner 1202.

Thereafter, the combined signal is received at the CPE 308 per step 1808 and then processed by the 802.11ax STA, as described in greater detail elsewhere herein.

Next, per step 1810, a loss of one of the first or second signals is detected. For example, a loss of input at the combiner can be detected (e.g., via signal level/dB determinations), loss at the supplying node 302 can be detected, loss of a band at the receiving CPE 308 (e.g., loss of all signals between 85 and 750 MHz) can be detected, or yet other approaches may be used. This loss detection can also apply in either or both US and DS directions; i.e., loss of signal at a combiner may be presumed to affect both directions, or alternatively each direction/source can be independently (such as where an upstream coupler or combiner port fails, but the remainder of the path including downstream signal path remains unaffected.

As can be appreciated, the signal loss may be due to any number of different events, such as hardware failure (e.g., chipset failure, frequency shifter/diplexer failure, amplifier failure, or cable cut or connector failure), and as such may require subsequent troubleshooting or diagnosis.

Per step 1812, reallocation of one or more bands is performed, and per step 1814, the remaining path(s) are utilized for provision of services to the CPE. The aforementioned reallocation may be performed by any number of different processes in any number of different ways. For instance, in one variant, logic operative on the network node(s) 302 serving the various CPE 308 in the premises/venue may identify (or be notified by the CPE 308 or another node) of the loss of signal associated with a given path/band, and re-allocate the bands in accordance with the frequency plan of FIGS. 2-2B. For example, whereas a given CPE or group of CPE at the premises/venue may normally utilize the 85 to 750 MHz band (including the exemplary four sub-bands therein), when such band is lost (due to e.g., cable cut), the node logic is configured to split the remaining sub-bands (within the 950-1590 MHz band) across the various participating CPE 308, such as via a "fair" allocation algorithm, one based on historical consumed bandwidth, one based on traffic priority, QoS, or yet other metrics.

It is noted that in the exemplary embodiment (see e.g., FIG. 12), each CPE 308 is coupled via the combiner logic to both cable paths/nodes, and hence in the event of a failure of one path, each CPE can still transact US and DS data (albeit with reduced bandwidth allocation unless the entire "path" is reallocated, as discussed below) with the remaining operative node.

Moreover, given the each CPE 308 occupies a different position on each cable path (e.g., in the illustrated embodiment of FIG. 12, the last node on one path is the first node on another path), a component or other failure may impact only a subset of the CPE. Consider the case for example where a DS port on a combiner for a CPE at the end of the first path fails, that port will then be precluded from transmitting signals DS to the CPE from its serving node, and passing signals US from the CPE to that same node. However, the remaining US/DS path(s) and port(s) for the CPE remain operative, as do all US and DS ports/paths for the remaining CPE. Stated differently, the CPE 308 and combiners in the exemplary configuration are disposed in parallel versus series, such that failure of one does not necessarily impact the others. As such, in the foregoing failure scenario, that affected CPE can only utilize the remaining path, and hence one solution is to merely re-allocate it's bandwidth to one or more of the sub-bands of the non-affected (second) path. As such, one of the non-affected CPE can be re-allocated to sub-band(s) associated with the "affected" path of the affected CPE, since the non-affected CPE can use any available sub-band.

However, in another scenario (e.g., complete node 302 or cable failure that takes down an entire path, and hence all data transmission for all CPE 308 utilizing that particular path or node), the failed path/node is useless for any CPE of the premises/venue, and hence all bandwidth for all CPE must be re-allocated across the remaining cable path(s) and node(s)). As such, some CPE may simply continue to utilize their same previously allocated band(s), with possible reduction to accommodate other CPE being "moved" onto the remaining path/node capacity.

It will be appreciated that one mode of normal operation for the exemplary system of FIG. 12 (i.e., one with multiple generally co-extensive cable paths) is that one path is allocated a first band (e.g., 85-750 MHz), and another path a second band (950-1590 MHz), such that the full capacity of each cable is not normally utilized. Hence, in time of path/node failure, the CPE 308 and remaining node 302 can be preprogrammed if required (such as under control of the node logic, or even a centralized network controller further back within the MSO infrastructure or core) so as to utilize the entire bandwidth of the remaining path(s) to service the CPE of the premises. For a given CPE which normally uses bandwidth within the non-failed path's band, its operation is unaffected. Similarly, for CPE which use the bandwidth associated with the failed path, depending on the type of failure, their signals will simply not be transmitted via one port/path of their combiner/splitter, but rather the other (non-failed) port/path.

In another variant, the CPE 308 themselves can each detect a failure of a signal path (whether locally or globally) and implement corrective action such as band re-allocation based on communication with the upstream node(s). This communication may occur over a non-failed path or control channel.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. User premises apparatus for use within a coaxial cable network, the user premises apparatus comprising:
   a first port for interfacing with the coaxial cable network for receipt of radio frequency (RF) signals;
   first frequency shifter apparatus configured to up-convert at least a first portion of the received RF signals to a first prescribed frequency band, the first prescribed frequency band comprises an IEEE Std. 802.11ax user band disposed between 5 Ghz and 6 GHz;
   at least one RF integrated circuit (IC) configured to at least receive the at least first portion of the of the RF signals within the first prescribed frequency band and process the received at least first portion of the of the RF signals to generate baseband data packets consistent with a data networking protocol;
   second frequency shifter apparatus configured to up-convert at least a second portion of the received RF signals to a second prescribed frequency band, the second prescribed frequency band comprises a CBRS quasi-licensed frequency band comprising one of GAA (general authorized access) or PAL (priority access license) spectrum within the frequency band comprising 3.550 GHz to 3.700 GHz; and
   antenna apparatus in signal communication with the second frequency shifter apparatus, the antenna apparatus configured to at least transmit the up-converted at least second portion of the received RF signals.

2. The user premises apparatus of claim 1, wherein the receipt of the RF signals comprises receipt of one or more RF signals, via the coaxial cable network, transmitted from a node apparatus within a prescribed frequency band, the one or more RF signals having been down-converted to the prescribed frequency band from a cellular frequency band prior to transmission to the user premises apparatus.

3. The user premises apparatus of claim 1, further comprising a switch apparatus configured to selectively switch the up-converted at least first portion of the received RF signals to at least two ports of the at least one RF IC.

4. The user premises apparatus of claim 3, wherein the switch apparatus comprises at least one Butler matrix switch apparatus.

5. User premises apparatus for use within a coaxial cable network, the user premises apparatus comprising:
- a first port for interfacing with the coaxial cable network for receipt of radio frequency (RF) signals;
- first frequency shifter apparatus configured to up-convert at least a first portion of the received RF signals to a first prescribed frequency band;
- at least one RF integrated circuit (IC) configured to at least receive the at least first portion of the of the RF signals within the first prescribed frequency band and process the received at least first portion of the of the RF signals to generate baseband data packets consistent with a data networking protocol;
- second frequency shifter apparatus configured to up-convert at least a second portion of the received RF signals to a second prescribed frequency band;
- antenna apparatus in signal communication with the second frequency shifter apparatus, the antenna apparatus configured to at least transmit the up-converted at least second portion of the signals;
- a switch apparatus configured to selectively switch the up-converted at least first portion of the received RF signals to at least two ports of the at least one RF IC;
- at least one ISM (Instrumentation, Scientific, Medical) band receiver in signal communication with the first port; and
- controller logic in communication with the at least one ISM band receiver and configured to control the switch apparatus, the control of the switch apparatus based at least in part on control data received via the at least one ISM receiver and the coaxial cable network.

6. The user premises apparatus of claim 5, further comprising:
- personal area network (PAN) transceiver apparatus in data communication with the at least one RF IC, the PAN transceiver apparatus configured to transact baseband data with the at least one RF IC for transmission of IoT (Internet of Things) data upstream via the at least one RF IC to a corresponding RF IC at a node of the coaxial cable network serving the user premises apparatus.

7. A method of obtaining broadband data services via a coaxial cable infrastructure and use of unlicensed or quasi-licensed spectrum, the method comprising:
- receiving one or more radio frequency (RF) signals via the coaxial cable infrastructure, the received one or more RF signals having been transmitted on the coaxial cable infrastructure using at least one frequency band and comprising 3GPP (Third Generation Partnership Project) Long Term Evolution (LTE) or 5G New Radio (NR) compliant waveforms;
- up-converting the received one or more RF signals to one or more Citizens Broadband Radio Service (CBRS) frequency bands;
- transmitting the up-converted one or more RF signals within the one or more CBRS bands to at least one user device;
- receiving one or more second RF signals via the coaxial cable infrastructure, the received one or more second RF signals having been transmitted on the coaxial cable infrastructure using at least one second frequency band;
- up-converting the received one or more second RF signals to one or more user bands;
- processing the received and up-converted one or more second RF signals to produce baseband data; and
- providing at least a portion of the baseband data to the at least one user device.

8. The method of claim 7, wherein the at least one second frequency band is wider in frequency range than an operating band of the coaxial cable infrastructure when used for traditional cable operations.

9. The method of claim 8, wherein the at least one second frequency band comprises a band at least 1200 MHz in width.

10. The method of claim 8, wherein the at least one second frequency band comprises a first sub-band at least 600 MHz in width, and a second sub-band at least 600 MHz in width.

11. The method of claim 10, wherein the first sub-band and the second sub-band are configured for use in either upstream (US) or downstream (DS) directions, and the method further comprises dynamically reallocating at least portions of at least one of the first sub-band or second sub-band between said US or DS directions.

12. The method of claim 7, wherein:
- the up-converting of the received one or more second RF signals to the one or more user bands comprises up-converting to at least one IEEE-Std. 802.11ax user frequency band; and
- the processing of the received and up-converted one or more second RF signals to produce the baseband data comprises processing the up-converted one or more second RF signals using an IEEE Std. 802.11ax compliant integrated circuit (IC) apparatus.

13. The method of claim 7, wherein:
- the receiving of the one or more RF signals comprises receiving the one or more RF signals at a Citizens Broadband Radio Service device (CBSD); and
- the transmitting of the up-converted one or more RF signals within the one or more CBRS bands to the at least one user device comprises transmitting the up-converted one or more RF signals within the one or more CBRS bands to at least one CBRS fixed wireless access device configured to provide the broadband data services via one or more wireless links.

14. Computer readable apparatus comprising a non-transitory storage medium, the non-transitory storage medium comprising at least one computer program having a plurality of instructions, the plurality of instructions configured to, when executed on a processing apparatus of a computerized apparatus, cause the computerized apparatus to:
- receive one or more first RF signals via a coaxial cable infrastructure, the received one or more first RF signals having been transmitted on the coaxial cable infrastructure using at least one frequency band;
- up-convert the one or more first RF signals to one or more user bands;
- process the received and up-converted one or more RF signals to produce baseband data;

provide at least a portion of the baseband data to at least one user device;

receive one or more second RF signals via the coaxial cable infrastructure, the received one or more second RF signals having been transmitted on the coaxial cable infrastructure via use of at least one second frequency band and comprising 3GPP (Third Generation Partnership Project) Long Term Evolution (LTE) or 5G New Radio (NR) compliant waveforms;

up-convert the received one or more second signals to one or more Citizens Broadband Radio Service (CBRS) frequency bands; and transmit the up-converted received one or more second signals within the one or more CBRS frequency bands.

15. The computer readable apparatus of claim 14, wherein the at least one frequency band is wider in frequency range than an operating band of the coaxial cable infrastructure when used for traditional cable operations.

16. The computer readable apparatus of claim 15, wherein the at least one frequency band comprises a band at least 1200 MHz in width.

17. The computer readable apparatus of claim 15, wherein the at least one frequency band comprises a first sub-band at least 600 MHz in width, and a second sub-band at least 600 MHz in width.

18. The computer readable apparatus of claim 17, wherein:

the first sub-band and the second sub-band are configured for use in either upstream (US) or downstream (DS) directions; and the plurality of instructions are further configured to, when executed on the processing apparatus of the computerized apparatus, cause the computerized apparatus to:

dynamically reallocate at least portions of at least one of the first sub-band or second sub-band between the US or DS directions.

19. The computer readable apparatus of claim 14, wherein:

the up-conversion of the received one or more RF signals to the one or more user bands comprises up-conversion to at least one IEEE-Std. 802.11ax user frequency band; and the processing of the received and up-converted one or more RF signals to produce the baseband data comprises processing the up-converted one or more RF signals using an IEEE Std. 802. 11ax compliant integrated circuit (IC) apparatus.

20. The computer readable apparatus of claim 14, wherein:

the receipt of the one or more second RF signals comprises receipt the one or more RF signals at a Citizens Broadband Radio Service device (CBSD); and the transmission of the up-converted one or more second RF signals within the one or more CBRS bands to the at least one user device comprises transmission the up-converted one or more second RF signals within the one or more CBRS bands to at least one CBRS fixed wireless access device configured to provide broadband data services via one or more wireless links.

* * * * *

UNITED STATES PATENT AND TRADEMARK OFFICE
CERTIFICATE OF CORRECTION

PATENT NO. : 12,149,373 B2
APPLICATION NO. : 18/102878
DATED : November 19, 2024
INVENTOR(S) : Pratik Das et al.

It is certified that error appears in the above-identified patent and that said Letters Patent is hereby corrected as shown below:

In the Claims

Column 38, Line 43 thru Column 39, Line 2 – Claim 1:
Currently Reads:
"1. User premises apparatus for use within a coaxial cable network, the user premises apparatus comprising:
a first port for interfacing with the coaxial cable network for receipt of radio frequency (RF) signals;
first frequency shifter apparatus configured to up-convert at least a first portion of the received RF signals to a first prescribed frequency band, the first prescribed frequency band comprises an IEEE Std. 802.11ax user band disposed between 5 Ghz and 6 GHz;
at least one RF integrated circuit (IC) configured to at least receive the at least first portion of the of the RF signals within the first prescribed frequency band and process the received at least first portion of the of the RF signals to generate baseband data packets consistent with a data networking protocol;
second frequency shifter apparatus configured to up-convert at least a second portion of the received RF signals to a second prescribed frequency band, the second prescribed frequency band comprises a CBRS quasi-licensed frequency band comprising one of GAA (general authorized access) or PAL (priority access license) spectrum within the frequency band comprising 3.550 GHz to 3.700 GHz; and
antenna apparatus in signal communication with the second frequency shifter apparatus, the antenna apparatus configured to at least transmit the up-converted at least second portion of the received RF signals."

Should read:
--1. User premises apparatus for use within a coaxial cable network, the user premises apparatus comprising:
a first port for interfacing with the coaxial cable network for receipt of radio frequency (RF) signals;
first frequency shifter apparatus configured to up-convert at least a first portion of the received RF signals to a first prescribed frequency band, the first prescribed frequency band comprises an IEEE Std. 802.11ax user band disposed between 5 Ghz and 6 GHz;
at least one RF integrated circuit (IC) configured to at least receive the at least first portion of the RF Signed and Sealed this
Thirtieth Day of September, 2025

John A. Squires
*Director of the United States Patent and Trademark Office*

Page 1 of 3

CERTIFICATE OF CORRECTION (continued)
U.S. Pat. No. 12,149,373 B2 signals within the first prescribed frequency band and process the received at least first portion of the RF signals to generate baseband data packets consistent with a data networking protocol;
second frequency shifter apparatus configured to up-convert at least a second portion of the received RF signals to a second prescribed frequency band, the second prescribed frequency band comprises a CBRS quasi-licensed frequency band comprising one of GAA (general authorized access) or PAL (priority access license) spectrum within the frequency band comprising 3.550 GHz to 3.700 GHz; and
antenna apparatus in signal communication with the second frequency shifter apparatus, the antenna apparatus configured to at least transmit the up-converted at least second portion of the received RF signals.--

Column 39, Lines 18 - 48 – Claim 5:
Currently Reads:
"5. User premises apparatus for use within a coaxial cable network, the user premises apparatus comprising:
a first port for interfacing with the coaxial cable network for receipt of radio frequency (RF) signals;
first frequency shifter apparatus configured to up-convert at least a first portion of the received RF signals to a first prescribed frequency band;
at least one RF integrated circuit (IC) configured to at least receive the at least first portion of the of the RF signals within the first prescribed frequency band and process the received at least first portion of the of the RF signals to generate baseband data packets consistent with a data networking protocol;
second frequency shifter apparatus configured to up-convert at least a second portion of the received RF signals to a second prescribed frequency band;
antenna apparatus in signal communication with the second frequency shifter apparatus, the antenna apparatus configured to at least transmit the up-converted at least second portion of the signals;
a switch apparatus configured to selectively switch the up-converted at least first portion of the received RF signals to at least two ports of the at least one RF IC;
at least one ISM (Instrumentation, Scientific, Medical) band receiver in signal communication with the first port; and
controller logic in communication with the at least one ISM band receiver and configured to control the switch apparatus, the control of the switch apparatus based at least in part on control data received via the at least one ISM receiver and the coaxial cable network."

Should Read:
--5. User premises apparatus for use within a coaxial cable network, the user premises apparatus comprising:
a first port for interfacing with the coaxial cable network for receipt of radio frequency (RF) signals;
first frequency shifter apparatus configured to up-convert at least a first portion of the received RF signals to a first prescribed frequency band;
at least one RF integrated circuit (IC) configured to at least receive the at least first portion of the RF signals within the first prescribed frequency band and process the received at least first portion of the RF signals to generate baseband data packets consistent with a data networking protocol;
second frequency shifter apparatus configured to up-convert at least a second portion of the received RF signals to a second prescribed frequency band;
antenna apparatus in signal communication with the second frequency shifter apparatus, the antenna apparatus configured to at least transmit the up-converted at least second portion of the signals;

a switch apparatus configured to selectively switch the up-converted at least first portion of the received RF signals to at least two ports of the at least one RF IC;

at least one ISM (Instrumentation, Scientific, Medical) band receiver in signal communication with the first port; and controller logic in communication with the at least one ISM band receiver and configured to control the switch apparatus, the control of the switch apparatus based at least in part on control data received via the at least one ISM receiver and the coaxial cable network.--